US011354533B2

(12) United States Patent
Panging et al.

(10) Patent No.: US 11,354,533 B2
(45) Date of Patent: Jun. 7, 2022

(54) COMPUTER ARCHITECTURE FOR IDENTIFYING DATA CLUSTERS USING CORRELITHM OBJECTS AND MACHINE LEARNING IN A CORRELITHM OBJECT PROCESSING SYSTEM

(71) Applicant: BANK OF AMERICA CORPORATION, Charlotte, NC (US)

(72) Inventors: Pankaj Panging, Frisco, TX (US); Patrick N. Lawrence, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 856 days.

(21) Appl. No.: 16/208,055

(22) Filed: Dec. 3, 2018

(65) Prior Publication Data
US 2020/0175321 A1  Jun. 4, 2020

(51) Int. Cl.
*G06K 9/62* (2022.01)
*G06N 20/00* (2019.01)
(Continued)

(52) U.S. Cl.
CPC ....... *G06K 9/6223* (2013.01); *G06F 9/30029* (2013.01); *G06F 16/285* (2019.01);
(Continued)

(58) Field of Classification Search
CPC .. G06K 9/6223; G06K 9/6215; G06K 9/6232; G06F 9/30029; G06F 16/285;
(Continued)

(56) References Cited

U.S. PATENT DOCUMENTS 5,946,673 A   8/1999  Francone et al.
6,044,366 A   3/2000  Graffe et al.
(Continued)

OTHER PUBLICATIONS

Pankaj, P. et al., "Computer Architecture for Identifying Data Clusters using Unsupervised Machine Learning in a Correlithm Object Processing System," U.S. Appl. No. 16/208,136, filed Dec. 3, 2018, 103 pages.
(Continued)

*Primary Examiner* — Edward F Urban
*Assistant Examiner* — Wassim Mahrouka

(57) ABSTRACT

A device that includes a model training engine implemented by a processor. The model training engine is configured to obtain a set of data values associated with a feature vector. The model training engine is further configured to transform a first data value and a second data value from the set of data value into sub-string correlithm objects. The model training engine is further configured to compute a Hamming distance between the first sub-string correlithm object and the second sub-string correlithm object and to identify a boundary in response to determining that the Hamming distance exceeds a bit difference threshold value. The model training engine is further configured to determine a number of identified boundaries, to determine a number of clusters based on the number of identified boundaries, and to train the machine learning model to associate the determined number of clusters with the feature vector.

20 Claims, 25 Drawing Sheets

(51) Int. Cl.
*G06F 9/30* (2018.01)
*G06F 16/35* (2019.01)
*G06F 16/28* (2019.01)
*G06N 10/00* (2022.01)

(52) U.S. Cl.
CPC ......... *G06F 16/355* (2019.01); *G06K 9/6215* (2013.01); *G06K 9/6232* (2013.01); *G06N 10/00* (2019.01); *G06N 20/00* (2019.01)

(58) Field of Classification Search
CPC .......... G06N 20/00; G06N 3/08; G06N 10/00; G06V 10/426; G06V 10/7515
See application file for complete search history.

(56) References Cited

U.S. PATENT DOCUMENTS

| | | | |
|---|---|---|---|
| 6,167,391 A | 12/2000 | Lawrence | |
| 6,553,365 B1 | 4/2003 | Summerlin et al. | |
| 6,941,287 B1 | 9/2005 | Vaidyanathan et al. | |
| 6,943,686 B2 | 9/2005 | Allen | |
| 6,947,913 B1 | 9/2005 | Lawrence | |
| 7,015,835 B2 | 3/2006 | Lawrence et al. | |
| 7,031,969 B2 | 4/2006 | Lawrence et al. | |
| 7,246,129 B2 | 7/2007 | Lawrence et al. | |
| 7,310,622 B2 | 12/2007 | Lawrence et al. | |
| 7,349,928 B2 | 3/2008 | Lawrence et al. | |
| 7,526,461 B2 | 4/2009 | Srinivasa et al. | |
| 8,412,651 B2 | 4/2013 | Paiva et al. | |
| 8,521,669 B2 | 8/2013 | Knoblauch | |
| 9,720,998 B2 | 8/2017 | Wang et al. | |
| 10,019,650 B1 | 7/2018 | Lawrence | |
| 10,037,478 B1 | 7/2018 | Lawrence | |
| 2003/0158850 A1 | 8/2003 | Lawrence et al. | |
| 2004/0044940 A1 | 3/2004 | Lawrence et al. | |
| 2016/0300049 A1* | 10/2016 | Guedalia | G06V 10/424 |
| 2017/0161606 A1 | 6/2017 | Duan et al. | |
| 2018/0012993 A1 | 1/2018 | Cheng et al. | |
| 2020/0175417 A1* | 6/2020 | Panging | G06K 9/6218 |
| 2021/0294780 A1* | 9/2021 | Lifsches | G06F 16/2237 |

OTHER PUBLICATIONS

Pankaj, P. et al., "Computer Architecture for Identifying Centroids Using Machine Learning in a Correlithm Object Processing System," U.S. Appl. No. 16/208,221, filed Dec. 3, 2018, 105 pages.

Meersman, R. et al., "On the Move to Meaningful Internet Systems 2005: CoopIS, DOA and ODBASE," OTM Confederated International Conferences CoopIS, DOA and ODBASE Oct. 2005 Agia Napa, Cyprus, Proceedings, Part I, Oct. 31-Nov. 4, 2005, pp. 763-779.

Lawrence, P. N., "Correlithm Object Technology," Apr. 2004, 229 pages.

* cited by examiner

COMPUTER ARCHITECTURE FOR IDENTIFYING DATA CLUSTERS USING CORRELITHM OBJECTS AND MACHINE LEARNING IN A CORRELITHM OBJECT PROCESSING SYSTEM

TECHNICAL FIELD

The present disclosure relates generally to computer architectures for emulating a processing system, and more specifically to a computer architecture for training machine learning models in a correlithm object processing system.

BACKGROUND

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many security applications such as face recognition, voice recognition, and fraud detection.

Thus, it is desirable to provide a solution that allows computing systems to efficiently determine how similar different data samples are to each other and to perform operations based on their similarity.

SUMMARY

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many applications such as security application (e.g. face recognition, voice recognition, and fraud detection).

The system described in the present application provides a technical solution that enables the system to efficiently determine how similar different objects are to each other and to perform operations based on their similarity. In contrast to conventional systems, the system uses an unconventional configuration to perform various operations using categorical numbers and geometric objects, also referred to as correlithm objects, instead of ordinal numbers. Using categorical numbers and correlithm objects on a conventional device involves changing the traditional operation of the computer to support representing and manipulating concepts as correlithm objects. A device or system may be configured to implement or emulate a special purpose computing device capable of performing operations using correlithm objects. Implementing or emulating a correlithm object processing system improves the operation of a device by enabling the device to perform non-binary comparisons (i.e. match or no match) between different data samples. This enables the device to quantify a degree of similarity between different data samples. This increases the flexibility of the device to work with data samples having different data types and/or formats, and also increases the speed and performance of the device when performing operations using data samples. These technical advantages and other improvements to the device are described in more detail throughout the disclosure.

In one embodiment, the system is configured to use binary integers as categorical numbers rather than ordinal numbers which enables the system to determine how similar a data sample is to other data samples. Categorical numbers provide information about similar or dissimilar different data samples are from each other. For example, categorical numbers can be used in facial recognition applications to represent different images of faces and/or features of the faces. The system provides a technical advantage by allowing the system to assign correlithm objects represented by categorical numbers to different data samples based on how similar they are to other data samples. As an example, the system is able to assign correlithm objects to different images of people such that the correlithm objects can be directly used to determine how similar the people in the images are to each other. In other words, the system is able to use correlithm objects in facial recognition applications to quickly determine whether a captured image of a person matches any previously stored images without relying on conventional signal processing techniques.

Correlithm object processing systems use new types of data structures called correlithm objects that improve the way a device operates, for example, by enabling the device to perform non-binary data set comparisons and to quantify the similarity between different data samples. Correlithm objects are data structures designed to improve the way a device stores, retrieves, and compares data samples in memory. Correlithm objects also provide a data structure that is independent of the data type and format of the data samples they represent. Correlithm objects allow data samples to be directly compared regardless of their original data type and/or format.

A correlithm object processing system uses a combination of a sensor table, a node table, and/or an actor table to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures.

In addition, correlithm object processing system uses a combination of a sensor table, a node table, and/or an actor table to provide a particular manner for transforming data samples between ordinal number representations and correlithm objects in a correlithm object domain. Transforming data samples between ordinal number representations and correlithm objects involves fundamentally changing the data type of data samples between an ordinal number system and a categorical number system to achieve the previously described benefits of the correlithm object processing system.

Using correlithm objects allows the system or device to compare data samples (e.g. images) even when the input data sample does not exactly match any known or previously stored input values. For example, an input data sample that is an image may have different lighting conditions than the previously stored images. The differences in lighting conditions can make images of the same person appear different from each other. The device uses an unconventional configuration that implements a correlithm object processing system that uses the distance between the data samples which are represented as correlithm objects and other known data samples to determine whether the input data sample matches or is similar to the other known data samples. Implementing a correlithm object processing system fundamentally changes the device and the traditional data processing paradigm. Implementing the correlithm object processing system improves the operation of the device by enabling the device to perform non-binary comparisons of data samples. In other words, the device is able to determine how similar the data samples are to each other even when the data samples are not exact matches. In addition, the device is able to quantify how similar data samples are to one another. The ability to determine how similar data samples are to each other is unique and distinct from conventional computers that can only perform binary comparisons to identify exact matches.

A string correlithm object comprising a series of adjacent sub-string correlithm objects whose cores overlap with each other permits data values to be correlated with each other in n-dimensional space. The distance between adjacent sub-string correlithm objects can be selected to create a tighter or looser correlation among the elements of the string correlithm object in n-dimensional space. Thus, where data values have a pre-existing relationship with each other in the real-world, those relationships can be maintained in n-dimensional space if they are represented by sub-string correlithm objects of a string correlithm object. In addition, new data values can be represented by sub-string correlithm objects by interpolating the distance between those and other data values and representing that interpolation with sub-string correlithm objects of a string correlithm object in n-dimensional space. The ability to migrate these relationships between data values in the real world to relationships among correlithm objects provides a significant advance in the ability to record, store, and faithfully reproduce data within different computing environments.

The problems associated with comparing data sets and identifying matches based on the comparison are problems necessarily rooted in computer technologies. As described above, conventional systems are limited to a binary comparison that can only determine whether an exact match is found. Emulating a correlithm object processing system provides a technical solution that addresses problems associated with comparing data sets and identifying matches. Using correlithm objects to represent data samples fundamentally changes the operation of a device and how the device views data samples. By implementing a correlithm object processing system, the device can determine the distance between the data samples and other known data samples to determine whether the input data sample matches or is similar to the other known data samples. In addition, the device is able to determine a degree of similarity that quantifies how similar different data samples are to one another.

Existing machine learning systems are limited to processing only numeric values and lack the functionality to process non-numeric values such as text. Non-numeric values are not inherently quantifiable which means that they do not indicate any kind of relationship between other non-numeric values. For example, a text string is not associated with any particular numeric value and does not provide any information that can be used to indicate its relationship with respect to other text strings. Using sub-string correlithm objects enables machine learning models to process data values that comprise both numeric values (e.g. integers and floating-point numbers) and non-numeric values (e.g. text). The correlithm object processing system enables devices to transform non-numeric values into the correlithm object domain using sub-string correlithm objects which allows them to be processed using a process similar to one used for numeric values. This provides a technical improvement over existing systems which cannot process non-numeric data values.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

FIGS. 1-5 describe various embodiments of how a correlithm object processing system may be implemented or emulated in hardware, such as a special purpose computer. FIGS. 6-19 describe various embodiments of how a correlithm object processing system can generate and use string correlithm objects to record and faithfully playback data values. FIGS. 20-26 describe various embodiments of how a correlithm object processing system can implement machine learning and training machine learning models.

Figure 1:
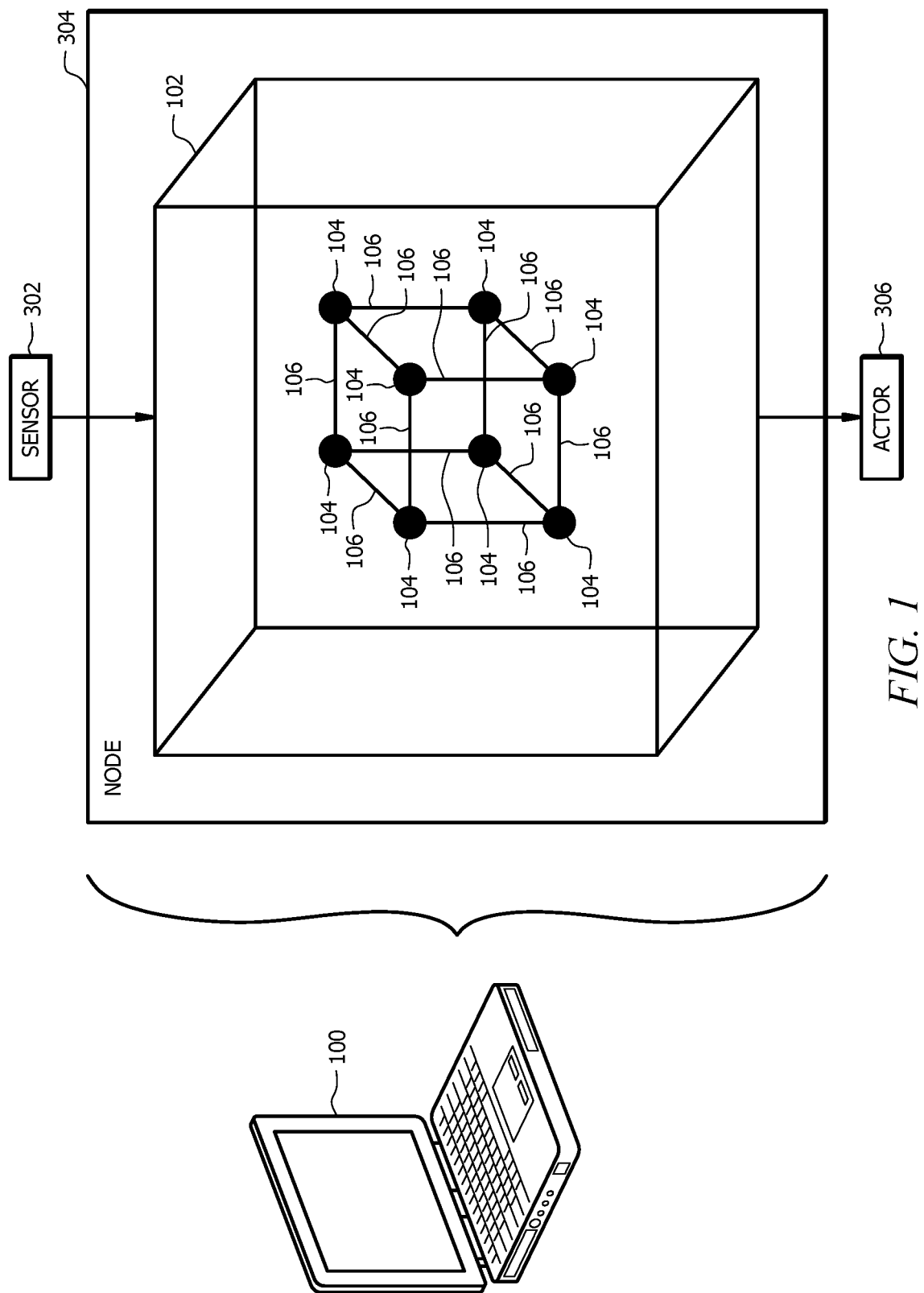
FIG. 1 is a schematic view of an embodiment of a special purpose computer implementing correlithm objects in an n-dimensional space.

FIG. 1 is a schematic view of an embodiment of a user device 100 implementing correlithm objects 104 in an n-dimensional space 102. Examples of user devices 100 include, but are not limited to, desktop computers, mobile phones, tablet computers, laptop computers, or other special purpose computer platform. The user device 100 is configured to implement or emulate a correlithm object processing system that uses categorical numbers to represent data samples as correlithm objects 104 in a high-dimensional space 102, for example a high-dimensional binary cube. Additional information about the correlithm object processing system is described in FIG. 3. Additional information about configuring the user device 100 to implement or emulate a correlithm object processing system is described in FIG. 5.

Conventional computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations. Ordinal based number systems only provide information about the sequence order of the numbers themselves based on their numeric values. Ordinal numbers do not provide any information about any other types of relationships for the data being represented by the numeric values, such as similarity. For example, when a conventional computer uses ordinal numbers to represent data samples (e.g. images or audio signals), different data samples are represented by different numeric values. The different numeric values do not provide any information about how similar or dissimilar one data sample is from another. In other words, conventional computers are only able to make binary comparisons of data samples which only results in determining whether the data samples match or do not match. Unless there is an exact match in ordinal number values, conventional systems are unable to tell if a data sample matches or is similar to any other data samples. As a result, conventional computers are unable to use ordinal numbers by themselves for determining similarity between different data samples, and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system.

In contrast to conventional systems, the user device 100 operates as a special purpose machine for implementing or emulating a correlithm object processing system. Implementing or emulating a correlithm object processing system improves the operation of the user device 100 by enabling the user device 100 to perform non-binary comparisons (i.e. match or no match) between different data samples. This enables the user device 100 to quantify a degree of similarity between different data samples. This increases the flexibility of the user device 100 to work with data samples having different data types and/or formats, and also increases the speed and performance of the user device 100 when performing operations using data samples. These improvements and other benefits to the user device 100 are described in more detail below and throughout the disclosure.

For example, the user device 100 employs the correlithm object processing system to allow the user device 100 to compare data samples even when the input data sample does not exactly match any known or previously stored input values. Implementing a correlithm object processing system fundamentally changes the user device 100 and the traditional data processing paradigm. Implementing the correlithm object processing system improves the operation of the user device 100 by enabling the user device 100 to perform non-binary comparisons of data samples. In other words, the user device 100 is able to determine how similar the data samples are to each other even when the data samples are not exact matches. In addition, the user device 100 is able to quantify how similar data samples are to one another. The ability to determine how similar data samples are to each other is unique and distinct from conventional computers that can only perform binary comparisons to identify exact matches.

The user device's 100 ability to perform non-binary comparisons of data samples also fundamentally changes traditional data searching paradigms. For example, conventional search engines rely on finding exact matches or exact partial matches of search tokens to identify related data samples. For instance, conventional text-based search engines are limited to finding related data samples that have text that exactly matches other data samples. These search engines only provide a binary result that identifies whether or not an exact match was found based on the search token. Implementing the correlithm object processing system improves the operation of the user device 100 by enabling the user device 100 to identify related data samples based on how similar the search token is to other data sample. These improvements result in increased flexibility and faster search time when using a correlithm object processing system. The ability to identify similarities between data samples expands the capabilities of a search engine to include data samples that may not have an exact match with a search token but are still related and similar in some aspects. The user device 100 is also able to quantify how similar data samples are to each other based on characteristics besides exact matches to the search token. Implementing the correlithm object processing system involves operating the user device 100 in an unconventional manner to achieve these technological improvements as well as other benefits described below for the user device 100.

Computing devices typically rely on the ability to compare data sets (e.g. data samples) to one another for processing. For example, in security or authentication applications a computing device is configured to compare an input of an unknown person to a data set of known people (or biometric information associated with these people). The problems associated with comparing data sets and identifying matches based on the comparison are problems necessarily rooted in computer technologies. As described above, conventional systems are limited to a binary comparison that can only determine whether an exact match is found. As an example, an input data sample that is an image of a person may have different lighting conditions than previously stored images. In this example, different lighting conditions can make images of the same person appear different from each other. Conventional computers are unable to distinguish between two images of the same person with different lighting conditions and two images of two different people without complicated signal processing. In both of these cases, conventional computers can only determine that the images are different. This is because conventional computers rely on manipulating ordinal numbers for processing.

In contrast, the user device 100 uses an unconventional configuration that uses correlithm objects to represent data samples. Using correlithm objects to represent data samples fundamentally changes the operation of the user device 100 and how the device views data samples. By implementing a correlithm object processing system, the user device 100 can determine the distance between the data samples and other known data samples to determine whether the input data sample matches or is similar to the other known data samples, as explained in detail below. Unlike the conventional computers described in the previous example, the user device 100 is able to distinguish between two images of the same person with different lighting conditions and two images of two different people by using correlithm objects 104. Correlithm objects allow the user device 100 to determine whether there are any similarities between data samples, such as between two images that are different from each other in some respects but similar in other respects. For example, the user device 100 is able to determine that despite different lighting conditions, the same person is present in both images.

In addition, the user device 100 is able to determine a degree of similarity that quantifies how similar different data samples are to one another. Implementing a correlithm object processing system in the user device 100 improves the operation of the user device 100 when comparing data sets and identifying matches by allowing the user device 100 to perform non-binary comparisons between data sets and to quantify the similarity between different data samples. In addition, using a correlithm object processing system results in increased flexibility and faster search times when comparing data samples or data sets. Thus, implementing a correlithm object processing system in the user device 100 provides a technical solution to a problem necessarily rooted in computer technologies.

The ability to implement a correlithm object processing system provides a technical advantage by allowing the system to identify and compare data samples regardless of whether an exact match has been previous observed or stored. In other words, using the correlithm object processing system the user device 100 is able to identify similar data samples to an input data sample in the absence of an exact match. This functionality is unique and distinct from conventional computers that can only identify data samples with exact matches.

Examples of data samples include, but are not limited to, images, files, text, audio signals, biometric signals, electric signals, or any other suitable type of data. A correlithm object 104 is a point in the n-dimensional space 102, sometimes called an "n-space." The value of represents the number of dimensions of the space. For example, an n-dimensional space 102 may be a 3-dimensional space, a 50-dimensional space, a 100-dimensional space, or any other suitable dimension space. The number of dimensions depends on its ability to support certain statistical tests, such as the distances between pairs of randomly chosen points in the space approximating a normal distribution. In some embodiments, increasing the number of dimensions in the n-dimensional space 102 modifies the statistical properties of the system to provide improved results. Increasing the number of dimensions increases the probability that a correlithm object 104 is similar to other adjacent correlithm objects 104. In other words, increasing the number of dimensions increases the correlation between how close a pair of correlithm objects 104 are to each other and how similar the correlithm objects 104 are to each other.

Correlithm object processing systems use new types of data structures called correlithm objects 104 that improve the way a device operates, for example, by enabling the device to perform non-binary data set comparisons and to quantify the similarity between different data samples. Correlithm objects 104 are data structures designed to improve the way a device stores, retrieves, and compares data samples in memory. Unlike conventional data structures, correlithm objects 104 are data structures where objects can be expressed in a high-dimensional space such that distance 106 between points in the space represent the similarity between different objects or data samples. In other words, the distance 106 between a pair of correlithm objects 104 in the n-dimensional space 102 indicates how similar the correlithm objects 104 are from each other and the data samples they represent. Correlithm objects 104 that are close to each other are more similar to each other than correlithm objects 104 that are further apart from each other. For example, in a facial recognition application, correlithm objects 104 used to represent images of different types of glasses may be relatively close to each other compared to correlithm objects 104 used to represent images of other features such as facial hair. An exact match between two data samples occurs when their corresponding correlithm objects 104 are the same or have no distance between them. When two data samples are not exact matches but are similar, the distance between their correlithm objects 104 can be used to indicate their similarities. In other words, the distance 106 between correlithm objects 104 can be used to identify both data samples that exactly match each other as well as data samples that do not match but are similar. This feature is unique to a correlithm processing system and is unlike conventional computers that are unable to detect when data samples are different but similar in some aspects.

Correlithm objects 104 also provide a data structure that is independent of the data type and format of the data samples they represent. Correlithm objects 104 allow data samples to be directly compared regardless of their original data type and/or format. In some instances, comparing data samples as correlithm objects 104 is computationally more efficient and faster than comparing data samples in their original format. For example, comparing images using conventional data structures involves significant amounts of image processing which is time consuming and consumes processing resources. Thus, using correlithm objects 104 to represent data samples provides increased flexibility and improved performance compared to using other conventional data structures.

In one embodiment, correlithm objects 104 may be represented using categorical binary strings. The number of bits used to represent the correlithm object 104 corresponds with the number of dimensions of the n-dimensional space 102 where the correlithm object 102 is located. For example, each correlithm object 104 may be uniquely identified using a 64-bit string in a 64-dimensional space 102. As another example, each correlithm object 104 may be uniquely identified using a 10-bit string in a 10-dimensional space 102. In other examples, correlithm objects 104 can be identified using any other suitable number of bits in a string that corresponds with the number of dimensions in the n-dimensional space 102.

In this configuration, the distance 106 between two correlithm objects 104 can be determined based on the differences between the bits of the two correlithm objects 104. In other words, the distance 106 between two correlithm objects can be determined based on how many individual bits differ between the correlithm objects 104. The distance 106 between two correlithm objects 104 can be computed using Hamming distance or any other suitable technique.

As an example using a 10-dimensional space 102, a first correlithm object 104 is represented by a first 10-bit string (1001011011) and a second correlithm object 104 is represented by a second 10-bit string (1000011011). The Hamming distance corresponds with the number of bits that differ between the first correlithm object 104 and the second correlithm object 104. In other words, the Hamming distance between the first correlithm object 104 and the second correlithm object 104 can be computed as follows:

$$1001011011$$
$$1000011011$$
$$\overline{\phantom{0000000000}}$$
$$0001000000$$

In this example, the Hamming distance is equal to one because only one bit differs between the first correlithm object 104 and the second correlithm object. As another example, a third correlithm object 104 is represented by a third 10-bit string (0110100100). In this example, the Hamming distance between the first correlithm object 104 and the third correlithm object 104 can be computed as follows:

$$1001011011$$
$$0110100100$$
$$\overline{\phantom{0000000000}}$$
$$1111111111$$

The Hamming distance is equal to ten because all of the bits are different between the first correlithm object 104 and the third correlithm object 104. In the previous example, a Hamming distance equal to one indicates that the first correlithm object 104 and the second correlithm object 104 are close to each other in the n-dimensional space 102, which means they are similar to each other. In the second example, a Hamming distance equal to ten indicates that the first correlithm object 104 and the third correlithm object 104 are further from each other in the n-dimensional space 102 and are less similar to each other than the first correlithm object 104 and the second correlithm object 104. In other words, the similarity between a pair of correlithm objects can be readily determined based on the distance between the pair correlithm objects.

As another example, the distance between a pair of correlithm objects 104 can be determined by performing an XOR operation between the pair of correlithm objects 104 and counting the number of logical high values in the binary string. The number of logical high values indicates the number of bits that are different between the pair of correlithm objects 104 which also corresponds with the Hamming distance between the pair of correlithm objects 104.

In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

The user device 100 is configured to implement or emulate a correlithm object processing system that comprises one or more sensors 302, nodes 304, and/or actors 306 in order to convert data samples between real world values or representations and to correlithm objects 104 in a correlithm object domain. Sensors 302 are generally configured to convert real world data samples to the correlithm object domain. Nodes 304 are generally configured to process or perform various operations on correlithm objects in the correlithm object domain. Actors 306 are generally configured to convert correlithm objects 104 into real world values or representations. Additional information about sensors 302, nodes 304, and actors 306 is described in FIG. 3.

Performing operations using correlithm objects 104 in a correlithm object domain allows the user device 100 to identify relationships between data samples that cannot be identified using conventional data processing systems. For example, in the correlithm object domain, the user device 100 is able to identify not only data samples that exactly match an input data sample, but also other data samples that have similar characteristics or features as the input data samples. Conventional computers are unable to identify these types of relationships readily. Using correlithm objects 104 improves the operation of the user device 100 by enabling the user device 100 to efficiently process data samples and identify relationships between data samples without relying on signal processing techniques that require a significant amount of processing resources. These benefits allow the user device 100 to operate more efficiently than conventional computers by reducing the amount of processing power and resources that are needed to perform various operations.

Figure 2:
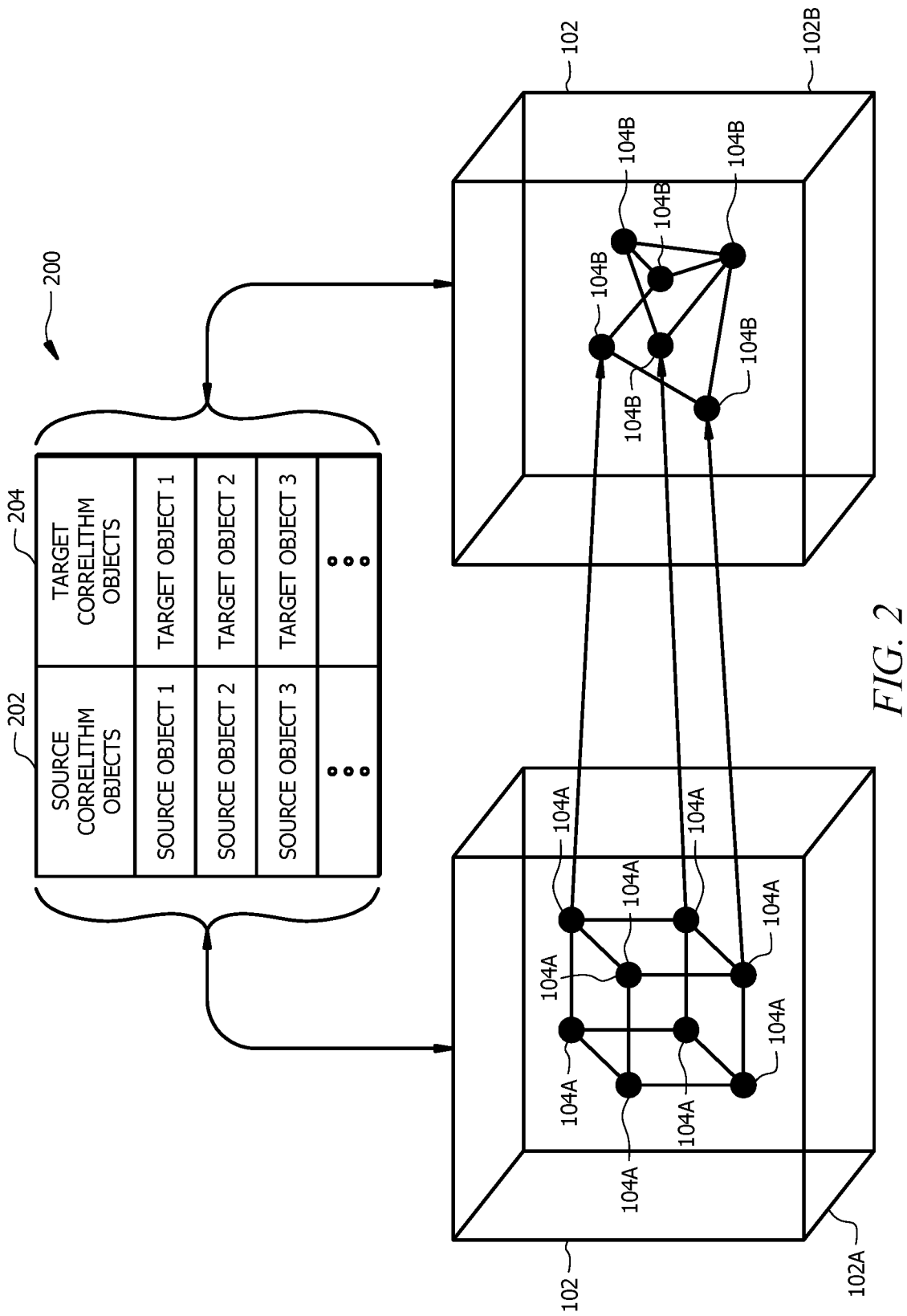
FIG. 2 is a perspective view of an embodiment of a mapping between correlithm objects in different n-dimensional spaces.

FIG. 2 is a schematic view of an embodiment of a mapping between correlithm objects 104 in different n-dimensional spaces 102. When implementing a correlithm object processing system, the user device 100 performs operations within the correlithm object domain using correlithm objects 104 in different n-dimensional spaces 102. As an example, the user device 100 may convert different types of data samples having real world values into correlithm objects 104 in different n-dimensional spaces 102. For instance, the user device 100 may convert data samples of text into a first set of correlithm objects 104 in a first n-dimensional space 102 and data samples of audio samples as a second set of correlithm objects 104 in a second n-dimensional space 102. Conventional systems require data samples to be of the same type and/or format to perform any kind of operation on the data samples. In some instances, some types of data samples cannot be compared because there is no common format available. For example, conventional computers are unable to compare data samples of images and data samples of audio samples because there is no common format. In contrast, the user device 100 implementing a correlithm object processing system is able to compare and perform operations using correlithm objects 104 in the correlithm object domain regardless of the type or format of the original data samples.

In FIG. 2, a first set of correlithm objects 104A are defined within a first n-dimensional space 102A and a second set of correlithm objects 104B are defined within a second n-dimensional space 102B. The n-dimensional spaces may have the same number of dimensions or a different number of dimensions. For example, the first n-dimensional space 102A and the second n-dimensional space 102B may both be three dimensional spaces. As another example, the first n-dimensional space 102A may be a three-dimensional space and the second n-dimensional space 102B may be a nine dimensional space. Correlithm objects 104 in the first n-dimensional space 102A and second n-dimensional space 102B are mapped to each other. In other words, a correlithm object 104A in the first n-dimensional space 102A may reference or be linked with a particular correlithm object 104B in the second n-dimensional space 102B. The correlithm objects 104 may also be linked with and referenced with other correlithm objects 104 in other n-dimensional spaces 102.

In one embodiment, a data structure such as table 200 may be used to map or link correlithm objects 104 in different n-dimensional spaces 102. In some instances, table 200 is referred to as a node table. Table 200 is generally configured to identify a first plurality of correlithm objects 104 in a first n-dimensional space 102 and a second plurality of correlithm objects 104 in a second n-dimensional space 102. Each correlithm object 104 in the first n-dimensional space 102 is linked with a correlithm object 104 is the second n-dimensional space 102. For example, table 200 may be configured with a first column 202 that lists correlithm objects 104A as source correlithm objects and a second column 204 that lists corresponding correlithm objects 104B as target correlithm objects. In other examples, table 200 may be configured in any other suitable manner or may be implemented using any other suitable data structure. In some embodiments, one or more mapping functions may be used to convert between a correlithm object 104 in a first n-dimensional space and a correlithm object 104 is a second n-dimensional space.

Figure 3:
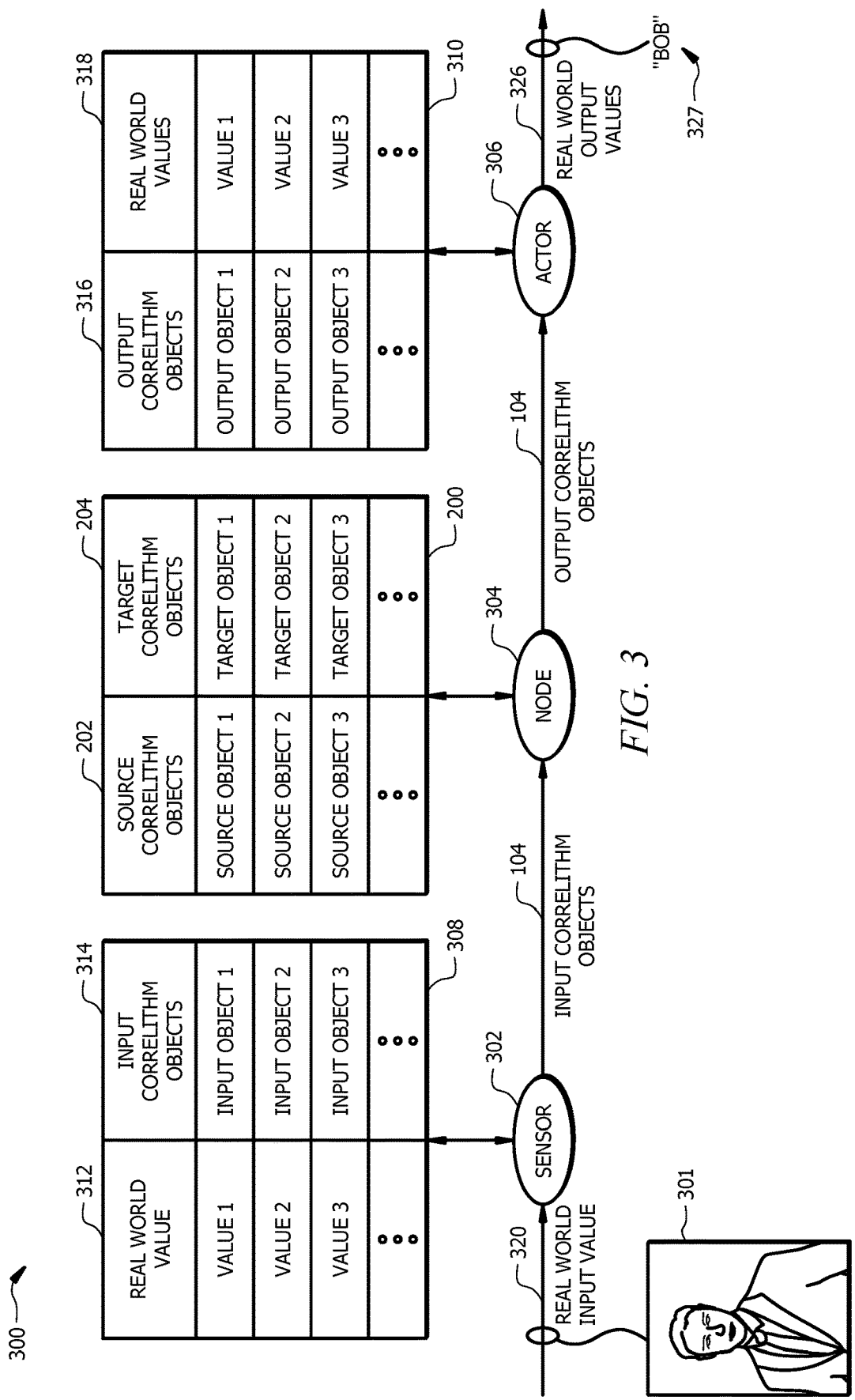
FIG. 3 is a schematic view of an embodiment of a correlithm object processing system.

FIG. 3 is a schematic view of an embodiment of a correlithm object processing system 300 that is implemented by a user device 100 to perform operations using correlithm objects 104. The system 300 generally comprises a sensor 302, a node 304, and an actor 306. The system 300 may be configured with any suitable number and/or configuration of sensors 302, nodes 304, and actors 306. An example of the system 300 in operation is described in FIG. 4. In one embodiment, a sensor 302, a node 304, and an actor 306 may all be implemented on the same device (e.g. user device 100). In other embodiments, a sensor 302, a node 304, and an actor 306 may each be implemented on different devices in signal communication with each other for example over a network. In other embodiments, different devices may be configured to implement any combination of sensors 302, nodes 304, and actors 306.

Sensors 302 serve as interfaces that allow a user device 100 to convert real world data samples into correlithm objects 104 that can be used in the correlithm object domain. Sensors 302 enable the user device 100 to compare and perform operations using correlithm objects 104 regardless of the data type or format of the original data sample. Sensors 302 are configured to receive a real-world value 320 representing a data sample as an input, to determine a correlithm object 104 based on the real world value 320, and to output the correlithm object 104. For example, the sensor 302 may receive an image 301 of a person and output a correlithm object 322 to the node 304 or actor 306. In one embodiment, sensors 302 are configured to use sensor tables 308 that link a plurality of real world values with a plurality of correlithm objects 104 in an n-dimensional space 102. Real world values are any type of signal, value, or representation of data samples. Examples of real world values include, but are not limited to, images, pixel values, text, audio signals, electrical signals, and biometric signals. As an example, a sensor table 308 may be configured with a first column 312 that lists real world value entries corresponding with different images and a second column 314 that lists corresponding correlithm objects 104 as input correlithm objects. In other examples, sensor tables 308 may be configured in any other suitable manner or may be implemented using any other suitable data structure. In some embodiments, one or more mapping functions may be used to translate between a real-world value 320 and a correlithm object 104 in an n-dimensional space. Additional information for implementing or emulating a sensor 302 in hardware is described in FIG. 5.

Nodes 304 are configured to receive a correlithm object 104 (e.g. an input correlithm object 104), to determine another correlithm object 104 based on the received correlithm object 104, and to output the identified correlithm object 104 (e.g. an output correlithm object 104). In one embodiment, nodes 304 are configured to use node tables 200 that link a plurality of correlithm objects 104 from a first n-dimensional space 102 with a plurality of correlithm objects 104 in a second n-dimensional space 102. A node table 200 may be configured similar to the table 200 described in FIG. 2. Additional information for implementing or emulating a node 304 in hardware is described in FIG. 5.

Actors 306 serve as interfaces that allow a user device 100 to convert correlithm objects 104 in the correlithm object domain back to real world values or data samples. Actors 306 enable the user device 100 to convert from correlithm objects 104 into any suitable type of real world value. Actors 306 are configured to receive a correlithm object 104 (e.g. an output correlithm object 104), to determine a real-world output value 326 based on the received correlithm object 104, and to output the real-world output value 326. The real-world output value 326 may be a different data type or representation of the original data sample. As an example, the real-world input value 320 may be an image 301 of a person and the resulting real-world output value 326 may be text 327 and/or an audio signal identifying the person. In one embodiment, actors 306 are configured to use actor tables 310 that link a plurality of correlithm objects 104 in an n-dimensional space 102 with a plurality of real world values. As an example, an actor table 310 may be configured with a first column 316 that lists correlithm objects 104 as output correlithm objects and a second column 318 that lists real world values. In other examples, actor tables 310 may be configured in any other suitable manner or may be implemented using any other suitable data structure. In some embodiments, one or more mapping functions may be employed to translate between a correlithm object 104 in an n-dimensional space and a real-world output value 326. Additional information for implementing or emulating an actor 306 in hardware is described in FIG. 5.

A correlithm object processing system 300 uses a combination of a sensor table 308, a node table 200, and/or an actor table 310 to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures. Conventional systems require data samples to be of the same type and/or format in order to perform any kind of operation on the data samples. In some instances, some types of data samples are incompatible with each other and cannot be compared because there is no common format available. For example, conventional computers are unable to compare data samples of images with data samples of audio samples because there is no common format available. In contrast, a device implementing a correlithm object processing system uses a combination of a sensor table 308, a node table 200, and/or an actor table 310 to compare and perform operations using correlithm objects 104 in the correlithm object domain regardless of the type or format of the original data samples. The correlithm object processing system 300 uses a combination of a sensor table 308, a node table 200, and/or an actor table 310 as a specific set of rules that provides a particular solution to dealing with different types of data samples and allows devices to perform operations on different types of data samples using correlithm objects 104 in the correlithm object domain. In some instances, comparing data samples as correlithm objects 104 is computationally more efficient and faster than comparing data samples in their original format. Thus, using correlithm objects 104 to represent data samples provides increased flexibility and improved performance compared to using other conventional data structures. The specific set of rules used by the correlithm object processing system 300 go beyond simply using routine and conventional activities in order to achieve this new functionality and performance improvements.

In addition, correlithm object processing system 300 uses a combination of a sensor table 308, a node table 200, and/or an actor table 310 to provide a particular manner for transforming data samples between ordinal number representations and correlithm objects 104 in a correlithm object domain. For example, the correlithm object processing system 300 may be configured to transform a representation of a data sample into a correlithm object 104, to perform various operations using the correlithm object 104 in the correlithm object domain, and to transform a resulting correlithm object 104 into another representation of a data sample. Transforming data samples between ordinal number representations and correlithm objects 104 involves fundamentally changing the data type of data samples between an ordinal number system and a categorical number system to achieve the previously described benefits of the correlithm object processing system 300.

Figure 4:
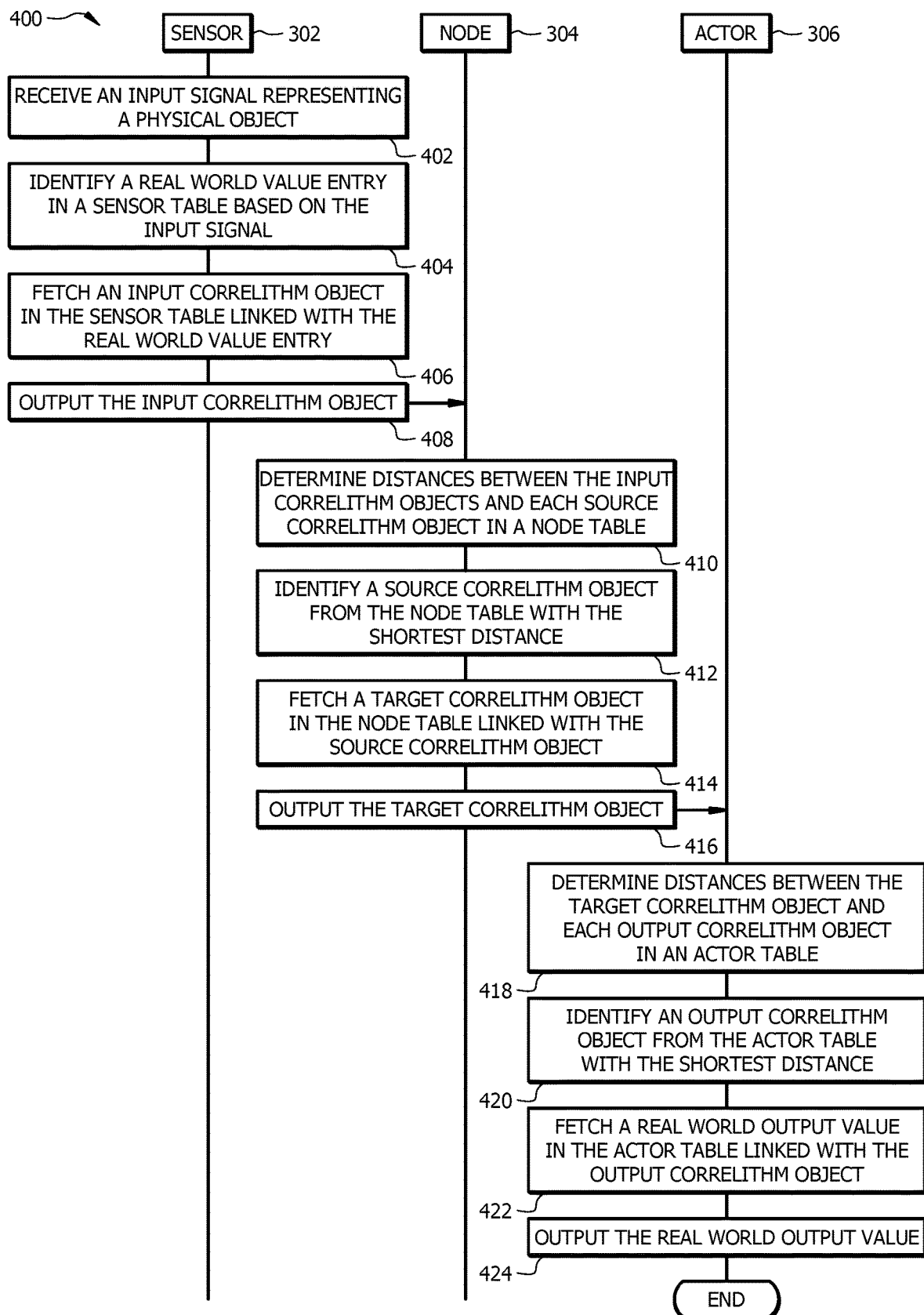
FIG. 4 is a protocol diagram of an embodiment of a correlithm object process flow.

FIG. 4 is a protocol diagram of an embodiment of a correlithm object process flow 400. A user device 100 implements process flow 400 to emulate a correlithm object processing system 300 to perform operations using correlithm object 104 such as facial recognition. The user device 100 implements process flow 400 to compare different data samples (e.g. images, voice signals, or text) to each other and to identify other objects based on the comparison.

Process flow 400 provides instructions that allows user devices 100 to achieve the improved technical benefits of a correlithm object processing system 300.

Conventional systems are configured to use ordinal numbers for identifying different data samples. Ordinal based number systems only provide information about the sequence order of numbers based on their numeric values, and do not provide any information about any other types of relationships for the data samples being represented by the numeric values such as similarity. In contrast, a user device 100 can implement or emulate the correlithm object processing system 300 which provides an unconventional solution that uses categorical numbers and correlithm objects 104 to represent data samples. For example, the system 300 may be configured to use binary integers as categorical numbers to generate correlithm objects 104 which enables the user device 100 to perform operations directly based on similarities between different data samples. Categorical numbers provide information about how similar different data sample are from each other. Correlithm objects 104 generated using categorical numbers can be used directly by the system 300 for determining how similar different data samples are from each other without relying on exact matches, having a common data type or format, or conventional signal processing techniques.

A non-limiting example is provided to illustrate how the user device 100 implements process flow 400 to emulate a correlithm object processing system 300 to perform facial recognition on an image to determine the identity of the person in the image. In other examples, the user device 100 may implement process flow 400 to emulate a correlithm object processing system 300 to perform voice recognition, text recognition, or any other operation that compares different objects.

At step 402, a sensor 302 receives an input signal representing a data sample. For example, the sensor 302 receives an image of person's face as a real-world input value 320. The input signal may be in any suitable data type or format. In one embodiment, the sensor 302 may obtain the input signal in real-time from a peripheral device (e.g. a camera). In another embodiment, the sensor 302 may obtain the input signal from a memory or database.

At step 404, the sensor 302 identifies a real-world value entry in a sensor table 308 based on the input signal. In one embodiment, the system 300 identifies a real-world value entry in the sensor table 308 that matches the input signal. For example, the real-world value entries may comprise previously stored images. The sensor 302 may compare the received image to the previously stored images to identify a real-world value entry that matches the received image. In one embodiment, when the sensor 302 does not find an exact match, the sensor 302 finds a real-world value entry that closest matches the received image.

At step 406, the sensor 302 identifies and fetches an input correlithm object 104 in the sensor table 308 linked with the real-world value entry. At step 408, the sensor 302 sends the identified input correlithm object 104 to the node 304. In one embodiment, the identified input correlithm object 104 is represented in the sensor table 308 using a categorical binary integer string. The sensor 302 sends the binary string representing to the identified input correlithm object 104 to the node 304.

At step 410, the node 304 receives the input correlithm object 104 and determines distances 106 between the input correlithm object 104 and each source correlithm object 104 in a node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using Hamming distance or any other suitable technique. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

At step 412, the node 304 identifies a source correlithm object 104 from the node table 200 with the shortest distance 106. A source correlithm object 104 with the shortest distance from the input correlithm object 104 is a correlithm object 104 either matches or most closely matches the received input correlithm object 104.

At step 414, the node 304 identifies and fetches a target correlithm object 104 in the node table 200 linked with the source correlithm object 104. At step 416, the node 304 outputs the identified target correlithm object 104 to the actor 306. In this example, the identified target correlithm object 104 is represented in the node table 200 using a categorical binary integer string. The node 304 sends the binary string representing to the identified target correlithm object 104 to the actor 306.

At step 418, the actor 306 receives the target correlithm object 104 and determines distances between the target correlithm object 104 and each output correlithm object 104 in an actor table 310. The actor 306 may compute the distances between the target correlithm object 104 and each output correlithm object 104 in an actor table 310 using a process similar to the process described in step 410.

At step 420, the actor 306 identifies an output correlithm object 104 from the actor table 310 with the shortest distance 106. An output correlithm object 104 with the shortest distance from the target correlithm object 104 is a correlithm object 104 either matches or most closely matches the received target correlithm object 104.

At step 422, the actor 306 identifies and fetches a real-world output value in the actor table 310 linked with the output correlithm object 104. The real-world output value may be any suitable type of data sample that corresponds with the original input signal. For example, the real-world output value may be text that indicates the name of the person in the image or some other identifier associated with the person in the image. As another example, the real-world output value may be an audio signal or sample of the name of the person in the image. In other examples, the real-world output value may be any other suitable real world signal or value that corresponds with the original input signal. The real-world output value may be in any suitable data type or format.

At step 424, the actor 306 outputs the identified real-world output value. In one embodiment, the actor 306 may output the real-world output value in real-time to a peripheral device (e.g. a display or a speaker). In one embodiment, the actor 306 may output the real-world output value to a memory or database. In one embodiment, the real-world output value is sent to another sensor 302. For example, the real-world output value may be sent to another sensor 302 as an input for another process.

Figure 5:
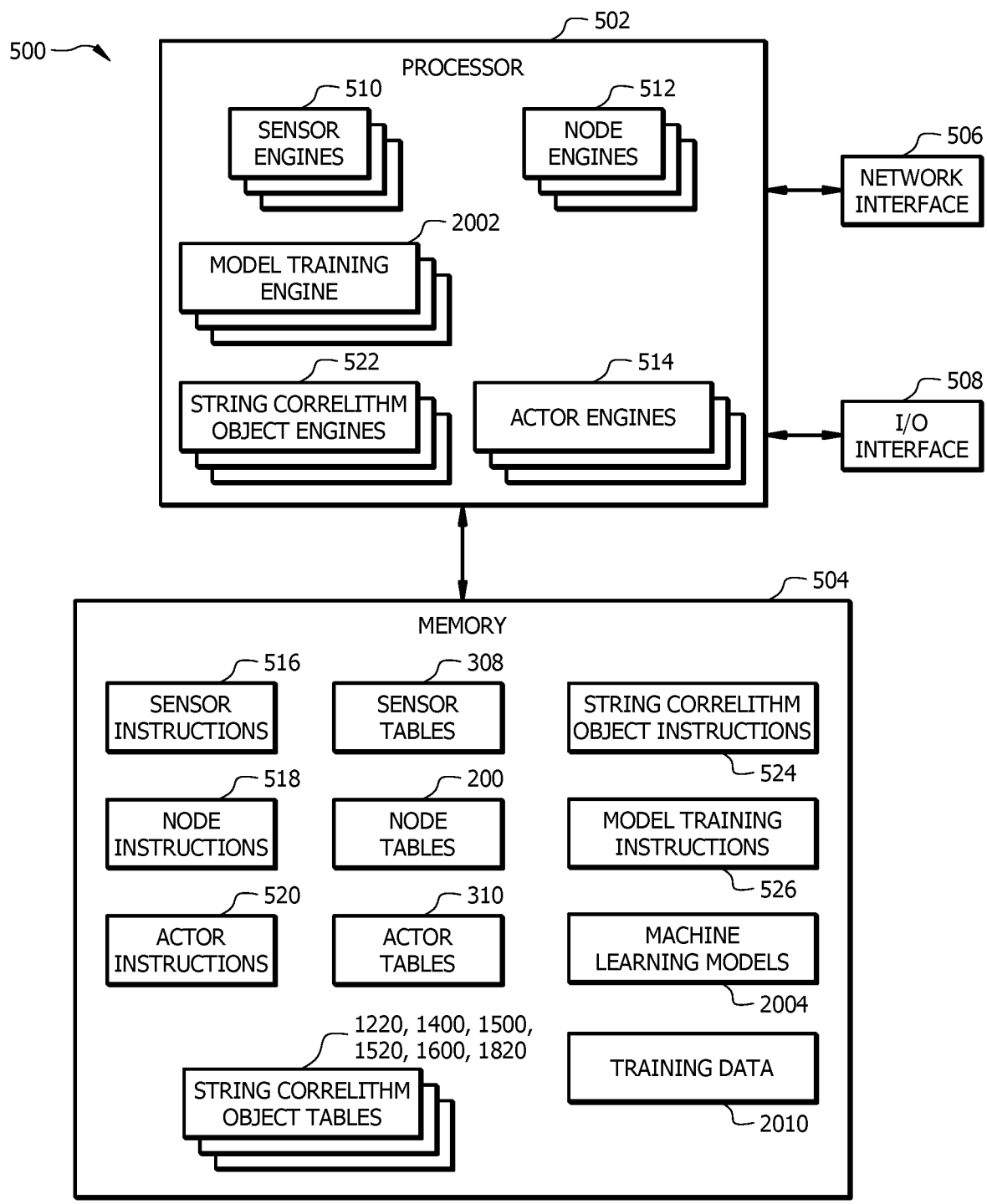
FIG. 5 is a schematic diagram of an embodiment a computer architecture for emulating a correlithm object processing system.

FIG. 5 is a schematic diagram of an embodiment of a computer architecture 500 for emulating a correlithm object processing system 300 in a user device 100. The computer architecture 500 comprises a processor 502, a memory 504, a network interface 506, and an input-output (I/O) interface 508. The computer architecture 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), graphics processing units (GPUs), or digital signal processors (DSPs). The processor 502 may be a programmable logic device, a microcontroller, a microprocessor, or any suitable combination of the preceding. The processor 502 is communicatively coupled to and in signal communication with the memory 204. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement sensor engines 510, node engines 512, actor engines 514, string correlithm object engine 522, and model training engines 2002. In an embodiment, the sensor engines 510, the node engines 512, the actor engines 514, the string correlithm object engine 522, and the model training engine 2002 are implemented using logic units, FPGAs, ASICs, DSPs, or any other suitable hardware. The sensor engines 510, the node engines 512, the actor engines 514, the string correlithm object engine 522, and model training engines 2002 are each configured to implement a specific set of rules or processes that provides an improved technological result.

In one embodiment, the sensor engine 510 is configured to receive a real-world value 320 as an input, to determine a correlithm object 104 based on the real-world value 320, and to output the correlithm object 104. An example of the sensor engine 510 in operation is described in FIG. 4.

In one embodiment, the node engine 512 is configured to receive a correlithm object 104 (e.g. an input correlithm object 104), to determine another correlithm object 104 based on the received correlithm object 104, and to output the identified correlithm object 104 (e.g. an output correlithm object 104). The node engine 512 is also configured to compute distances between pairs of correlithm objects 104. An example of the node engine 512 in operation is described in FIG. 4.

In one embodiment, the actor engine 514 is configured to receive a correlithm object 104 (e.g. an output correlithm object 104), to determine a real-world output value 326 based on the received correlithm object 104, and to output the real-world output value 326. An example of the actor engine 514 in operation is described in FIG. 4.

In one embodiment, string correlithm object engine 522 is configured to implement a string correlithm object generator 1200 and otherwise process string correlithm objects 602, as described, for example, in FIGS. 12-19.

In one embodiment, the model training engine 2002 is configured to identify boundaries, clusters, and centroids for a data set and to train a machine learning model 2004. Examples of the model training engine 2002 in operation are described in FIGS. 20-26.

The memory 504 comprises one or more non-transitory disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store sensor instructions 516, node instructions 518, actor instructions 520, sensor tables 308, node tables 200, actor tables 310, string correlithm object instructions 524, model training instructions 526, string correlithm object tables 1220, 1400, 1500, 1520, 1600, and 1820, machine learning models 2004, training data 2010, and/or any other data or instructions. The sensor instructions 516, the node instructions 518, the actor instructions 520, string correlithm object instructions 524, and model training instructions 526 comprise any suitable set of instructions, logic, rules, or code operable to execute the sensor engine 510, node engine 512, the actor engine 514, the string correlithm object engine 522, and the model training engine 2002, respectively.

The sensor tables 308, the node tables 200, and the actor tables 310 may be configured similar to the sensor tables 308, the node tables 200, and the actor tables 310 described in FIG. 3, respectively.

The network interface 506 is configured to enable wired and/or wireless communications. The network interface 506 is configured to communicate data with any other device or system. For example, the network interface 506 may be configured for communication with a modem, a switch, a router, a bridge, a server, or a client. The processor 502 is configured to send and receive data using the network interface 506.

The I/O interface 508 may comprise ports, transmitters, receivers, transceivers, or any other devices for transmitting and/or receiving data with peripheral devices as would be appreciated by one of ordinary skill in the art upon viewing this disclosure. For example, the I/O interface 508 may be configured to communicate data between the processor 502 and peripheral hardware such as a graphical user interface, a display, a mouse, a keyboard, a key pad, and a touch sensor (e.g. a touch screen).

Figure 6:
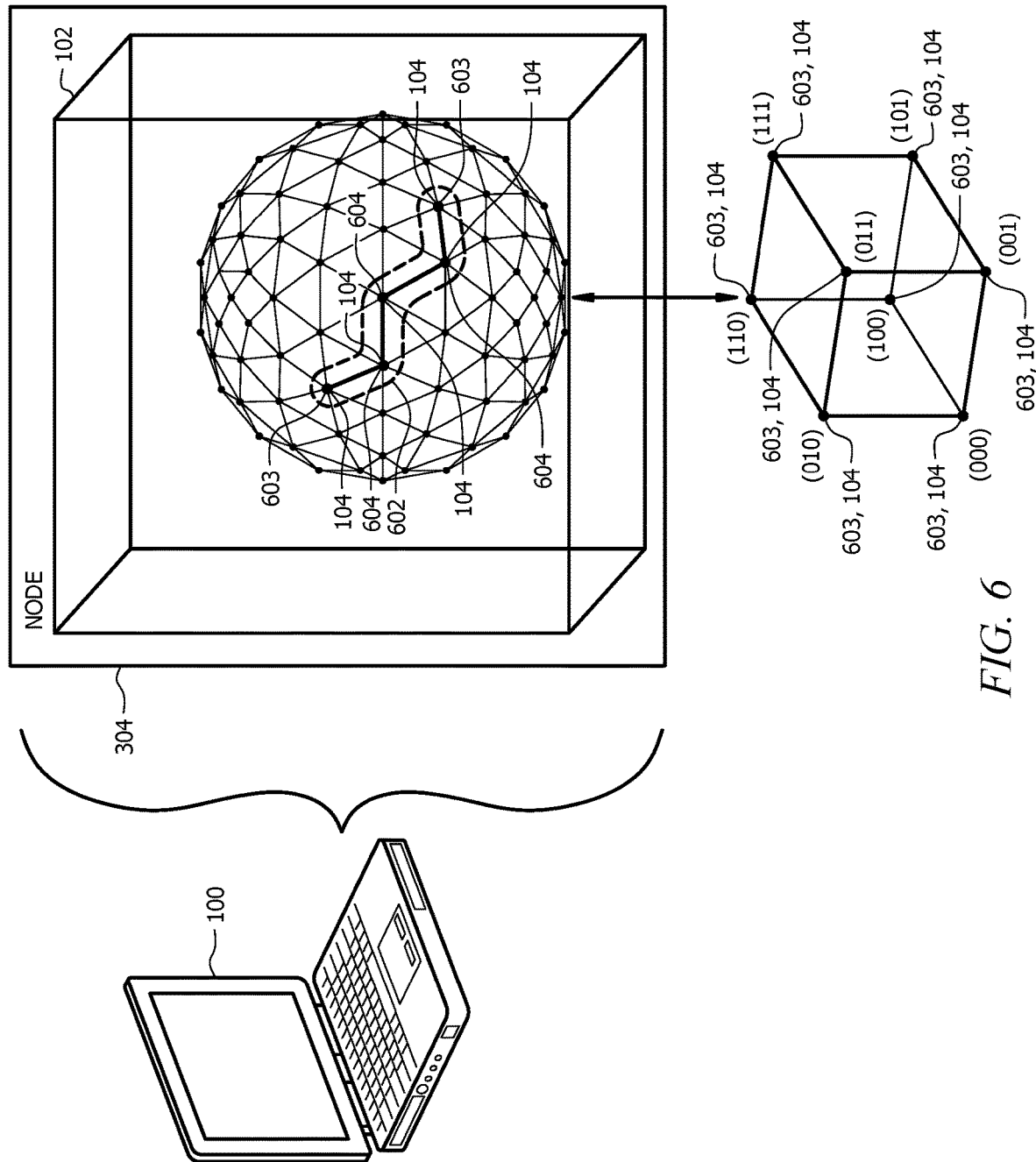
FIG. 6 illustrates an embodiment of how a string correlithm object may be implemented within a node by a device.
Figure 7:
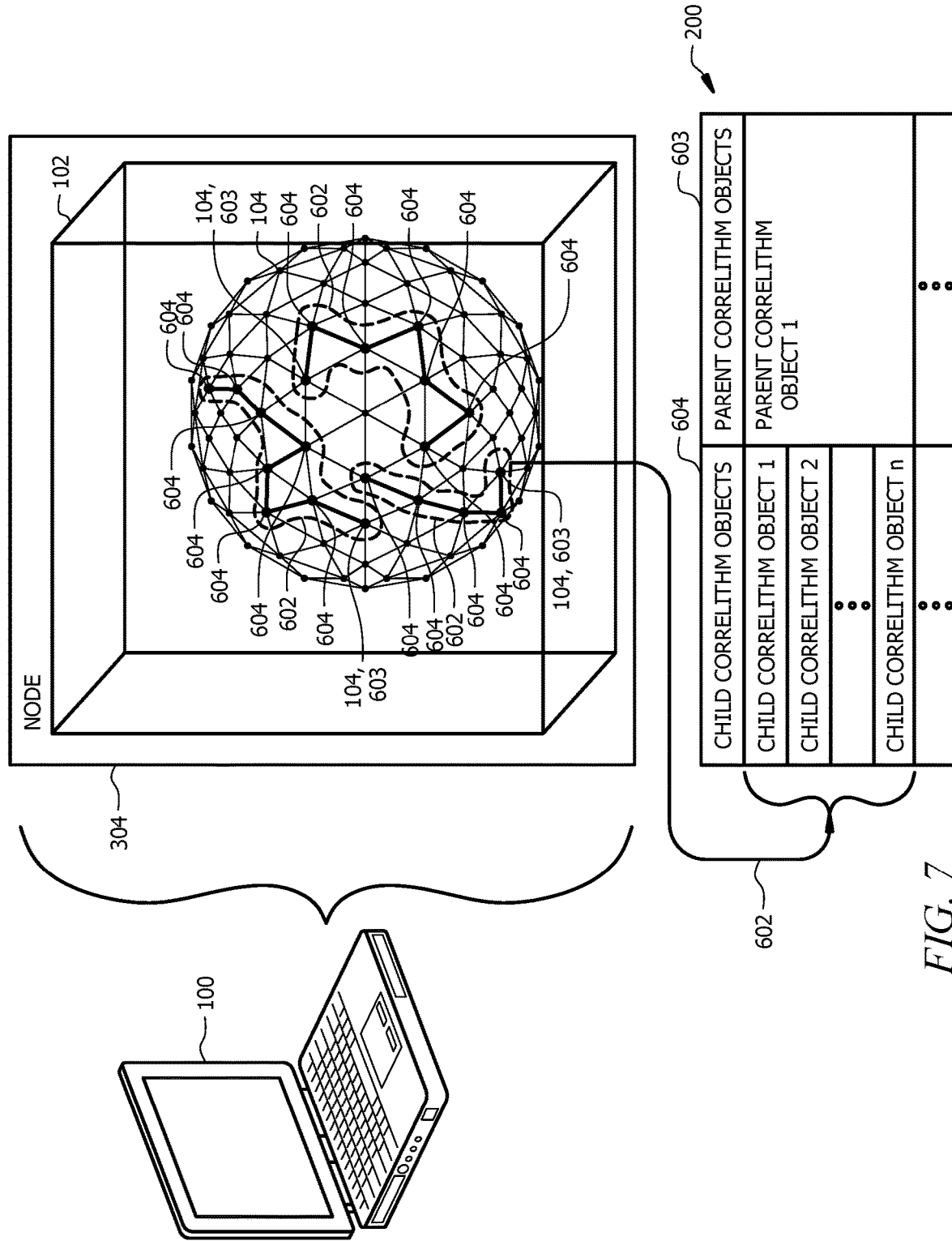
FIG. 7 illustrates another embodiment of how a string correlithm object may be implemented within a node by a device.

FIGS. 6 and 7 are schematic diagrams of an embodiment of a device 100 implementing string correlithm objects 602 for a correlithm object processing system 300. String correlithm objects 602 can be used by a correlithm object processing system 300 to embed higher orders of correlithm objects 104 within lower orders of correlithm objects 104. The order of a correlithm object 104 depends on the number of bits used to represent the correlithm object 104. The order of a correlithm object 104 also corresponds with the number of dimensions in the n-dimensional space 102 where the correlithm object 104 is located. For example, a correlithm object 104 represented by a 64-bit string is a higher order correlithm object 104 than a correlithm object 104 represented by 16-bit string.

Conventional computing systems rely on accurate data input and are unable to detect or correct for data input errors in real time. For example, a conventional computing device assumes a data stream is correct even when the data stream has bit errors. When a bit error occurs that leads to an unknown data value, the conventional computing device is unable to resolve the error without manual intervention. In contrast, string correlithm objects 602 enable a device 100 to perform operations such as error correction and interpolation within the correlithm object processing system 300. For example, higher order correlithm objects 104 can be used to associate an input correlithm object 104 with a lower order correlithm 104 when an input correlithm object does not correspond with a particular correlithm object 104 in an n-dimensional space 102. The correlithm object processing system 300 uses the embedded higher order correlithm objects 104 to define correlithm objects 104 between the lower order correlithm objects 104 which allows the device 100 to identify a correlithm object 104 in the lower order correlithm objects n-dimensional space 102 that corresponds with the input correlithm object 104. Using string correlithm objects 602, the correlithm object processing system 300 is able to interpolate and/or to compensate for errors (e.g. bit errors) which improve the functionality of the correlithm object processing system 300 and the operation of the device 100.

In some instances, string correlithm objects 602 may be used to represent a series of data samples or temporal data samples. For example, a string correlithm object 602 may be used to represent audio or video segments. In this example, media segments are represented by sequential correlithm objects that are linked together using a string correlithm object 602.

FIG. 6 illustrates an embodiment of how a string correlithm object 602 may be implemented within a node 304 by a device 100. In other embodiments, string correlithm objects 602 may be integrated within a sensor 302 or an actor 306. In 32-dimensional space 102 where correlithm objects 104 can be represented by a 32-bit string, the 32-bit string can be embedded and used to represent correlithm objects 104 in a lower order 3-dimensional space 102 which uses three bits. The 32-bit strings can be partitioned into three 12-bit portions, where each portion corresponds with one of the three bits in the 3-dimensional space 102. For example, the correlithm object 104 represented by the 3-bit binary value of 000 may be represented by a 32-bit binary string of zeros and the correlithm object represented by the binary value of 111 may be represented by a 32-bit string of all ones. As another example, the correlithm object 104 represented by the 3-bit binary value of 100 may be represented by a 32-bit binary string with 12 bits set to one followed by 24 bits set to zero. In other examples, string correlithm objects 602 can be used to embed any other combination and/or number of n-dimensional spaces 102.

In one embodiment, when a higher order n-dimensional space 102 is embedded in a lower order n-dimensional space 102, one or more correlithm objects 104 are present in both the lower order n-dimensional space 102 and the higher order n-dimensional space 102. Correlithm objects 104 that are present in both the lower order n-dimensional space 102 and the higher order n-dimensional space 102 may be referred to as parent correlithm objects 603. Correlithm objects 104 in the higher order n-dimensional space 102 may be referred to as child correlithm objects 604. In this example, the correlithm objects 104 in the 3-dimensional space 102 may be referred to as parent correlithm objects 603 while the correlithm objects 104 in the 32-dimensional space 102 may be referred to as child correlithm objects 604. In general, child correlithm objects 604 are represented by a higher order binary string than parent correlithm objects 603. In other words, the bit strings used to represent a child correlithm object 604 may have more bits than the bit strings used to represent a parent correlithm object 603. The distance between parent correlithm objects 603 may be referred to as a standard distance. The distance between child correlithm objects 604 and other child correlithm objects 604 or parent correlithm objects 603 may be referred to as a fractional distance which is less than the standard distance.

FIG. 7 illustrates another embodiment of how a string correlithm object 602 may be implemented within a node 304 by a device 100. In other embodiments, string correlithm objects 602 may be integrated within a sensor 302 or an actor 306. In FIG. 7, a set of correlithm objects 104 are shown within an n-dimensional space 102. In one embodiment, the correlithm objects 104 are equally spaced from adjacent correlithm objects 104. A string correlithm object 602 comprises a parent correlithm object 603 linked with one or more child correlithm objects 604. FIG. 7 illustrates three string correlithm objects 602 where each string correlithm object 602 comprises a parent correlithm object 603 linked with six child correlithm objects 603. In other examples, the n-dimensional space 102 may comprise any suitable number of correlithm objects 104 and/or string correlithm objects 602.

A parent correlithm object 603 may be a member of one or more string correlithm objects 602. For example, a parent correlithm object 603 may be linked with one or more sets of child correlithm objects 604 in a node table 200. In one embodiment, a child correlithm object 604 may only be linked with one parent correlithm object 603. String correlithm objects 602 may be configured to form a daisy chain or a linear chain of child correlithm objects 604. In one embodiment, string correlithm objects 602 are configured such that child correlithm objects 604 do not form loops where the chain of child correlithm objects 604 intersect with themselves. Each child correlithm objects 604 is less than the standard distance away from its parent correlithm object 603. The child correlithm objects 604 are equally spaced from other adjacent child correlithm objects 604.

In one embodiment, a data structure such as node table 200 may be used to map or link parent correlithm objects 603 with child correlithm objects 604. The node table 200 is generally configured to identify a plurality of parent correlithm objects 603 and one or more child correlithm objects 604 linked with each of the parent correlithm objects 603. For example, node table 200 may be configured with a first column that lists child correlithm objects 604 and a second column that lists parent correlithm objects 603. In other examples, the node table 200 may be configured in any other suitable manner or may be implemented using any other suitable data structure. In some embodiments, one or more mapping functions may be used to convert between a child correlithm object 604 and a parent correlithm object 603.

Figure 8:
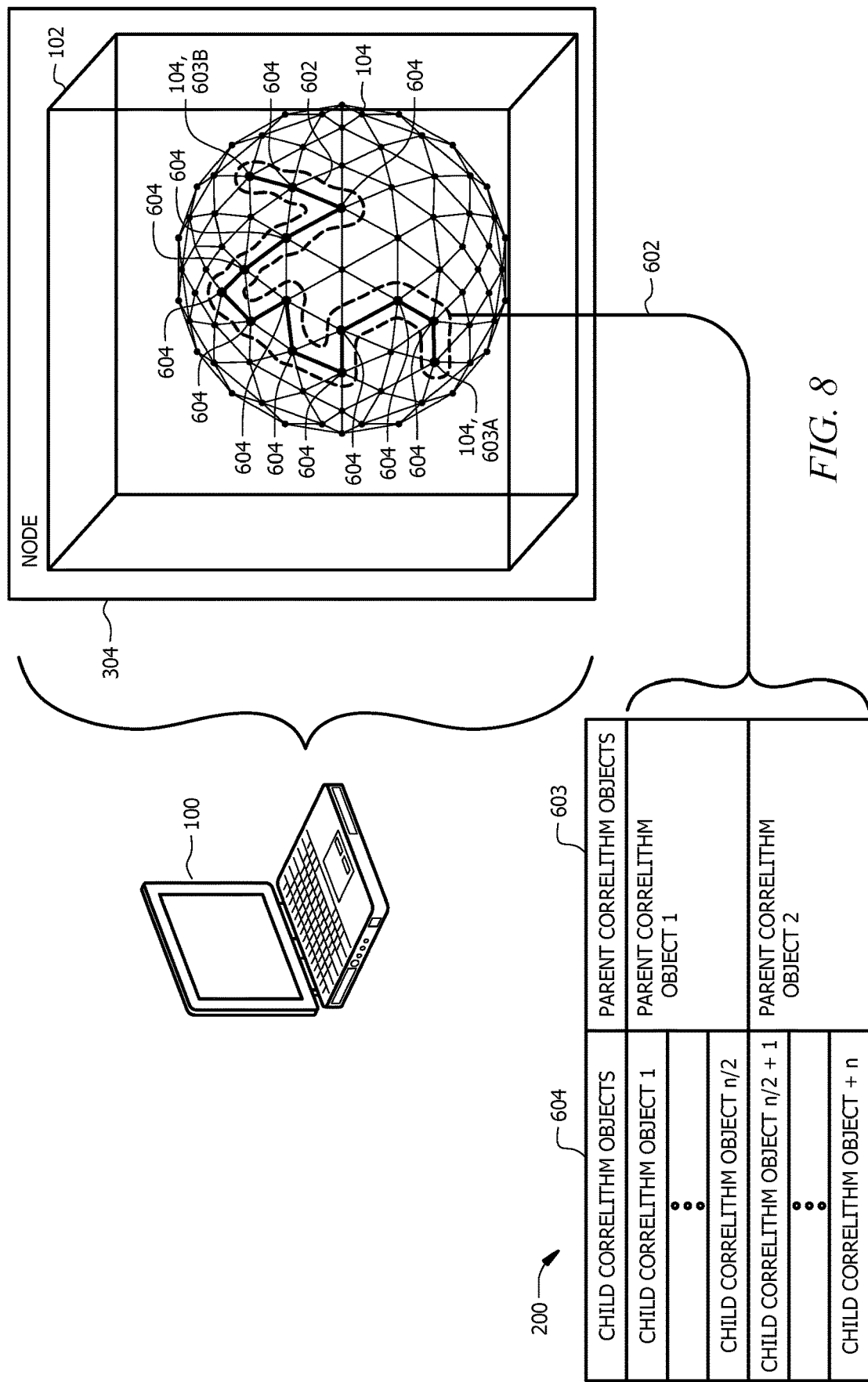
FIG. 8 is a schematic diagram of another embodiment of a device implementing string correlithm objects in a node for a correlithm object processing system.

FIG. 8 is a schematic diagram of another embodiment of a device 100 implementing string correlithm objects 602 in a node 304 for a correlithm object processing system 300. Previously in FIG. 7, a string correlithm object 602 comprised of child correlithm objects 604 that are adjacent to a parent correlithm object 603. In FIG. 8, string correlithm objects 602 comprise one or more child correlithm objects 604 in between a pair of parent correlithm objects 603. In this configuration, the string correlithm object 602 initially diverges from a first parent correlithm object 603A and then later converges toward a second parent correlithm object 603B. This configuration allows the correlithm object processing system 300 to generate a string correlithm object 602 between a particular pair of parent correlithm objects 603.

The string correlithm objects described in FIG. 8 allow the device 100 to interpolate value between a specific pair of correlithm objects 104 (i.e. parent correlithm objects 603). In other words, these types of string correlithm objects 602 allow the device 100 to perform interpolation between a set of parent correlithm objects 603. Interpolation between a set of parent correlithm objects 603 enables the device 100 to perform operations such as quantization which convert between different orders of correlithm objects 104.

In one embodiment, a data structure such as node table 200 may be used to map or link the parent correlithm objects 603 with their respective child correlithm objects 604. For example, node table 200 may be configured with a first column that lists child correlithm objects 604 and a second column that lists parent correlithm objects 603. In this example, a first portion of the child correlithm objects 604 is linked with the first parent correlithm object 603A and a second portion of the child correlithm objects 604 is linked with the second parent correlithm object 603B. In other examples, the node table 200 may be configured in any other suitable manner or may be implemented using any other suitable data structure. In some embodiments, one or more mapping functions may be used to convert between a child correlithm object 604 and a parent correlithm object 603.

Figure 9:
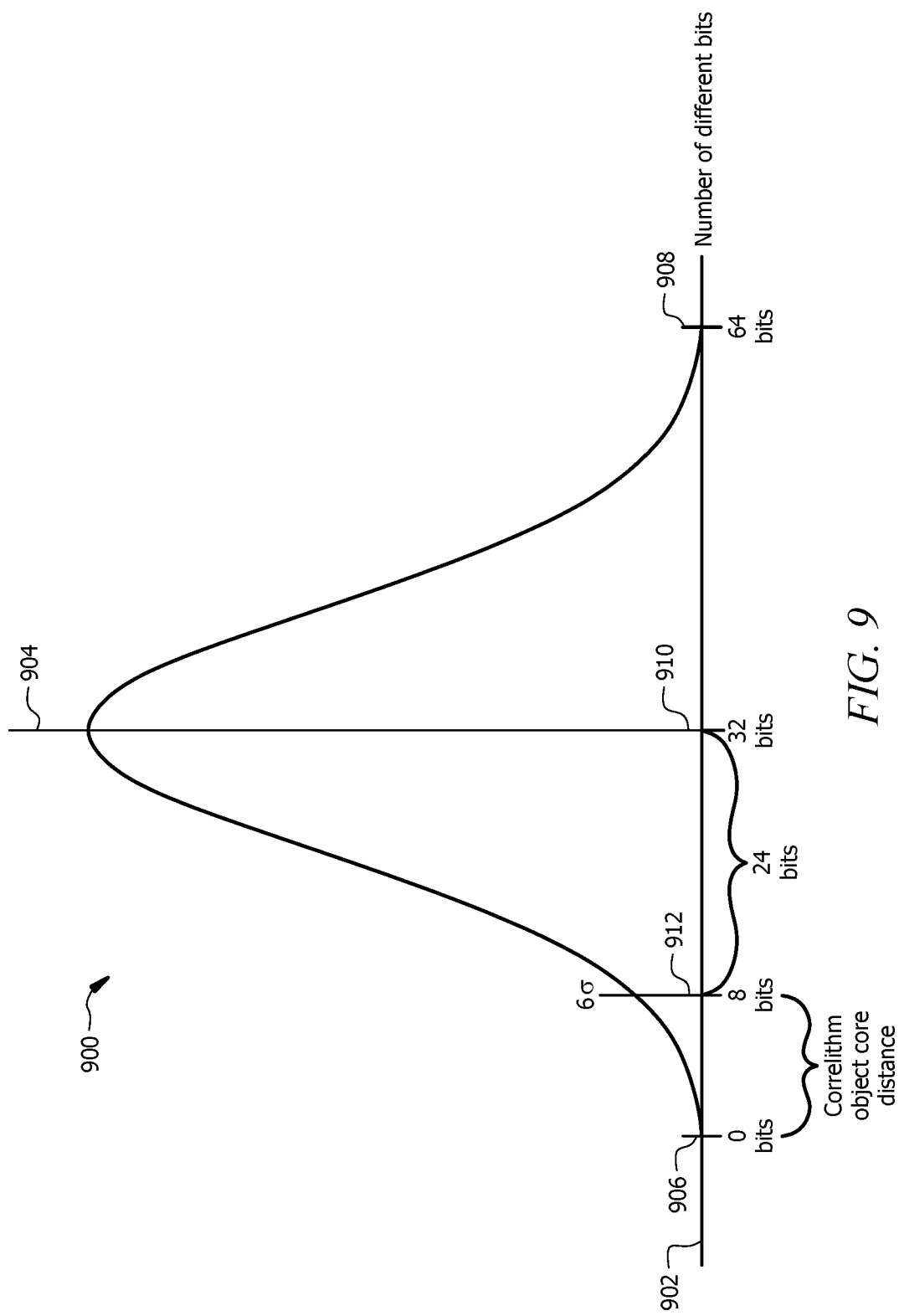
FIG. 9 is an embodiment of a graph of a probability distribution for matching a random correlithm object with a particular correlithm object.

FIG. 9 is an embodiment of a graph of a probability distribution 900 for matching a random correlithm object 104 with a particular correlithm object 104. Axis 902 indicates the number of bits that are different between a random correlithm object 104 with a particular correlithm object 104. Axis 904 indicates the probability associated with a particular number of bits being different between a random correlithm object 104 and a particular correlithm object 104.

As an example, FIG. 9 illustrates the probability distribution 900 for matching correlithm objects 104 in a 64-dimensional space 102. In one embodiment, the probability distribution 900 is approximately a Gaussian distribution. As the number of dimensions in the n-dimensional space 102 increases, the probability distribution 900 starts to shape more like an impulse response function. In other examples, the probability distribution 900 may follow any other suitable type of distribution.

Location 906 illustrates an exact match between a random correlithm object 104 with a particular correlithm object 104. As shown by the probability distribution 900, the probability of an exact match between a random correlithm object 104 with a particular correlithm object 104 is extremely low. In other words, when an exact match occurs the event is most likely deliberate and not a random occurrence.

Location 908 illustrates when all of the bits between the random correlithm object 104 with the particular correlithm object 104 are different. In this example, the random correlithm object 104 and the particular correlithm object 104 have 64 bits that are different from each other. As shown by the probability distribution 900, the probability of all the bits being different between the random correlithm object 104 and the particular correlithm object 104 is also extremely low.

Location 910 illustrates an average number of bits that are different between a random correlithm object 104 and the particular correlithm object 104. In general, the average number of different bits between the random correlithm object 104 and the particular correlithm object 104 is equal to $$\frac{n}{2},$$

where 'n' is the number of dimensions in the n-dimensional space 102. In this example, the average number of bits that are different between a random correlithm object 104 and the particular correlithm object 104 is 32 bits.

Location 912 illustrates a cutoff region that defines a core distance for a correlithm object core. The correlithm object 104 at location 906 may also be referred to as a root correlithm object for a correlithm object core. The core distance defines the maximum number of bits that can be different between a correlithm object 104 and the root correlithm object to be considered within a correlithm object core for the root correlithm object. In other words, the core distance defines the maximum number of hops away a correlithm object 104 can be from a root correlithm object to be considered a part of the correlithm object core for the root correlithm object. Additional information about a correlithm object core is described in FIG. 10. In this example, the cutoff region defines a core distance equal to six standard deviations away from the average number of bits that are different between a random correlithm object 104 and the particular correlithm object 104. In general, the standard deviation is equal to $$\sqrt{\frac{n}{4}},$$

where 'n' is the number of dimensions in the n-dimensional space 102. In this example, the standard deviation of the 64-dimensional space 102 is equal to 4 bits. This means the cutoff region (location 912) is located 24 bits away from location 910 which is 8 bits away from the root correlithm object at location 906. In other words, the core distance is equal to 8 bits. This means that the cutoff region at location 912 indicates that the core distance for a correlithm object core includes correlithm objects 104 that have up to 8 bits different then the root correlithm object or are up to 8 hops away from the root correlithm object. In other examples, the cutoff region that defines the core distance may be equal any other suitable value. For instance, the cutoff region may be set to 2, 4, 8, 10, 12, or any other suitable number of standard deviations away from location 910.

Figure 10:
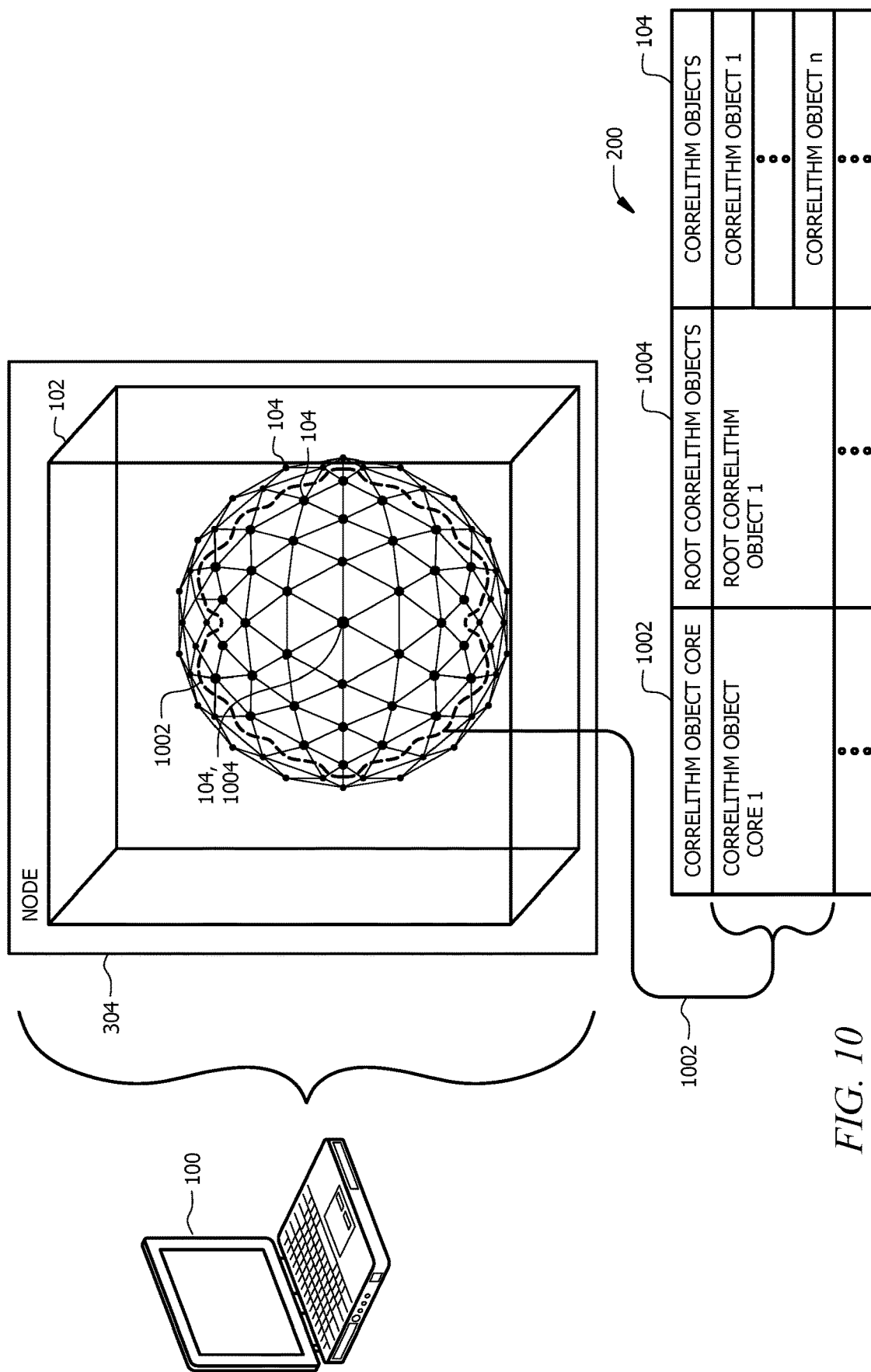
FIG. 10 is a schematic diagram of an embodiment of a device implementing a correlithm object core in a node for a correlithm object processing system.

FIG. 10 is a schematic diagram of an embodiment of a device 100 implementing a correlithm object core 1002 in a node 304 for a correlithm object processing system 300. In other embodiments, correlithm object cores 1002 may be integrated with a sensor 302 or an actor 306. Correlithm object cores 1002 can be used by a correlithm object processing system 300 to classify or group correlithm objects 104 and/or the data samples they represent. For example, a set of correlithm objects 104 can be grouped together by linking them with a correlithm object core 1402. The correlithm object core 1002 identifies the class or type associated with the set of correlithm objects 104.

In one embodiment, a correlithm object core 1002 comprises a root correlithm object 1004 that is linked with a set of correlithm objects 104. The set of correlithm objects 104 that are linked with the root correlithm object 1004 are the correlithm objects 104 which are located within the core distance of the root correlithm object 1004. The set of correlithm objects 104 are linked with only one root correlithm object 1004. The core distance can be computed using a process similar to the process described in FIG. 9. For example, in a 64-dimensional space 102 with a core distance defined at six sigma (i.e. six standard deviations), the core distance is equal to 8-bits. This means that correlithm objects 104 within up to eight hops away from the root correlithm object 1004 are members of the correlithm object core 1002 for the root correlithm object 1004.

In one embodiment, a data structure such as node table 200 may be used to map or link root correlithm objects 1004 with sets of correlithm objects 104. The node table 200 is generally configured to identify a plurality of root correlithm objects 1004 and correlithm objects 104 linked with the root correlithm objects 1004. For example, node table 200 may be configured with a first column that lists correlithm object cores 1002, a second column that lists root correlithm objects 1004, and a third column that lists correlithm objects 104. In other examples, the node table 200 may be configured in any other suitable manner or may be implemented using any other suitable data structure. In some embodiments, one or more mapping functions may be used to convert between correlithm objects 104 and a root correlithm object 1004.

Figure 11:
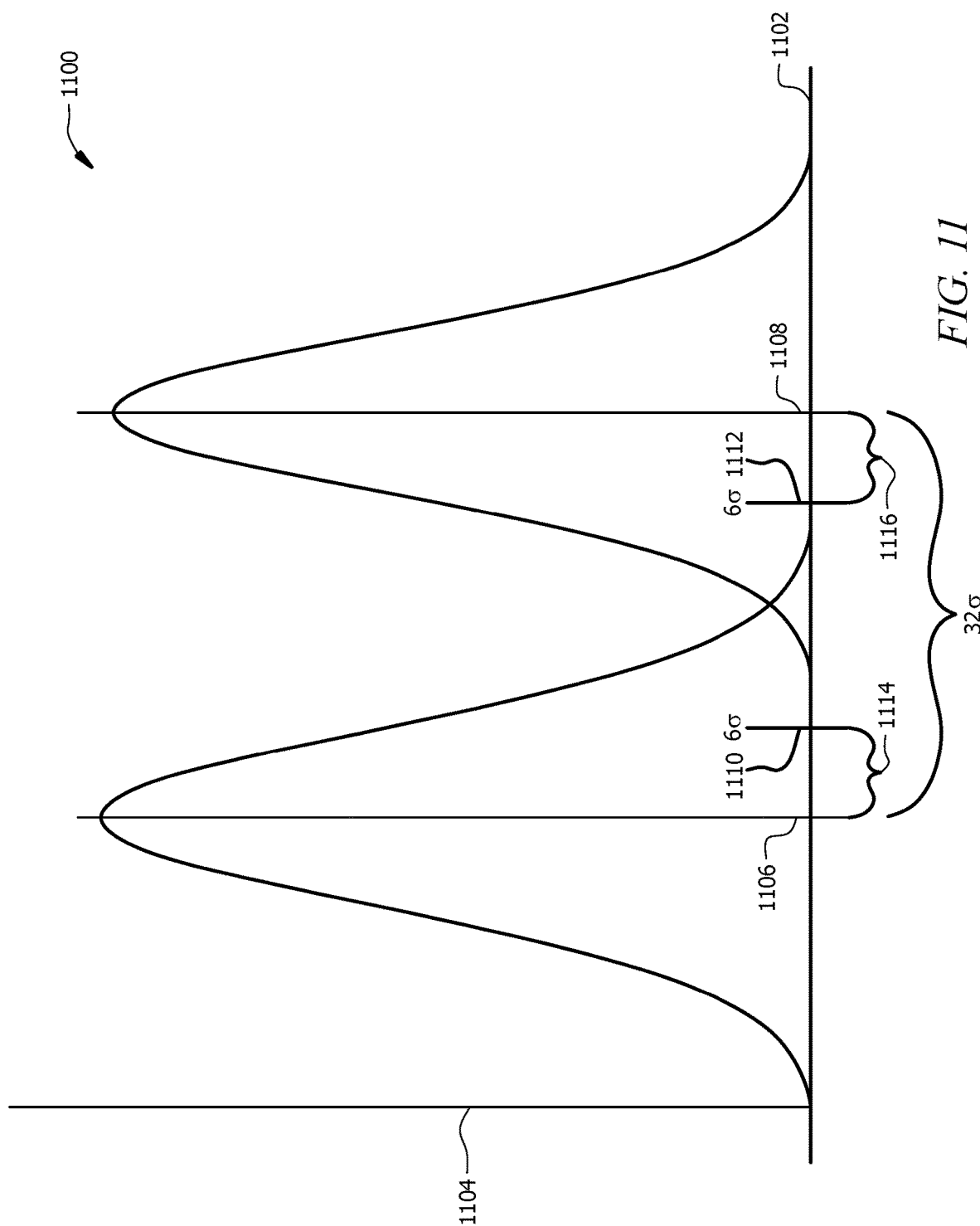
FIG. 11 is an embodiment of a graph of probability distributions for adjacent root correlithm objects.

FIG. 11 is an embodiment of a graph of probability distributions 1100 for adjacent root correlithm objects 1004. Axis 1102 indicates the distance between the root correlithm objects 1004, for example, in units of bits. Axis 1104 indicates the probability associated with the number of bits being different between a random correlithm object 104 and a root correlithm object 1004.

As an example, FIG. 11 illustrates the probability distributions for adjacent root correlithm objects 1004 in a 1024-dimensional space 102. Location 1106 illustrates the location of a first root correlithm object 1004 with respect to a second root correlithm object 1004. Location 1108 illustrates the location of the second root correlithm object 1004. Each root correlithm object 1004 is located an average distance away from each other which is equal to $$\frac{n}{2},$$

where 'n' is the number of dimensions in the n-dimensional space 102. In this example, the first root correlithm object 1004 and the second root correlithm object 1004 are 512 bits or 32 standard deviations away from each other.

In this example, the cutoff region for each root correlithm object 1004 is located at six standard deviations from locations 1106 and 1108. In other examples, the cutoff region may be located at any other suitable location. For example, the cutoff region defining the core distance may one, two, four, ten, or any other suitable number of standard deviations away from the average distance between correlithm objects 104 in the n-dimensional space 102. Location 1110 illustrates a first cutoff region that defines a first core distance 1114 for the first root correlithm object 1004. Location 1112 illustrates a second cutoff region that defines a second core distance 1116 for the second root correlithm object 1004.

In this example, the core distances for the first root correlithm object 1004 and the second root correlithm object 1004 do not overlap with each other. This means that correlithm objects 104 within the correlithm object core 1002 of one of the root correlithm objects 1004 are uniquely associated with the root correlithm object 1004 and there is no ambiguity.

Figures 12A, 12B:
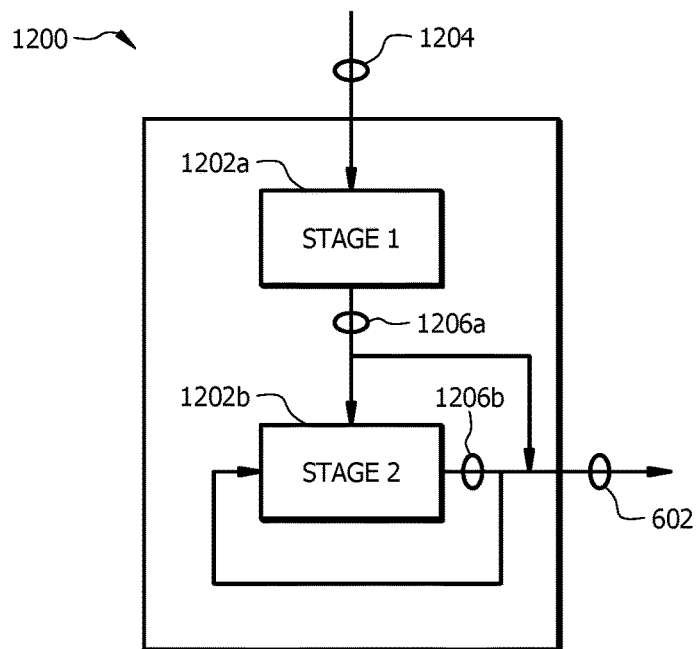
FIG. 12A is an embodiment of a string correlithm object generator.
FIG. 12B is an embodiment of a table demonstrating a change in bit values associated with sub-string correlithm objects.

FIG. 12A illustrates one embodiment of a string correlithm object generator 1200 configured to generate a string correlithm object 602 as output. String correlithm object generator 1200 is implemented by string correlithm object engine 522 and comprises a first processing stage 1202a communicatively and logically coupled to a second processing stage 1202b. First processing stage 1202 receives an input 1204 and outputs a first sub-string correlithm object 1206a that comprises an n-bit digital word wherein each bit has either a value of zero or one. In one embodiment, first processing stage 1202 generates the values of each bit randomly. Input 1204 comprises one or more parameters used to determine the characteristics of the string correlithm object 602. For example, input 1204 may include a parameter for the number of dimensions, n, in the n-dimensional space 102 (e.g., 64, 128, 256, etc.) in which to generate the string correlithm object 602. Input 1204 may also include a distance parameter, δ, that indicates a particular number of bits of the n-bit digital word (e.g., 4, 8, 16, etc.) that will be changed from one sub-string correlithm object 1206 to the next in the string correlithm object 602. Second processing stage 1202b receives the first sub-string correlithm object 1206a and, for each bit of the first sub-string correlithm object 1206a up to the particular number of bits identified in the distance parameter, δ, changes the value from a zero to a one or from a one to a zero to generate a second sub-string correlithm object 1206b. The bits of the first sub-string correlithm object 1206a that are changed in value for the second sub-string correlithm object 1206b are selected randomly from the n-bit digital word. The other bits of the n-bit digital word in second sub-string correlithm object 1206b remain the same values as the corresponding bits of the first sub-string correlithm object 1206a.

FIG. 12B illustrates a table 1220 that demonstrates the changes in bit values from a first sub-string correlithm object 1206a to a second sub-string correlithm object 1206b. In this example, assume that n=64 such that each sub-string correlithm object 1206 of the string correlithm object 602 is a 64-bit digital word. As discussed previously with regard to FIG. 9, the standard deviation is equal to $$\sqrt{\frac{n}{4}},$$

or four bits, for a 64-dimensional space 102. In one embodiment, the distance parameter, δ, is selected to equal the standard deviation. In this embodiment, the distance parameter is also four bits which means that four bits will be changed from each sub-string correlithm object 1206 to the next in the string correlithm object 602. In other embodiments where it is desired to create a tighter correlation among sub-string correlithm objects 1206, a distance parameter may be selected to be less than the standard deviation (e.g., distance parameter of three bits or less where standard deviation is four bits). In still other embodiments where it is desired to create a looser correlation among sub-string correlithm objects 1206, a distance parameter may be selected to be more than the standard deviation (e.g., distance parameter of five bits or more where standard deviation is four bits). Table 1220 illustrates the first sub-string correlithm object 1206a in the first column having four bit values that are changed, by second processing stage 1202b, from a zero to a one or from a one to a zero to generate second sub-string correlithm object 1206b in the second column. By changing four bit values, the core of the first sub-string correlithm object 1206a overlaps in 64-dimensional space with the core of the second sub-string correlithm object 1206b.

Referring back to FIG. 12A, the second processing stage 1202b receives from itself the second sub-string correlithm object 1206b as feedback. For each bit of the second sub-string correlithm object 1206b up to the particular number of bits identified by the distance parameter, the second processing stage 1202b changes the value from a zero to a one or from a one to a zero to generate a third sub-string correlithm object 1206c. The bits of the second sub-string correlithm object 1206b that are changed in value for the third sub-string correlithm object 1206c are selected randomly from the n-bit digital word. The other bits of the n-bit digital word in third sub-string correlithm object 1206c remain the same values as the corresponding bits of the second sub-string correlithm object 1206b. Referring back to table 1220 illustrated in FIG. 12B, the second sub-string correlithm object 1206b in the second column has four bit values that are changed, by second processing stage 1202b, from a zero to a one or from a one to a zero to generate third sub-string correlithm object 1206c in the third column.

Referring back to FIG. 12A, the second processing stage 1202b successively outputs a subsequent sub-string correlithm object 1206 by changing bit values of the immediately prior sub-string correlithm object 1206 received as feedback, as described above. This process continues for a predetermined number of sub-string correlithm objects 1206 in the string correlithm object 602. Together, the sub-string correlithm objects 1206 form a string correlithm object 602 in which the first sub-string correlithm object 1206a precedes and is adjacent to the second sub-string correlithm object 1206b, the second sub-string correlithm object 1206b precedes and is adjacent to the third sub-string correlithm object 1206c, and so on. Each sub-string correlithm object 1206 is separated from an adjacent sub-string correlithm object 1206 in n-dimensional space 102 by a number of bits represented by the distance parameter, S.

Figure 13:
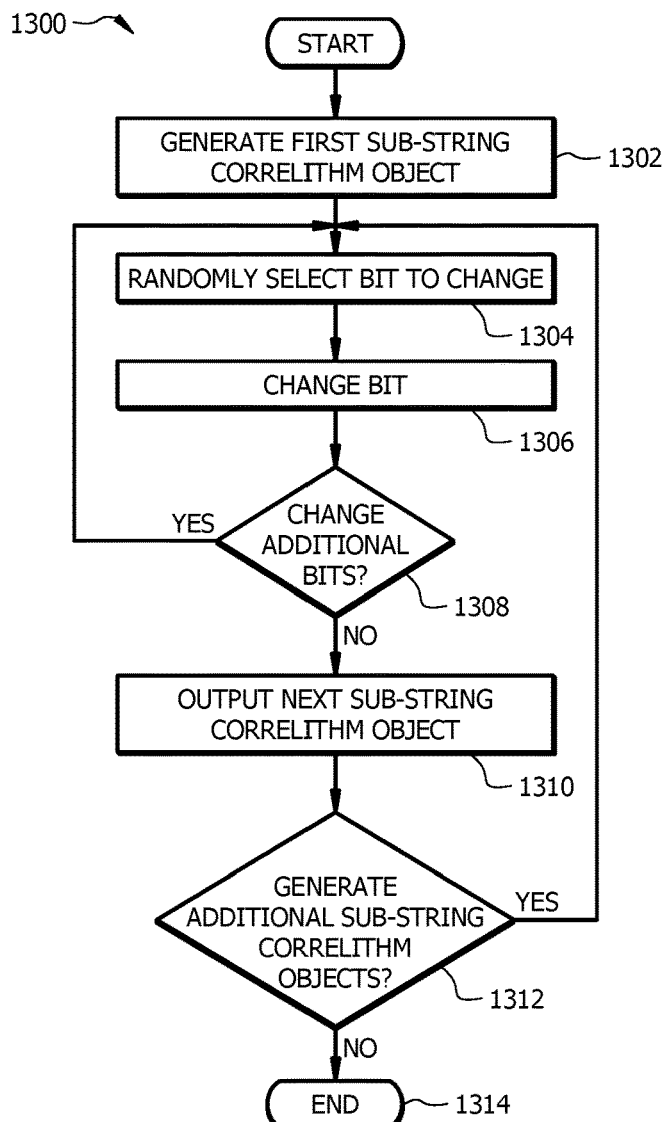
FIG. 13 is an embodiment of a process for generating a string correlithm object.

FIG. 13 is a flowchart of an embodiment of a process 1300 for generating a string correlithm object 602. At step 1302, a first sub-string correlithm object 1206a is generated, such as by a first processing stage 1202a of a string correlithm object generator 1200. The first sub-string correlithm object 1206a comprises an n-bit digital word. At step 1304, a bit of the n-bit digital word of the sub-string correlithm object 1206 is randomly selected, and is changed at step 1306 from a zero to a one or from a one to a zero. Execution proceeds to step 1308 where it is determined whether to change additional bits in the n-bit digital word. In general, process 1300 will change a particular number of bits up to the distance parameter, S. In one embodiment, as described above with regard to FIGS. 12A-B, the distance parameter is four bits. If additional bits remain to be changed in the sub-string correlithm object 1206, then execution returns to step 1304. If all of the bits up to the particular number of bits in the distance parameter have already been changed, as determined at step 1308, then execution proceeds to step 1310 where the second sub-string correlithm object 1206b is output. The other bits of the n-bit digital word in second sub-string correlithm object 1206b remain the same values as the corresponding bits of the first sub-string correlithm object 1206a.

Execution proceeds to step 1312 where it is determined whether to generate additional sub-string correlithm objects 1206 in the string correlithm object 602. If so, execution returns back to step 1304 and the remainder of the process occurs again to change particular bits up to the number of bits in the distance parameter, S. Each subsequent sub-string correlithm object 1206 is separated from the immediately preceding sub-string correlithm object 1206 in n-dimensional space 102 by a number of bits represented by the distance parameter, S. If no more sub-string correlithm objects 1206 are to be generated in the string correlithm object 602, as determined at step 1312, execution of process 1300 terminates at steps 1314.

A string correlithm object 602 comprising a series of adjacent sub-string correlithm objects 1206 whose cores overlap with each other permits data values to be correlated with each other in n-dimensional space 102. Thus, where discrete data values have a pre-existing relationship with each other in the real-world, those relationships can be maintained in n-dimensional space 102 if they are represented by sub-string correlithm objects of a string correlithm object 602. For example, the letters of an alphabet have a relationship with each other in the real world. In particular, the letter "A" precedes the letters "B" and "C" but is closer to the letter "B" than the letter "C". Thus, if the letters of an alphabet are to be represented by a string correlithm object 602, the relationship between letter "A" and the letters "B" and "C" should be maintained such that "A" precedes but is closer to letter "B" than letter "C." Similarly, the letter "B" is equidistant to both letters "A" and "C," but the letter "B" is subsequent to the letter "A" and preceding the letter "C". Thus, if the letters of an alphabet are to be represented by a string correlithm object 602, the relationship between letter "B" and the letters "A" and "C" should be maintained such that the letter "B" is equidistant but subsequent to letter "A" and preceding letter "C." The ability to migrate these relationships between data values in the real world to relationships among correlithm objects provides a significant advance in the ability to record, store, and faithfully reproduce data within different computing environments.

Figure 14:
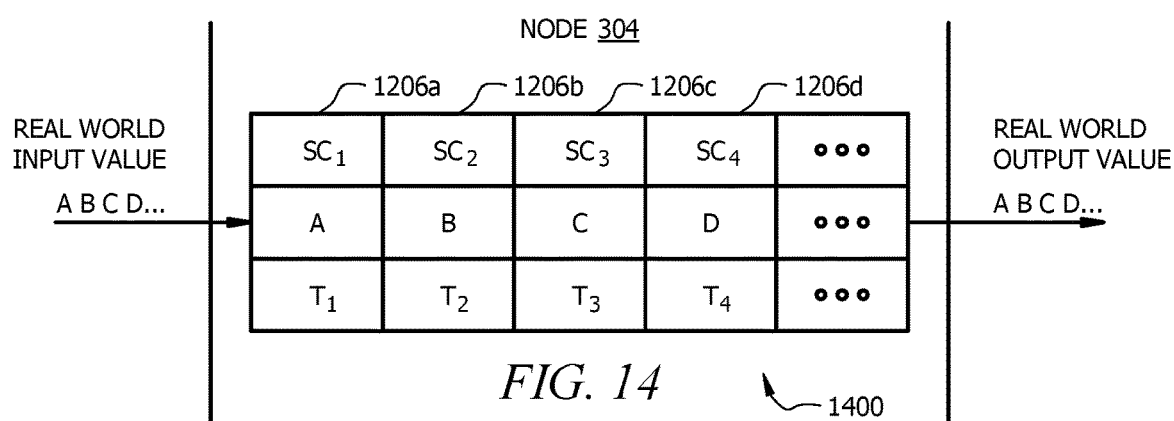
FIG. 14 is an embodiment of discrete data values mapped to sub-string correlithm objects of a string correlithm object.

FIG. 14 illustrates how data values that have pre-existing relationships with each other can be mapped to sub-string correlithm objects 1206 of a string correlithm object 602 in n-dimensional space 102 by string correlithm object engine 522 to maintain their relationships to each other. Although the following description of FIG. 14 is illustrated with respect to letters of an alphabet as representing data values that have pre-existing relationships to each other, other data values can also be mapped to string correlithm objects 602 using the techniques discussed herein. In particular, FIG. 14 illustrates a node table 1400 stored in memory 504 that includes a column for a subset of sub-string correlithm objects 1206 of a string correlithm object 602. The first sub-string correlithm object 1206a is mapped to a discrete data value, such as the letter "A" of the alphabet. The second sub-string correlithm object 1206b is mapped to a discrete data value, such as the letter "B" of the alphabet, and so on with sub-string correlithm objects 1206c and 1206d mapped to the letters "C" and "D". As discussed above, the letters of the alphabet have a correlation with each other, including a sequence, an ordering, and a distance from each other. These correlations among letters of the alphabet could not be maintained as represented in n-dimensional space if each letter was simply mapped to a random correlithm object 104. Accordingly, to maintain these correlations, the letters of the alphabet are mapped to sub-string correlation objects 1206 of a string correlation object 602. This is because, as described above, the adjacent sub-string correlation objects 1206 of a string correlation object 602 also have a sequence, an ordering, and a distance from each other that can be maintained in n-dimensional space.

In particular, just like the letters "A," "B," "C," and "D" have an ordered sequence in the real world, the sub-string correlithm objects 1206a, 1206b, 1206c, and 1206d have an ordered sequence and distance relationships to each other in n-dimensional space. Similarly, just like the letter "A" precedes but is closer to the letter "B" than the letter "C" in the real world, so too does the sub-string correlithm object 1206a precede but is closer to the sub-string correlithm object 1206b than the sub-string correlithm object 1206c in n-dimensional space. Similarly, just like the letter "B" is equidistant to but in between the letters "A" and "C" in the real world, so too is the sub-string correlithm object 1206b equidistant to but in between the sub-string correlithm objects 1206a and 1206c in n-dimensional space. Although the letters of the alphabet are used to provide an example of data in the real world that has a sequence, an ordering, and a distance relationship to each other, one of skill in the art will appreciate that any data with those characteristics in the real world can be represented by sub-string correlithm objects 1206 to maintain those relationships in n-dimensional space.

Because the sub-string correlithm objects 1206 of a string correlithm object 602 maintains the sequence, ordering, and/or distance relationships between real world data in n-dimensional space, node 304 can output the real-world data values (e.g., letters of the alphabet) in the sequence in which they occurred. In one embodiment, the sub-string correlithm objects 1206 can also be associated with timestamps, $t_{1-4}$, to aid with maintaining the relationship of the real-world data with a sequence using the time at which they occurred. For example, sub-string correlithm object 1206a can be associated with a first timestamp, $t_1$; sub-string correlithm object 1206b can be associated with a second timestamp, $t_2$; and so on. In one embodiment where the real-world data represents frames of a video signal that occur at different times of an ordered sequence, maintaining a timestamp in the node table 1400 aids with the faithful reproduction of the real-world data at the correct time in the ordered sequence. In this way, the node table 1400 can act as a recorder by recording discrete data values for a time period extending from at least the first timestamp, $t_1$ to a later timestamp, $t_n$. Also in this way, the node 304 is also configured to reproduce or playback the real-world data represented by the sub-string correlithm objects 1206 in the node table 1400 for a period of time extending from at least the first timestamp, $t_1$ to a later timestamp, $t_n$. The ability to record real-world data, associate it to sub-string correlithm objects 1206 in n-dimensional space while maintaining its order, sequence, and distance relationships, and subsequently faithfully reproduce the real-world data as originally recorded provides a significant technical advantage to computing systems.

Figure 15A:
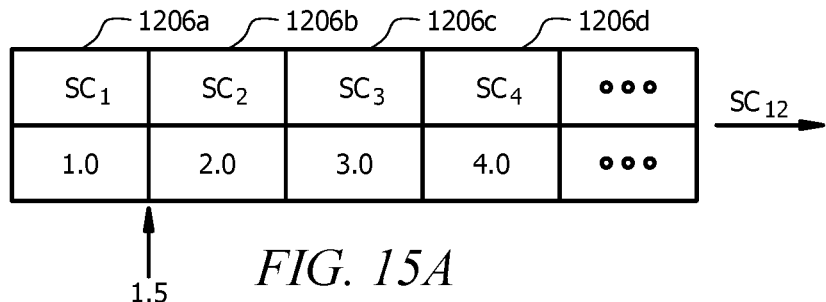
FIG. 15A is an embodiment of analog data values mapped to sub-string correlithm objects of a string correlithm object.

The examples described above relate to representing discrete data values, such as letters of an alphabet, using sub-string correlithm objects 1206 of a string correlithm object 602. However, sub-string correlithm objects 1206 also provide the flexibility to represent non-discrete data values, or analog data values, using interpolation from the real world to n-dimensional space 102. FIG. 15A illustrates how analog data values that have pre-existing relationships with each other can be mapped to sub-string correlithm objects 1206 of a string correlithm object 602 in n-dimensional space 102 by string correlithm object engine 522 to maintain their relationships to each other. FIG. 15A illustrates a node table 1500 stored in memory 504 that includes a column for each sub-string correlithm object 1206 of a string correlithm object 602. The first sub-string correlithm object 1206a is mapped to an analog data value, such as the number "1.0". The second sub-string correlithm object 1206b is mapped to an analog data value, such as the number "2.0", and so on with sub-string correlithm objects 1206c and 1206d mapped to the numbers "3.0" and "4.0." Just like the letters of the alphabet described above, these numbers have a correlation with each other, including a sequence, an ordering, and a distance from each other. One difference between representing discrete data values (e.g., letters of an alphabet) and analog data values (e.g., numbers) using sub-string correlithm objects 1206 is that new analog data values that fall between pre-existing analog data values can be represented using new sub-string correlithm objects 1206 using interpolation, as described in detail below.

If node 304 receives an input representing an analog data value of 1.5, for example, then string correlithm object engine 522 can determine a new sub-string correlithm object 1206 that maintains the relationship between this input of 1.5 and the other numbers that are already represented by sub-string correlithm objects 1206. In particular, node table 1500 illustrates that the analog data value 1.0 is represented by sub-string correlithm object 1206a and analog data value 2.0 is represented by sub-string correlithm object 1206b. Because the analog data value 1.5 is between the data values of 1.0 and 2.0, then a new sub-string correlithm object 1206 would be created in n-dimensional space 102 between sub-string correlithm objects 1206a and 1206b. This is done by interpolating the distance in n-dimensional space 102 between sub-string correlithm objects 1206a and 1206b that corresponds to the distance between 1.0 and 2.0 where 1.5 resides and representing that interpolation using an appropriate n-bit digital word. In this example, the analog data value of 1.5 is halfway between the data values of 1.0 and 2.0. Therefore, the sub-string correlithm object 1206 that is determined to represent the analog data value of 1.5 would be halfway between the sub-string correlithm objects 1206a and 1206b in n-dimensional space 102. Generating a sub-string correlithm object 1206 that is halfway between sub-string correlithm objects 1206a and 1206b in n-dimensional space 102 involves modifying bits of the n-bit digital words representing the sub-string correlithm objects 1206a and 1206b. This process is illustrated with respect to FIG. 15B.

Figure 15B:
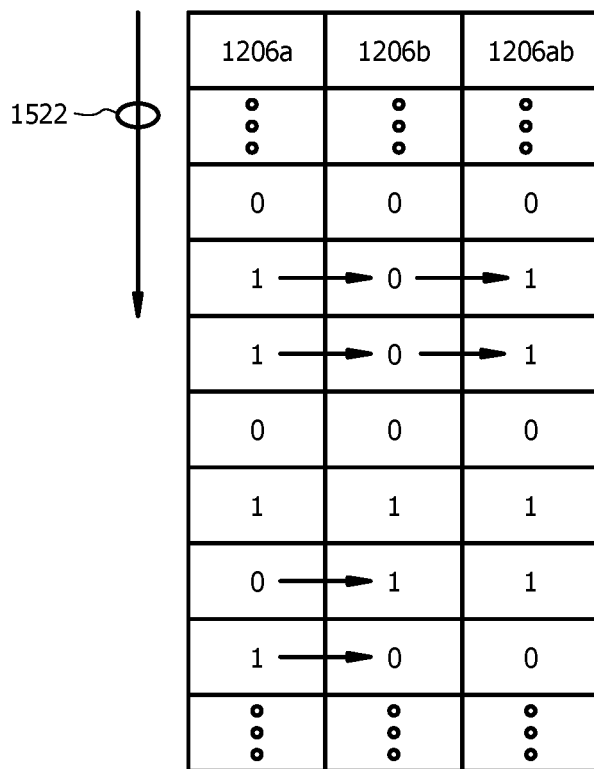
FIG. 15B is an embodiment of a table demonstrating how to map analog data values to sub-string correlithm objects using interpolation.

FIG. 15B illustrates a table 1520 with a first column representing the n-bit digital word of sub-string correlithm object 1206a that is mapped in the node table 1500 to the data value 1.0; a second column representing the n-bit digital word of sub-string correlithm object 1206b that is mapped in the node table 1500 to the data value 2.0; and a third column representing the n-bit digital word of sub-string correlithm object 1206ab that is generated and associated with the data value 1.5. Table 1520 is stored in memory 504. As described above with regard to table 1220, the distance parameter, $\delta$, between adjacent sub-string correlithm objects 1206a and 1206b was chosen, in one embodiment, to be four bits. This means that for a 64-bit digital word, four bits have been changed from a zero to a one or from a one to a zero in order to generate sub-string correlithm object 1206b from sub-string correlithm object 1206a.

In order to generate sub-string correlithm object 1206ab to represent the data value of 1.5, a particular subset of those four changed bits between sub-string correlithm objects 1206a and 1206b should be modified. Moreover, the actual bits that are changed should be selected successively from one end of the n-bit digital word or the other end of the n-bit digital word. Because the data value of 1.5 is exactly halfway between the data values of 1.0 and 2.0, then it can be determined that exactly half of the four bits that are different between sub-string correlithm object 1206a and sub-string correlithm object 1206b should be changed to generate sub-string correlithm object 1206ab. In this particular example, therefore, starting from one end of the n-bit digital word as indicated by arrow 1522, the first bit that was changed from a value of one in sub-string correlithm object 1206*a* to a value of zero in sub-string correlithm object 1206*b* is changed back to a value of one in sub-string correlithm object 1206*ab*. Continuing from the same end of the n-bit digital word as indicated by arrow 1522, the next bit that was changed from a value of one in sub-string correlithm object 1206*a* to a value of zero in sub-string correlithm object 1206*b* is changed back to a value of one in sub-string correlithm object 1206*ab*. The other two of the four bits that were changed from sub-string correlithm object 1206*a* to sub-string correlithm object 1206*b* are not changed back. Accordingly, two of the four bits that were different between sub-string correlithm objects 1206*a* and 1206*b* are changed back to the bit values that were in sub-string correlithm object 1206*a* in order to generate sub-string correlithm object 1206*ab* that is halfway between sub-string correlithm objects 1206*a* and 1206*b* in n-dimensional space 102 just like data value 1.5 is halfway between data values 1.0 and 2.0 in the real world.

Other input data values can also be interpolated and represented in n-dimensional space 102, as described above. For example, if the input data value received was 1.25, then it is determined to be one-quarter of the distance from the data value 1.0 and three-quarters of the distance from the data value 2.0. Accordingly, a sub-string correlithm object 1206*ab* can be generated by changing back three of the four bits that differ between sub-string correlithm objects 1206*a* and 1206*b*. In this regard, the sub-string correlithm object 1206*ab* (which represents the data value 1.25) will only differ by one bit from the sub-string correlithm object 1206*a* (which represents the data value 1.0) in n-dimensional space 102. Similarly, if the input data value received was 1.75, then it is determined to be three-quarters of the distance from the data value 1.0 and one-quarter of the distance from the data value 2.0. Accordingly, a sub-string correlithm object 1206*ab* can be generated by changing back one of the four bits that differ between sub-string correlithm objects 1206*a* and 1206*b*. In this regard, the sub-string correlithm object 1206*ab* (which represents the data value 1.75) will differ by one bit from the sub-string correlithm object 1206*b* (which represents the data value 2.0) in n-dimensional space 102. In this way, the distance between data values in the real world can be interpolated to the distance between sub-string correlithm objects 1206 in n-dimensional space 102 in order to preserve the relationships among analog data values.

Although the example above was detailed with respect to changing bit values from the top end of the n-bit digital word represented by arrow 1522, the bit values can also be successively changed from the bottom end of the n-bit digital word. The key is that of the bit values that differ from sub-string correlithm object 1206*a* to sub-string correlithm object 1206*b*, the bit values that are changed to generate sub-string correlithm object 1206*ab* should be taken consecutively as they are encountered whether from the top end of the n-bit digital word (as represented by arrow 1522) or from the bottom end of the n-bit digital word. This ensures that sub-string correlithm object 1206*ab* will actually be between sub-string correlithm objects 1206*a* and 1206*b* rather than randomly drifting away from both of sub-string correlithm objects 1206*a* and 1206*b* in n-dimensional space 102.

Figure 16:
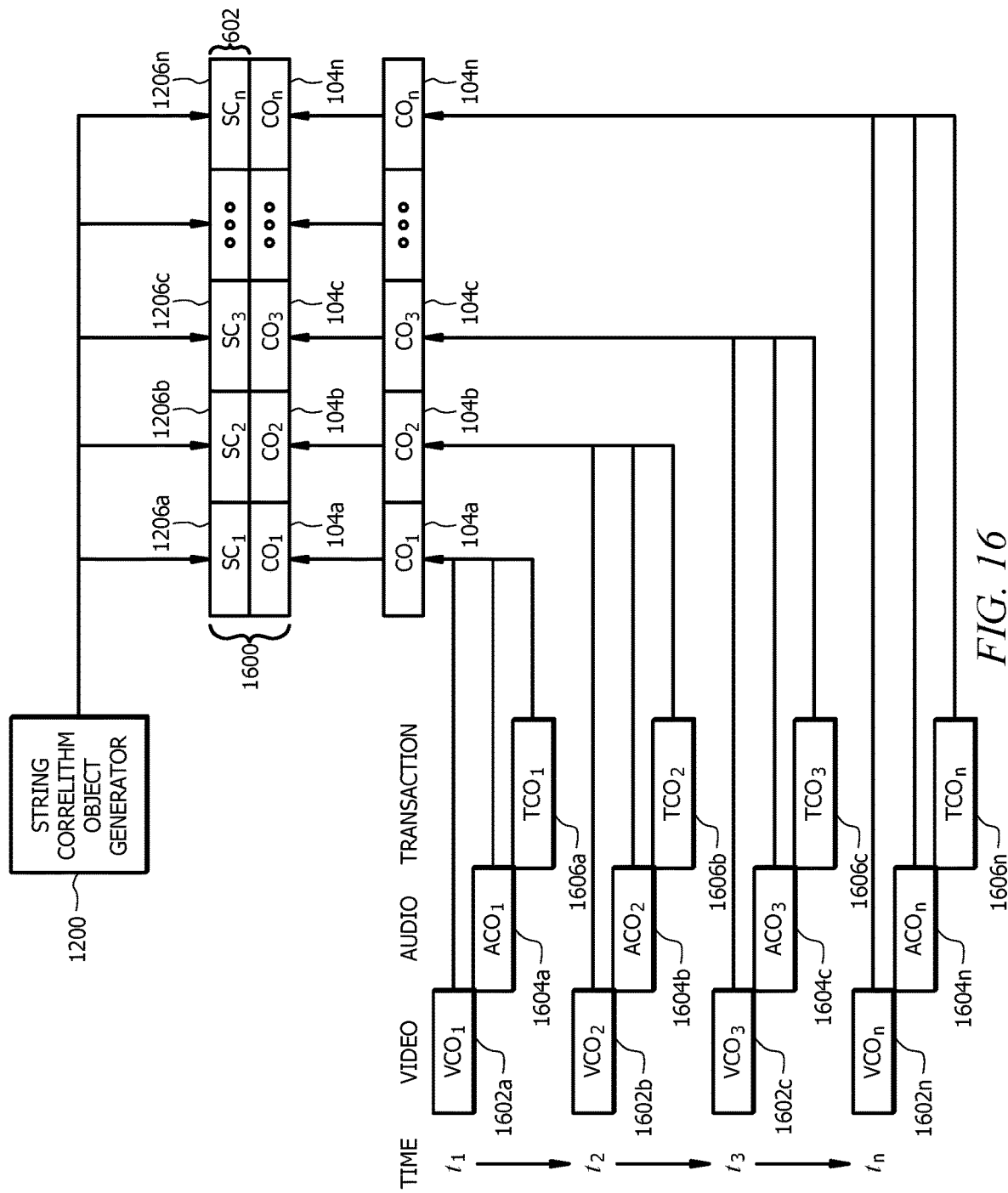
FIG. 16 is an embodiment of non-string correlithm objects mapped to sub-string correlithm objects of a string correlithm object.

FIG. 16 illustrates how real-world data values can be aggregated and represented by correlithm objects 104 (also referred to as non-string correlithm objects 104), which are then linked to corresponding sub-string correlithm objects 1206 of a string correlithm object 602 by string correlithm object engine 522. As described above with regard to FIG. 12A, a string correlithm object generator 1200 generates sub-string correlithm objects 1206 that are adjacent to each other in n-dimensional space 102 to form a string correlithm object 602. The sub-string correlithm objects 1206*a-n* embody an ordering, sequence, and distance relationships to each other in n-dimensional space 102. As described in detail below, non-string correlithm objects 104 can be mapped to corresponding sub-string correlithm objects 1206 and stored in a node table 1600 to provide an ordering or sequence among them in n-dimensional space 102. This allows node table 1600 to record, store, and faithfully reproduce or playback a sequence of events that are represented by non-string correlithm objects 104*a-n*. In one embodiment, the sub-string correlithm objects 1206 and the non-string correlithm objects 104 can both be represented by the same length of digital word, n, (e.g., 64 bit, 128 bit, 256 bit). In another embodiment, the sub-string correlithm objects 1206 can be represented by a digital word of one length, n, and the non-string correlithm objects 104 can be represented by a digital word of a different length, m.

In a particular embodiment, the non-string correlithm objects 104*a-n* can represent aggregated real-world data. For example, real-world data may be generated related to the operation of an automated teller machine (ATM). In this example, the ATM machine may have a video camera and a microphone to tape both the video and audio portions of the operation of the ATM by one or more customers in a vestibule of a bank facility or drive-through. The ATM machine may also have a processor that conducts and stores information regarding any transactions between the ATM and the customer associated with a particular account. The bank facility may simultaneously record video, audio, and transactional aspects of the operation of the ATM by the customer for security, audit, or other purposes. By aggregating the real-world data values into non-string correlithm objects 104 and associating those non-string correlithm objects 104 with sub-string correlithm objects 1206, as described in greater detail below, the correlithm object processing system may maintain the ordering, sequence, and other relationships between the real-world data values in n-dimensional space 102 for subsequent reproduction or playback. Although the example above is detailed with respect to three particular types of real-world data (i.e., video, audio, transactional data associated with a bank ATM) that are aggregated and represented by correlithm objects 104, it should be understood that any suitable number and combination of different types of real-world data can be aggregated and represented in this example.

For a period of time from $t_1$ to $t_n$, the ATM records video, audio, and transactional real-world data. For example, the period of time may represent an hour, a day, a week, a month, or other suitable time period of recording. The real-world video data is represented by video correlithm objects 1602. The real-world audio data is represented by audio correlithm objects 1604. The real-world transaction data is represented by transaction correlithm objects 1606. The correlithm objects 1602, 1604, and 1606 can be aggregated to form non-string correlithm objects 104. For example, at a first time, $t_1$, the ATM generates: (a) real-world video data that is represented as a first video correlithm object 1602*a*; (b) real-world audio data that is represented by a first audio correlithm object 1604*a*; and (c) real-world transaction data that is represented by a first transaction correlithm object 1606*a*. Correlithm objects 1602*a*, 1604*a*, and 1606*a* can be represented as a single non-string correlithm object 104*a* which is then associated with first sub-string correlithm object 1206*a* in the node table 1600. In one embodiment, the timestamp, $t_1$, can also be captured in the non-string correlithm object 104*a*. In this way, three different types of real-world data are captured, represented by a non-string correlithm object 104 and then associated with a portion of the string correlithm object 602.

Continuing with the example, at a second time, $t_2$, the ATM generates: (a) real-world video data that is represented as a second video correlithm object 1602*b*; (b) real-world audio data that is represented by a second audio correlithm object 1604*b*; and (c) real-world transaction data that is represented by a second transaction correlithm object 1606*b*. The second time, $t_2$, can be a predetermined time or suitable time interval after the first time, $t_1$, or it can be at a time subsequent to the first time, $t_1$, where it is determined that one or more of the video, audio, or transaction data has changed in an meaningful way (e.g., video data indicates that a new customer entered the vestibule of the bank facility; another audible voice is detected or the customer has made an audible request to the ATM; or the customer is attempting a different transaction or a different part of the same transaction). Correlithm objects 1602*b*, 1604*b*, and 1606*b* can be represented as a single non-string correlithm object 104*b* which is then associated with second sub-string correlithm object 1206*b* in the node table 1600. In one embodiment, the timestamp, $t_2$, can also be captured in the non-string correlithm object 104*b*.

Continuing with the example, at a third time, $t_3$, the ATM generates: (a) real-world video data that is represented as a third video correlithm object 1602*c*; (b) real-world audio data that is represented by a third audio correlithm object 1604*c*; and (c) real-world transaction data that is represented by a third transaction correlithm object 1606*c*. The third time, $t_3$, can be a predetermined time or suitable time interval after the second time, $t_2$, or it can be at a time subsequent to the second time, $t_2$, where it is determined that one or more of the video, audio, or transaction data has changed again in a meaningful way, as described above. Correlithm objects 1602*c*, 1604*c*, and 1606*c* can be represented as a single non-string correlithm object 104*c* which is then associated with third sub-string correlithm object 1206*c* in the node table 1600. In one embodiment, the timestamp, $t_3$, can also be captured in the non-string correlithm object 104*c*.

Concluding with the example, at an n-th time, $t_n$, the ATM generates: (a) real-world video data that is represented as an n-th video correlithm object 1602*n*; (b) real-world audio data that is represented by an n-th audio correlithm object 1604*n*; and (c) real-world transaction data that is represented by an n-th transaction correlithm object 1606*n*. The third time, $t_n$, can be a predetermined time or suitable time interval after a previous time, $t_{n-1}$, or it can be at a time subsequent to the previous time, $t_{n-1}$, where it is determined that one or more of the video, audio, or transaction data has changed again in a meaningful way, as described above. Correlithm objects 1602*n*, 1604*n*, and 1606*n* can be represented as a single non-string correlithm object 104*n* which is then associated with n-th sub-string correlithm object 1206*n* in the node table 1600. In one embodiment, the timestamp, $t_n$, can also be captured in the non-string correlithm object 104*n*.

As illustrated in FIG. 16, different types of real-world data (e.g., video, audio, transactional) can be captured and represented by correlithm objects 1602, 1604, and 1606 at particular timestamps. Those correlithm objects 1602, 1604, and 1606 can be aggregated into correlithm objects 104. In this way, the real-world data can be "fanned in" and represented by a common correlithm object 104. By capturing real-world video, audio, and transaction data at different relevant timestamps from $t_1$-$t_n$, representing that data in correlithm objects 104, and then associating those correlithm objects 104 with sub-string correlithm objects 1206 of a string correlithm object 602, the node table 1600 described herein can store vast amounts of real-world data in n-dimensional space 102 for a period of time while preserving the ordering, sequence, and relationships among real-world data events and corresponding correlithm objects 104 so that they can be faithfully reproduced or played back in the real-world, as desired. This provides a significant savings in memory capacity.

Figure 17:
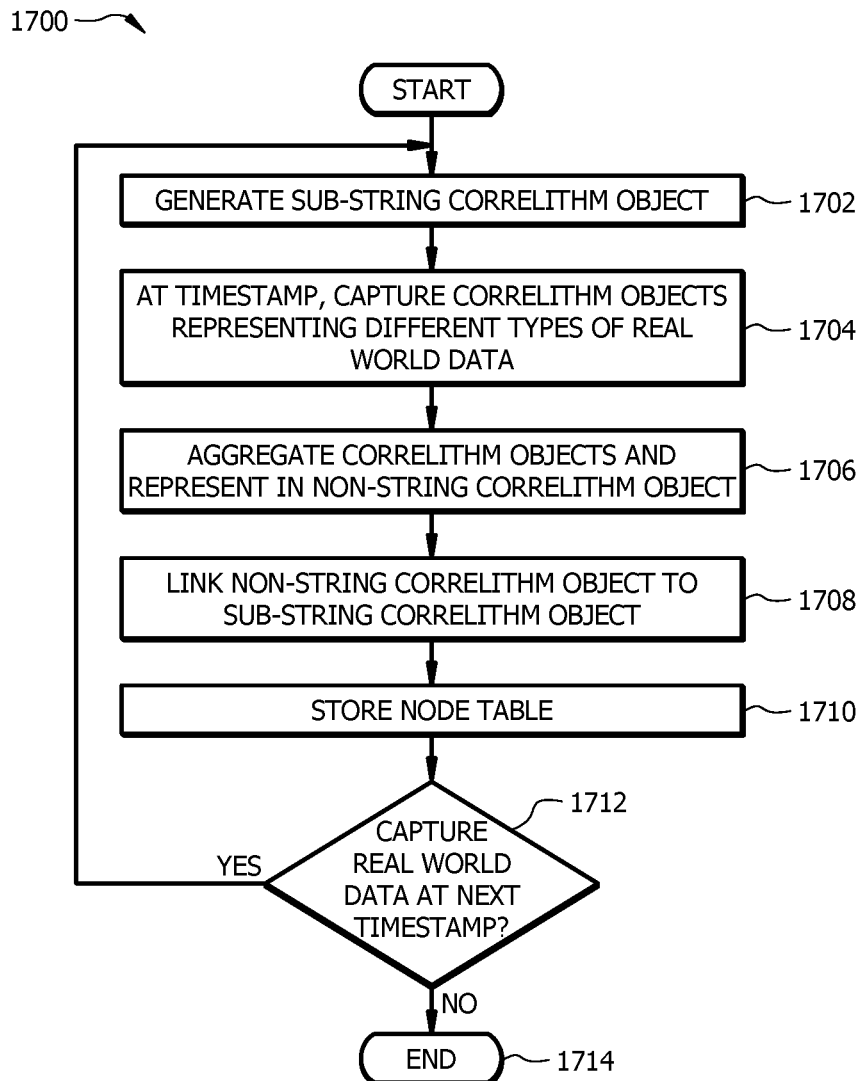
FIG. 17 is an embodiment of a process for mapping non-string correlithm objects to sub-string correlithm objects of a string correlithm object.

FIG. 17 is a flowchart of an embodiment of a process 1700 for linking non-string correlithm objects 104 with sub-string correlithm objects 1206. At step 1702, string correlithm object generator 1200 generates a first sub-string correlithm object 1206*a*. Execution proceeds to step 1704 where correlithm objects 104 are used to represent different types of real-world data at a first timestamp, $t_1$. For example, correlithm object 1602*a* represents real-world video data; correlithm object 1604*a* represents real-world audio data; and correlithm object 1606*a* represents real-world transaction data. At step 1706, each of correlithm objects 1602*a*, 1604*a*, and 1606*a* captured at the first timestamp, $t_1$, are aggregated and represented by a non-string correlithm object 104*a*. Execution proceeds to step 1708, where non-string correlithm object 104*a* is linked to sub-string correlithm object 1206*a*, and this association is stored in node table 1600 at step 1710. At step 1712, it is determined whether real-world data at the next timestamp should be captured. For example, if a predetermined time interval since the last timestamp has passed or if a meaningful change to the real-world data has occurred since the last timestamp, then execution returns to steps 1702-1710 where another sub-string correlithm object 1206 is generated (step 1702); correlithm objects representing real-world data is captured at the next timestamp (step 1704); those correlithm objects are aggregated and represented in a non-string correlithm object 104 (step 1706); that non-string correlithm object 104 is linked with a sub-string correlithm object 1206 (step 1708); and this association is stored in the node table 1600 (step 1710). If no further real-world data is to be captured at the next timestamp, as determined at step 1712, then execution ends at step 1714.

Figure 18:
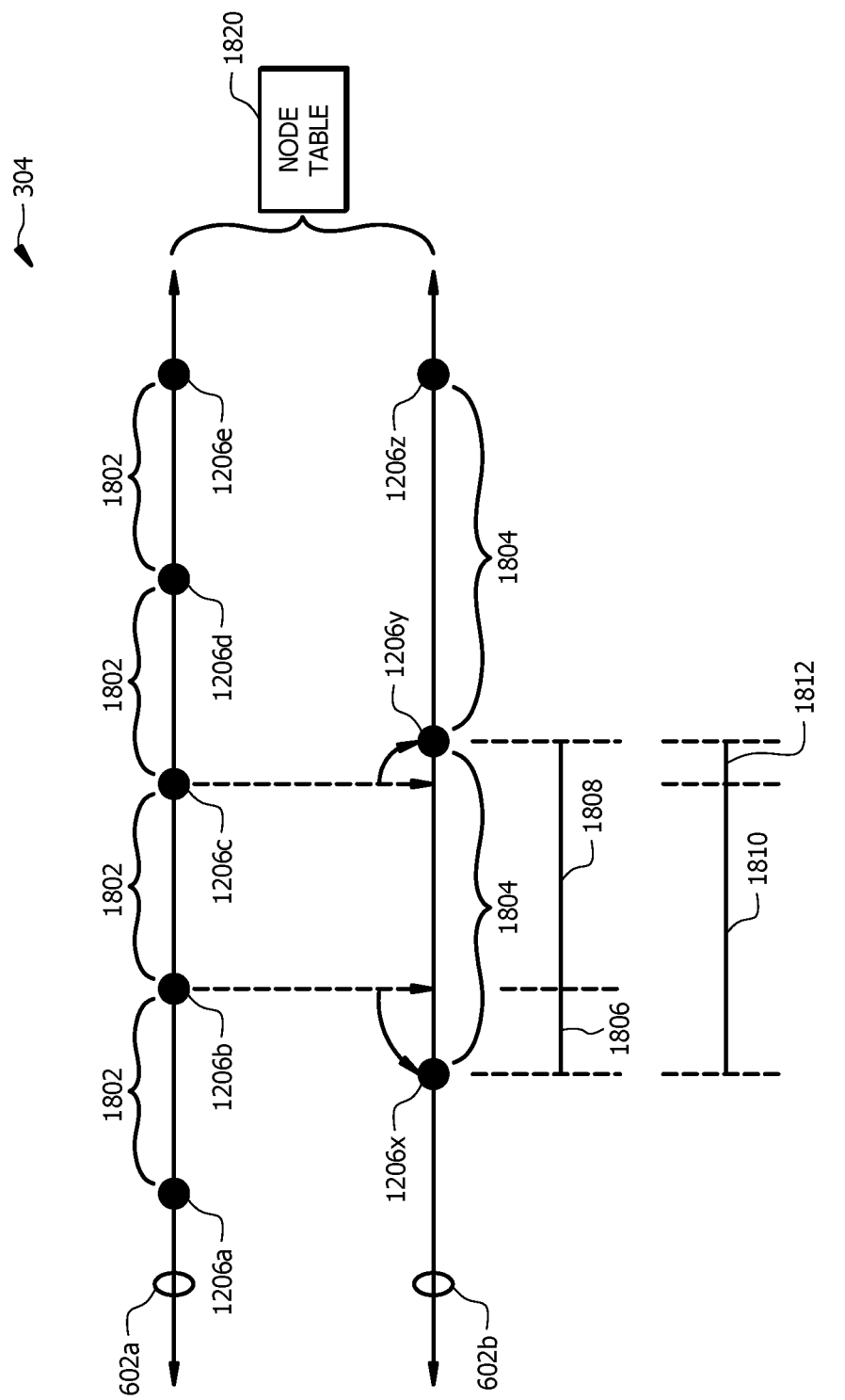
FIG. 18 is an embodiment of sub-string correlithm objects of a first string correlithm object mapped to sub-string correlithm objects of a second string correlithm objects.

FIG. 18 illustrates how sub-string correlithm objects 1206*a-e* of a first string correlithm object 602*a* are linked to sub-string correlithm objects 1206*x-z* of a second string correlithm object 602*b* by string correlithm object engine 522. The first string correlithm object 602*a* includes sub-string correlithm objects 1206*a-e* that are separated from each other by a first distance 1802 in n-dimensional space 102. The second string correlithm object 602*b* includes sub-string correlithm objects 1206*x-z* that are separated from each other by a second distance 1804 in n-dimensional space 102. In one embodiment, the sub-string correlithm objects 1206*a-e* of the first string correlithm object 602*a* and the sub-string correlithm objects 1206*x-z* can both be represented by the same length of digital word, n, (e.g., 64-bit, 128-bit, 256-bit). In another embodiment, the sub-string correlithm objects 1206*a-e* of the first string correlithm object 602*a* can be represented by a digital word of one length, n, and the sub-string correlithm objects 1206*x-z* of the second string correlithm object 602*b* can be represented by a digital word of a different length, m. Each sub-string correlithm object 1206*a-e* represents a particular data value, such as a particular type of real-world data value. When a particular sub-string correlithm object 1206*a-e* of the first string correlithm object 602 is mapped to a particular sub-string correlithm object 1206*x*-*z* of the second string correlithm object 602, as described below, then the data value associated with the sub-string correlithm object 1206*a*-*e* of the first string correlithm object 602*a* becomes associated with the mapped sub-string correlithm object 1206*x*-*z* of the second string correlithm object 602*b*.

Mapping data represented by sub-string correlithm objects 1206*a*-*e* of a first string correlithm object 602*a* in a smaller n-dimensional space 102 (e.g., 64-bit digital word) where the sub-string correlithm objects 1206*a*-*e* are more tightly correlated to sub-string correlithm objects 1206*x*-*z* of a second string correlithm object 602*b* in a larger n-dimensional space 102 (e.g., 256-bit digital word) where the sub-string correlithm objects 1206*x*-*y* are more loosely correlated (or vice versa) can provide several technical advantages in a correlithm object processing system. For example, such a mapping can be used to compress data and thereby save memory resources. In another example, such a mapping can be used to spread out data and thereby create additional space in n-dimensions for the interpolation of data. In yet another example, such a mapping can be used to apply a transformation function to the data (e.g., linear transformation function or non-linear transformation function) from the first string correlithm object 602*a* to the second string correlithm object 602*b*.

The mapping of a first string correlithm object 602*a* to a second correlithm object 602*b* operates, as described below. First, a node 304 receives a particular sub-string correlithm object 1206, such as 1206*b* illustrated in FIG. 18. To map this particular sub-string correlithm object 1206*b* to the second correlithm object 602*b*, the node 304 determines the proximity of it to corresponding sub-string correlithm objects 1206*x* and 1206*y* in second string correlithm object 602*b* (e.g., by determining the Hamming distance between 1206*b* and 1206*x*, and between 1206*b* and 1206*y*). In particular, node 304 determines a first proximity 1806 in n-dimensional space between the sub-string correlithm object 1206*b* and sub-string correlithm object 1206*x*; and determines a second proximity 1808 in n-dimensional space between the sub-string correlithm object 1206*b* and sub-string correlithm object 1206*y*. As illustrated in FIG. 18, the first proximity 1806 is smaller than the second proximity 1808. Therefore, sub-string correlithm object 1206*b* is closer in n-dimensional space 102 to sub-string correlithm object 1206*x* than to sub-string correlithm object 1206*y*. Accordingly, node 304 maps sub-string correlithm object 1206*b* of first string correlithm object 602*a* to sub-string correlithm object 1206*x* of second string correlithm object 602*b* and maps this association in node table 1820 stored in memory 504.

The mapping of the first string correlithm object 602*a* to a second correlithm object 602*b* continues in operation, as described below. The node 304 receives another particular sub-string correlithm object 1206, such as 1206*c* illustrated in FIG. 18. To map this particular sub-string correlithm object 1206*c* to the second correlithm object 602*b*, the node 304 determines the proximity of it to corresponding sub-string correlithm objects 1206*x* and 1206*y* in second string correlithm object 602*b*. In particular, node 304 determines a first proximity 1810 in n-dimensional space between the sub-string correlithm object 1206*c* and sub-string correlithm object 1206*x*; and determines a second proximity 1812 in n-dimensional space between the sub-string correlithm object 1206*c* and sub-string correlithm object 1206*y*. As illustrated in FIG. 18, the second proximity 1812 is smaller than the second proximity 1810. Therefore, sub-string correlithm object 1206*c* is closer in n-dimensional space 102 to sub-string correlithm object 1206*y* than to sub-string correlithm object 1206*x*. Accordingly, node 304 maps sub-string correlithm object 1206*c* of first string correlithm object 602*a* to sub-string correlithm object 1206*y* of second string correlithm object 602*b* and maps this association in node table 1820.

The sub-string correlithm objects 1206*a*-*e* may be associated with timestamps in order to capture a temporal relationship among them and with the mapping to sub-string correlithm objects 1206*x*-*z*. For example, sub-string correlithm object 1206*a* may be associated with a first timestamp, second sub-string correlithm object 1206*b* may be associated with a second timestamp later than the first timestamp, and so on.

Figure 19:
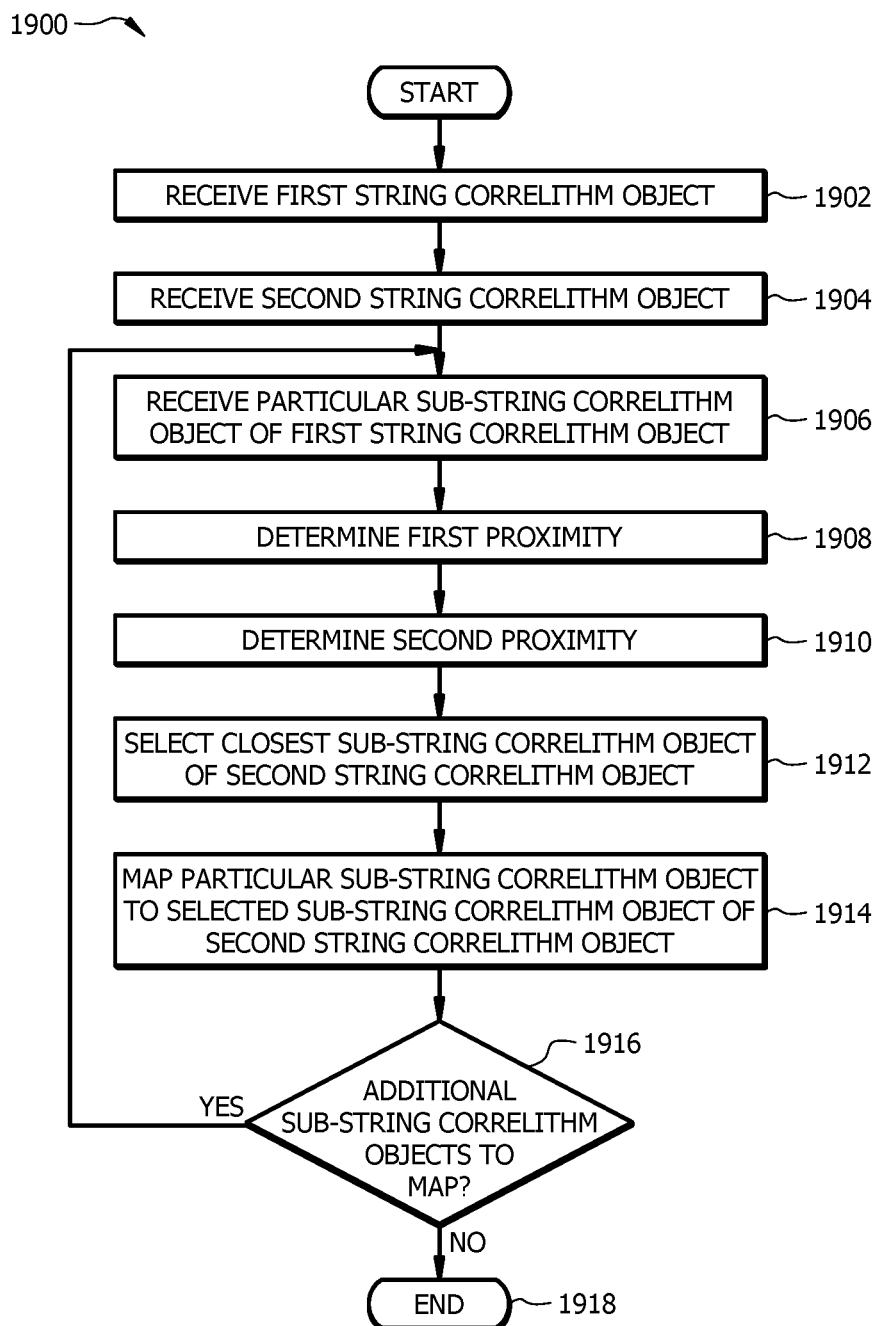
FIG. 19 is an embodiment of a process for mapping sub-string correlithm objects of a first string correlithm object to sub-string correlithm objects of a second string correlithm objects.

FIG. 19 is a flowchart of an embodiment of a process 1900 for linking a first string correlithm object 602*a* with a second string correlithm object 602*b*. At step 1902, a first string correlithm object 602*a* is received at node 304. The first correlithm object 602*a* includes a first plurality of sub-string correlithm objects 1206, such as 1206*a*-*e* illustrated in FIG. 18. Each of these sub-string correlithm objects 1206*a*-*e* are separated from each other by a first distance 1802 in n-dimensional space 102. At step 1904, a second string correlithm object 602*b* is received at node 304. The second correlithm object 602*b* includes a second plurality of sub-string correlithm objects 1206, such as 1206*x*-*z* illustrated in FIG. 18. Each of these sub-string correlithm objects 1206*x*-*z* are separated from each other by a second distance 1804 in n-dimensional space 102. At step 1906, node 304 receives a particular sub-string correlithm object 1206 of the first string correlithm object 602*a*. At step 1908, node 304 determines a first proximity in n-dimensional space 102, such as proximity 1806 illustrated in FIG. 18, to a corresponding sub-string correlithm object 1206 of second correlithm object 602*b*, such as sub-string correlithm object 1206*x* illustrated in FIG. 18. At step 1910, node 304 determines a second proximity in n-dimensional space 102, such as proximity 1808 illustrated in FIG. 18, to a corresponding sub-string correlithm object 1206 of second correlithm object 602*b*, such as sub-string correlithm object 1206*y* illustrated in FIG. 18.

At step 1912, node 304 selects the sub-string correlithm object 1206 of second string correlithm object 602*b* to which the particular sub-string correlithm object 1206 received at step 1906 is closest in n-dimensional space based upon the first proximity determined at step 1908 and the second proximity determined at step 1910. For example, as illustrated in FIG. 18, sub-string correlithm object 1206*b* is closer in n-dimensional space to sub-string correlithm object 1206*x* than sub-string correlithm object 1206*y* based on first proximity 1806 being smaller than second proximity 1808. Execution proceeds to step 1914 where node 304 maps the particular sub-string correlithm object 1206 received at step 1906 to the sub-string correlithm object 1206 of second string correlithm object 602*b* selected at step 1912. At step 1916, node 304 determines whether there are any additional sub-string correlithm objects 1206 of first string correlithm object 602*a* to map to the second string correlithm object 602*b*. If so, execution returns to perform steps 1906 through 1914 with respect to a different particular sub-string correlithm object 1206 of first string correlithm object 602*a*. If not, execution terminates at step 1918.

Machine Learning in a Correlithm Object Processing System

Figure 20:
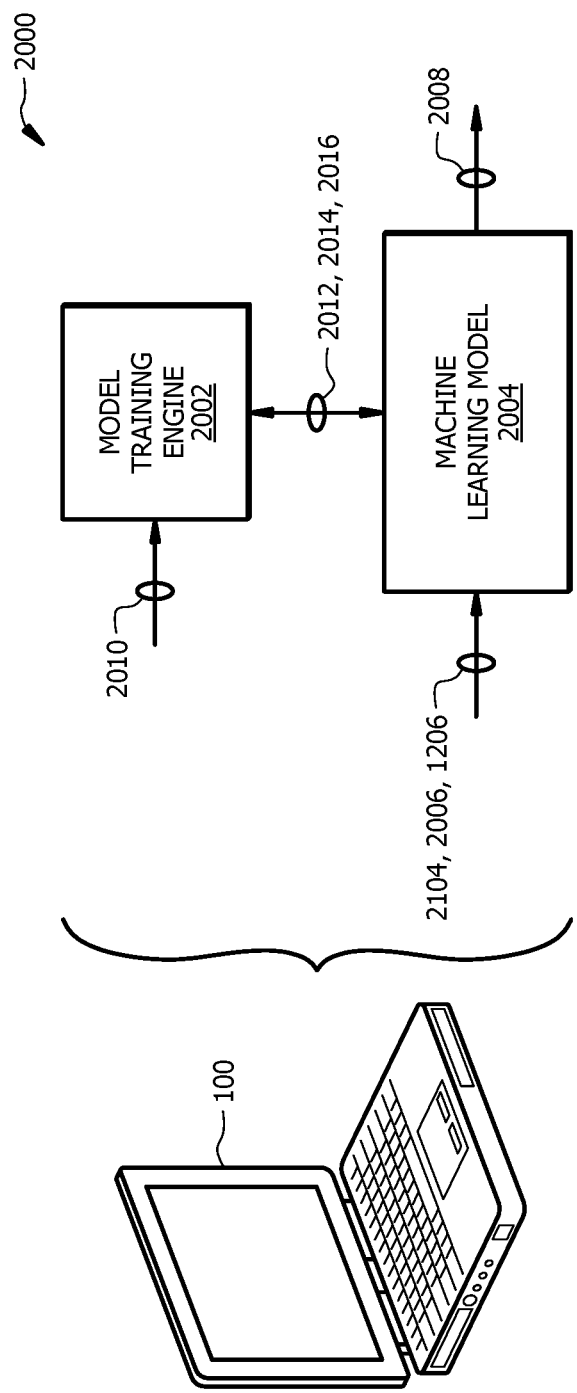
FIG. 20 is a schematic diagram of an embodiment of a device configured to machine learning model training in a correlithm object processing system.

FIG. 20 is a schematic diagram of an embodiment of a device 100 configured to perform machine learning model training in a correlithm object processing system 2000. In this example, the correlithm object processing system 2000 comprises a model training engine 2002 operably coupled to a machine learning model 2004.

Existing machine learning systems are limited to processing only numeric values and lack the functionality to process non-numeric values such as text. Non-numeric values are not inherently quantifiable which means that they do not indicate a relationship between other non-numeric values. For example, a text string is not associated with any particular numeric value does not provide any information that indicates its relationship with respect to other text strings. Using sub-string correlithm objects 1206 enables machine learning models to process data values 2104 that comprise non-numeric values. The correlithm object processing system 2100 enables devices to transform non-numeric values into the correlithm object domain using sub-string correlithm objects where they can be processed using a process similar to numeric values. This provides a technical improvement over existing systems which cannot process non-numeric data value.

The machine learning model 2004 is configured to receive one or more feature vector data values 2104 as inputs 2006 and to output a classification type 2008 based on the input feature vector data values 2104. An example of feature vectors is described in FIG. 21. The machine learning model 2004 may be configured to receive feature vector inputs 2006 that comprise numeric values (e.g. integers or floating-point values) and non-numeric values (e.g. text). The machine learning model 2004 may receive and process non-numeric values as correlithm objects (e.g. sub-string correlithm objects 1206). The machine learning model 2004 may be configured to output classification types 2008 as numeric values, non-numeric values, and correlithm objects. As an example, the machine learning model 2004 may be configured to receive information from a network activity log an input 2006 and to provide an output 2008 that indicates whether an attack is present based on the information from the network activity log. Examples of network attacks include, but are not limited to, data exfiltration or an intrusion. The machine learning model 2004 may be implemented using any suitable type of neural network model and may comprise any suitable number of neurons and/or layers (e.g. hidden layers).

The model training engine 2002 is configured to generate, train, and update the machine learning model 2004. Examples of the model training engine 2002 in operation are described in FIGS. 22, 24, and 26. The model training engine 2002 is configured to analyze training data 2010 to identify boundaries 2012, clusters 2014, and centroids 2016 and to train the machine learning model 2004 with the identified boundaries 2012, clusters 2014, and centroids 2016 for determining outputs 2008. Examples of boundaries 2012, clusters 2014, and centroids 2016 are described in FIGS. 23 and 25.

A cluster 2014 is a set of data values 2104 that are associated with a particular classification type 2008. For example, cluster 2014 may be associated with different types of network attacks. In this example, a first cluster 2014 may be associated with a classification type that indicates a first type of malicious activity (e.g. data exfiltration). A second cluster 2014 may be associated with a classification type that indicates a second type of malicious activity (e.g. an intrusion). A third cluster 2014 may be associated with a classification type that indicates no malicious activity. In other examples, clusters 2014 may be associated with any other suitable classification types.

A boundary 2012 is a decision boundary that a machine learning model 2004 may use to assign data values to a particular cluster 2014. As an example, a boundary 2014 may be a numeric threshold value. In this example, a machine learning model 2004 may be configured to assign data values 2104 that exceed the numeric threshold value to a first cluster 2014 and to assign data values 2104 that are less than the numeric threshold value to a different cluster 2014.

A centroid 2016 is the center of a cluster 2014 which may correspond with a real data value 2104 in the cluster 2014 or an imaginary data value (i.e. a data value that is not present in the cluster 2014). A centroid 2016 may be used as a reference or an exemplary data value 2104 for the data values within a cluster 2014. For example, a machine learning model 2004 may compare feature vector data values 2104 from an input to a set of centroids 2016 to determine which centroid 2016 and corresponding cluster 2014 is closest to the input. This process allows the machine learning model 2004 to quickly classify new inputs based on the centroids 2016 of clusters 2014.

The training data 2010 may comprise numeric values, non-numeric values, and correlithm objects. For example, the model training engine 2002 may be configured to use training data 2010 that comprise instances of different types of network attacks to train the machine learning model 2004 to identify the various types of attacks. For example, the model training engine 2002 may train the machine learning model 2004 to use the previously identified boundaries 2012, clusters 2014, and/or centroid 2016 to identify and classify various types of network attacks. In this example, the model training engine 2002 uses the training data 2010 to identify clusters 2014 within the training data 2010. Each cluster 2014 may be associated with a different classification of network attack. The identified boundaries 2012 and centroids 2016 may also be used by the machine learning model 2004 to classify new data. The machine learning model 2004 may compare new inputs to the previously identified boundaries 2012 and/or centroids 2016 to determine how to classify the new inputs. In this example, the model training engine 2002 provides a technical improvement to the device 100 by training machine learning models 2004 to determine whether any new inputs correspond with a network attack based on its classification.

Feature Vectors

Figure 21:
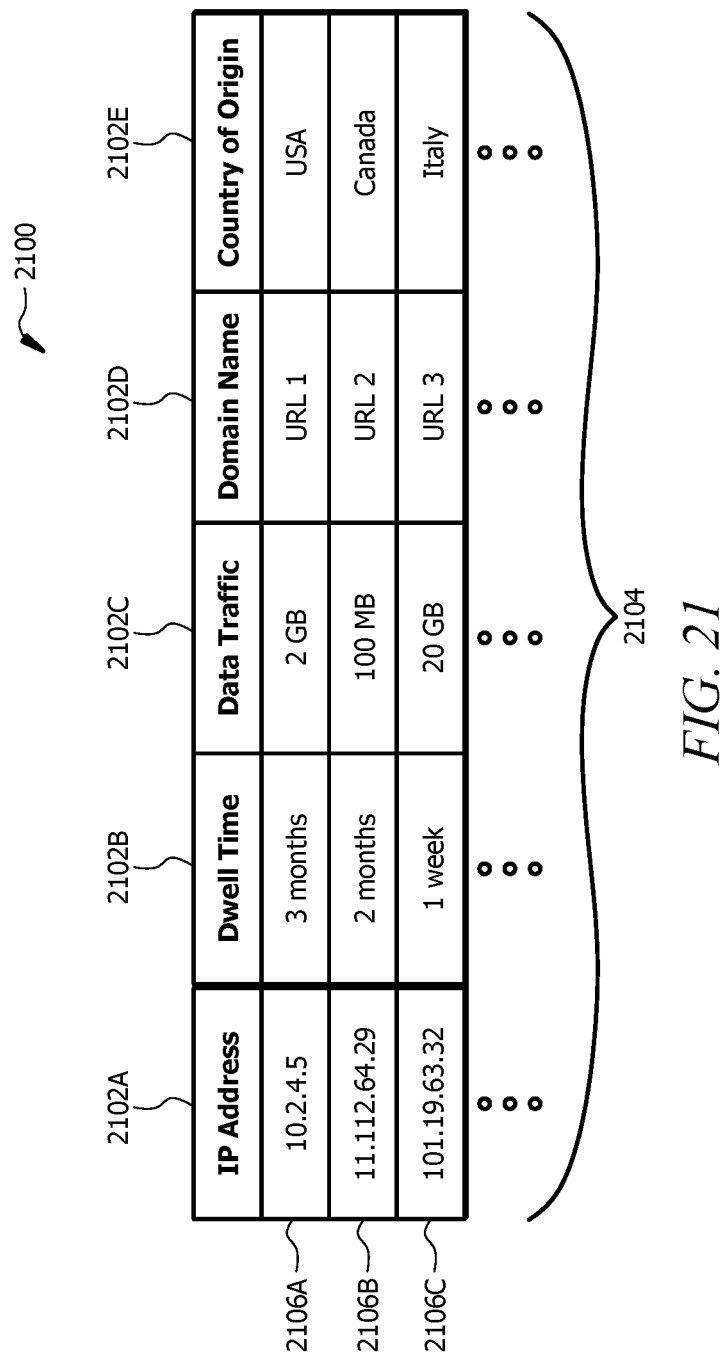
FIG. 21 is an embodiment of a table of feature vectors for a machine learning model.

FIG. 21 is an embodiment of a table 2100 of feature vectors 2102 for a machine learning model 2004. The table 2100 comprises a plurality of entries 2106 (shown as entries 2106A, 2106B, and 2106C) that each provide data values 2104 for a set of feature vectors 2102 (shown as feature vectors 2102A, 2102B, 2102C, 2102D, and 2102E). In this example, entries 2106 are shown as rows and feature vectors 2102 are shown as columns. Each feature vector 2102 describes an attribute of the entry 2106. The data values 2104 for one or more feature vectors 2102 may be used as inputs for the machine learning model 2004. Data values 2104 for a feature vector 2102 may comprise numeric values (e.g. integers or floating-point values) and non-numeric values (e.g. text). In one embodiment, the model training engine 2002 is configured to transform non-numeric values into sub-string correlithm objects before passing the non-numeric values to the machine learning model 2004 for processing.

As an example, each entry 2106 may provide information about network activity in a network. In this example, the set of feature vectors 2102 comprises an Internet Protocol (IP) Address feature vector 2102A, a Dwell Time feature vector 2102B, a Data Traffic feature value 2102C, a Domain Name feature vector 2102D, and a Country of Origin feature vector 2102E. The IP Address feature vector 2102A identifies an IP address of a device that accessed the network. The Dwell Time feature vector 2102B identifies an amount of time the device was active in the network. The Data Traffic feature vectors 2102C identifies an amount of data traffic generated by the device. The Domain Name feature vector 2102D identifies a domain name associated with the device. The Country of Origin feature vector 2102E identifies a country associated with the device. In this example, data values 2104 for the IP Address feature vector 2102A, the Dwell Time feature vector 2102B, and the Data Traffic feature vector 2102C are numeric values. The data values 2104 for the Domain Name feature vector 2102D and the Country of Origin feature vector 2102E are text strings and are non-numeric values. In other examples, the set of feature vectors 2102 may comprise any other suitable type or combination of attributes.

Identifying Clusters with Real World Data Values

Figure 22:
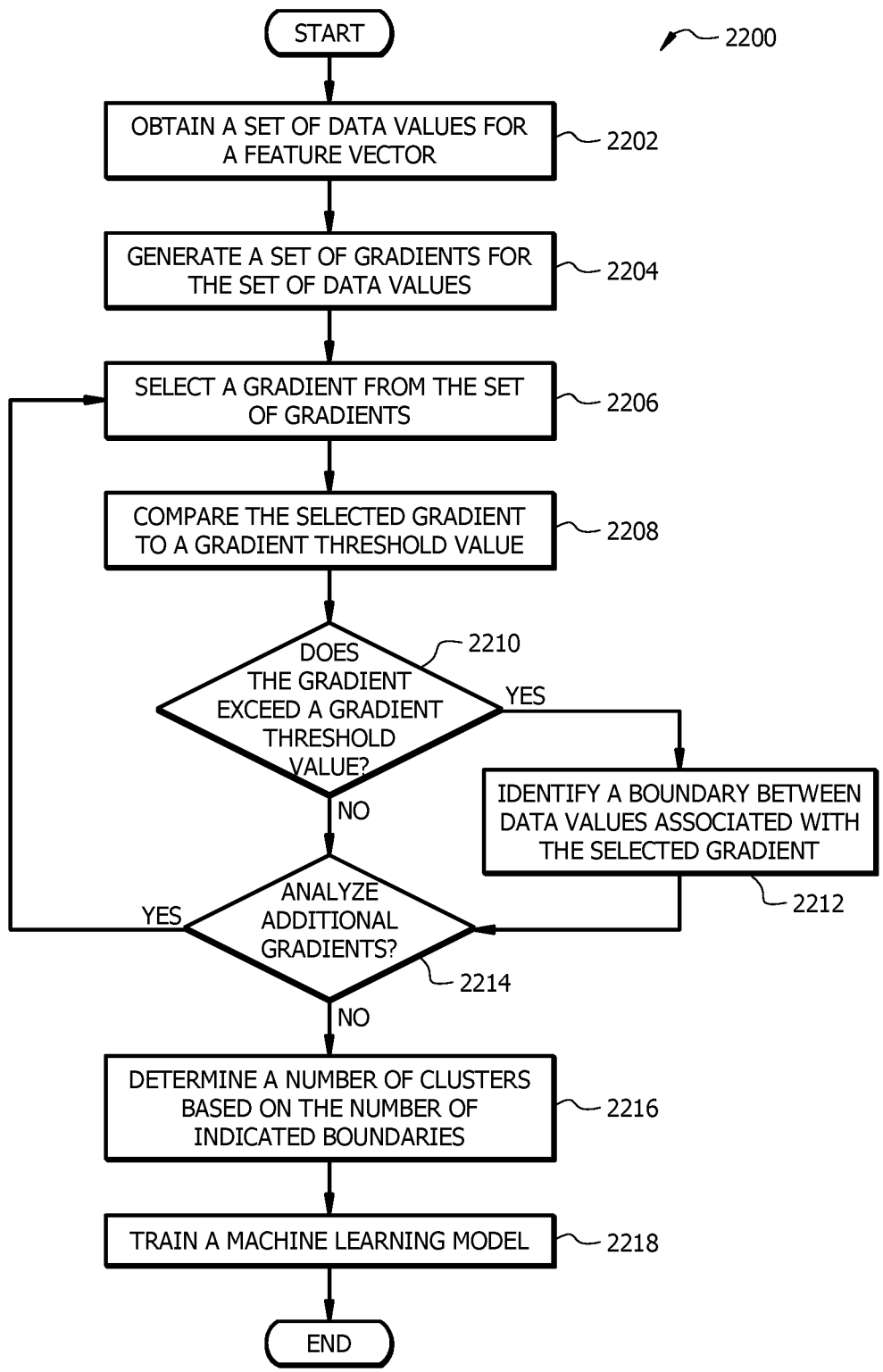
FIG. 22 is a flowchart of an embodiment of a machine learning model training method for identifying boundaries and clusters using a correlithm object processing system.

FIG. 22 is a flowchart of an embodiment of a machine learning model training method 2200 for identifying boundaries 2012 and clusters 2014 using a correlithm object processing system 2000. Method 2200 is employed by the model training engine 2002 to identify boundaries 2012 and clusters 2012 based on a training data 2010 that comprises numeric data values 2104 (e.g. integers or floating-point values) and to train the machine learning model 2004 based on the identified boundaries 2012 and clusters 2014.

At step 2202, the model training engine 2002 obtains a set of data values 2104 for a feature vector 2102. Referring to FIG. 21 as an example, the model training engine 2002 may obtain the set of data values 2104 for the Dwell Time feature vector 2102B which comprises numeric values. In one embodiment, the model training engine 2002 is configured to normalize the set of data values 2104. Normalizing the set of data values 2104 standardizes the set of data values 2104 into the same units. Continuing with the previous example, the model training engine 2002 may normalize the set of data values 2104 into units of days. In this example, the model training engine 2002 converts 3 months to 90 days, converts 2 months to 60 days, and converts 1 week into 7 days. In other examples, the model training engine 2002 may normalize the set of data values 2104 into any other suitable units.

Figure 23:
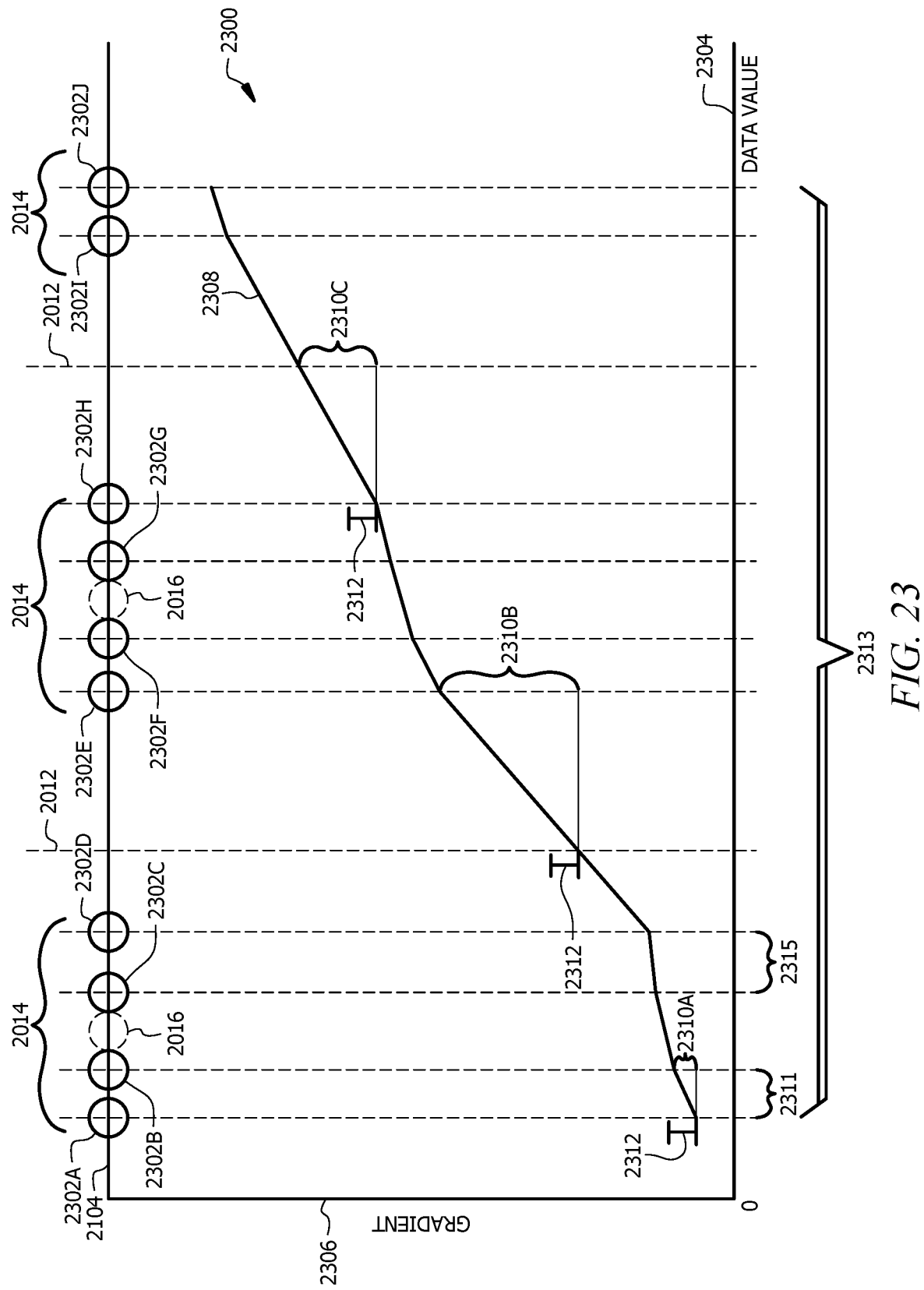
FIG. 23 is an embodiment of a graph of computations during a machine learning model training method for identifying boundaries and clusters.

Returning to FIG. 22, at step 2204, the model training engine 2002 generates a set of gradients 2310 for the set of data values 2104. In one embodiment, the model training engine 2002 sorts the set of data values 2104 in an ascending order from least to greatest. Referring to FIG. 23 as an example, the model training engine 2002 sorts the set of real world data values 2104 in an ascending order from left to right. The set of real world data values 2104 comprises data values 2302A, 2302B, 2302C, 2302D, 2302E, 2302F, 2302G, 2302H, 2302I, and 2302J. The model training engine 2002 determines a range value for the data values 2104. The range value 2313 is equal to the difference between the maximum data value and the minimum data value. For example, data value 2302J may have a value of one hundred and one and data value 2302A may have a value of one. In this example, the model training engine 2002 determines the range value 2313 for the data values 2104 is equal to one hundred. The model training engine 2002 then divides the range value 2313 by the number of data values 2104 in the set of data values 2104 to determine an average separation distance 2315. Continuing with the previous example, the set of data values 2104 includes ten data values which means the average separation distance 2315 is equal to ten.

The model training engine 2002 then determines separation distances 2311 between adjacent data values 2104. Referring to FIG. 23, graph 2300 illustrates distances between adjacent data values 2104 in the set of data values 2104. Axis 2304 indicates the value of a data value 2104 and axis 2306 indicates a gradient 2310 between data values 2104. Line 2308 represents changes in the gradient 2310 between adjacent pairs of data values 2104 in the set of data values 2104. For example, the model training engine 2002 may select a pair of adjacent data values 2104 (e.g. data values 2032A and 2302B) and determine the difference between the adjacent data values 2104. The model training engine 2002 computes separation distances 2311 for each adjacent pair of data values 2104 in the set of data values 2104.

The model training engine 2002 then determines gradients 2310 between each adjacent pair of data values 2104 by dividing the separation distance 2311 between data values 2104 by the previously determined average separation distance 2315. A gradient 2310 is the rate of change in distance between adjacent data values 2104 and represents how rapidly the distance changes between subsequent data values 2104. As an example, gradient 2310A indicates the rate of change between data value 2302A and data value 2302B, gradient 2310B indicates a rate of change between data value 2302D and data value 2302E, and gradient 2310C indicates a rate of change between data value 2302H and data value 2302I. The magnitude of a gradient 2310 is represented by the height of the gradient 2310 between adjacent data values 2104. In this example, the magnitude of the gradient 2310A is less than the magnitude of the gradient 2310B and the magnitude of the gradient 2310C. As an example, the model training engine 2002 may determine the separation distance 2311 between data value 2302A and data value 2302B is equal to one which means the gradient 2310 is equal to 1/10 or 0.1. As another example, the model training engine 2002 may determine the separation distance 2311 between data value 2032D and data value 2302E is equal to thirty which means the gradient 2310 is equal to 30/10 or 3.

Returning to FIG. 22, at step 2206, the model training engine 2002 iteratively selects a gradient 2310 from the set of gradients 2310 to identify whether any boundaries 2012 are present within the set of data values 2104. For example, the model training engine 2002 may iteratively select gradients 2310 between adjacent pairs of data values 2104 in ascending order. In other examples, the model training engine 2002 may select gradients 2310 in any other order.

At step 2208, the model training engine 2002 compares the selected gradient 2310 to a gradient threshold value 2312. The gradient threshold value 2312 indicates a maximum rate of change between subsequent data values 2104. The gradient threshold value 2312 may be any suitable predetermined value. For example, the gradient threshold value 2312 may be equal to two. Referring to FIG. 23 as an example, the gradient 2310A between the data value 2302A and the data value 2302B is less than the gradient threshold value 2312. For comparison, the gradient 2310B between data values 2302D and the data value 2302E is greater than the gradient threshold value 2312.

Returning to FIG. 22, at step 2210, the model training engine 2002 determines whether the selected gradient 2310 exceeds the gradient threshold value 2312. The model training engine 2002 proceeds to step 2212 in response to determining that the selected gradient 2310 exceeds the gradient threshold value 2312. Otherwise, the model training engine 2002 proceeds to step 2214 in response to determining that the gradient 2310 does not exceed the gradient threshold value 2312.

At step 2212, the model training engine 2002 identifies a boundary 2012 between the data values 2104 associated with the selected gradient 2310. In this case, the distance between the data values 2104 associated with a gradient 2310 that rapidly changes which may indicate that the data values 2104 are not members of the same cluster 2014 and that a boundary 2012 exists between the data values 2104. Referring to FIG. 23 as an example, the gradient 2310B exceeds the gradient threshold value 2312 which means that data value 2302D and 2302E are not members of the same cluster 2014 and that a boundary 2014 exists between these data values 2104. As another example, the gradient 2310C exceeds the gradient threshold value 2312 which means that the data values 2302H and 2302I are not members of the same cluster 2014 and that a boundary 2014 exists between these data values 2104. The model training engine 2002 may use any suitable technique to track and count the number of identified boundaries 2012.

Returning to FIG. 22, at step 2214, the model training engine 2002 determines whether to analyze additional gradients 2310. In this case, the distance between the data values 2104 associated with the gradient 2310 does not rapidly change which may indicate that the data values 2104 are members of the same cluster 2014 and that a boundary 2012 does not exist between the data values 2104. Referring to FIG. 23 as an example, the gradient 2310A does not exceed the gradient threshold value 2312 which means that the data values 2302A and 2302B are members of the same cluster 2014 and that a boundary 2012 does not exist between these data values 2104.

Returning to FIG. 22, the model training engine 2002 determines whether all of the gradients 2310 from the set of gradients 2310 have been compared to the gradient threshold value 2312 to identify any boundaries 2012 among the set of data values 2104. The model training engine 2002 may determine to analyze additional gradients 2310 when one or more gradients 2310 have not been compared to the gradient threshold value 2312. Here, the model training engine 2002 returns to step 2206 in response to determining to analyze additional gradients 2310. Otherwise, the modeling training engine 2002 proceeds to step 2216 in response to determining not to analyze additional gradients 2310.

At step 2216, the model training engine 2002 determines a number of clusters 2014 based on the number of identified boundaries 2014. In one embodiment, the number of clusters 2014 is equal to one plus the number of identified boundaries 2012. Referring to FIG. 23 as an example, the model training engine 2002 identifies two boundaries 2012 which indicates the set of data values 2104 include three cluster 2014.

Returning to FIG. 22, at step 2218, the model training engine 2002 trains the machine learning model 2004. In one embodiment, the model training engine 2002 trains the machine learning model 2004 to link the determined number of clusters 2014 with the feature vector 2102 associated with the set of data values 2104. For example, the model training engine 2002 may train the machine learning model 2004 to associate the determined number of clusters 2014 with the feature vector 2102. In some embodiments, the model training engine 2002 may train the machine learning model 2004 with the number of identified boundaries 2012, the location of identified boundaries 2012, and/or any other information. The model training engine 2002 may be configured to train the machine learning model 2004 using any suitable technique as would be appreciated by one of ordinary skill in the art.

Identifying Clusters Using Sub-String Correlithm Objects

Figure 24:
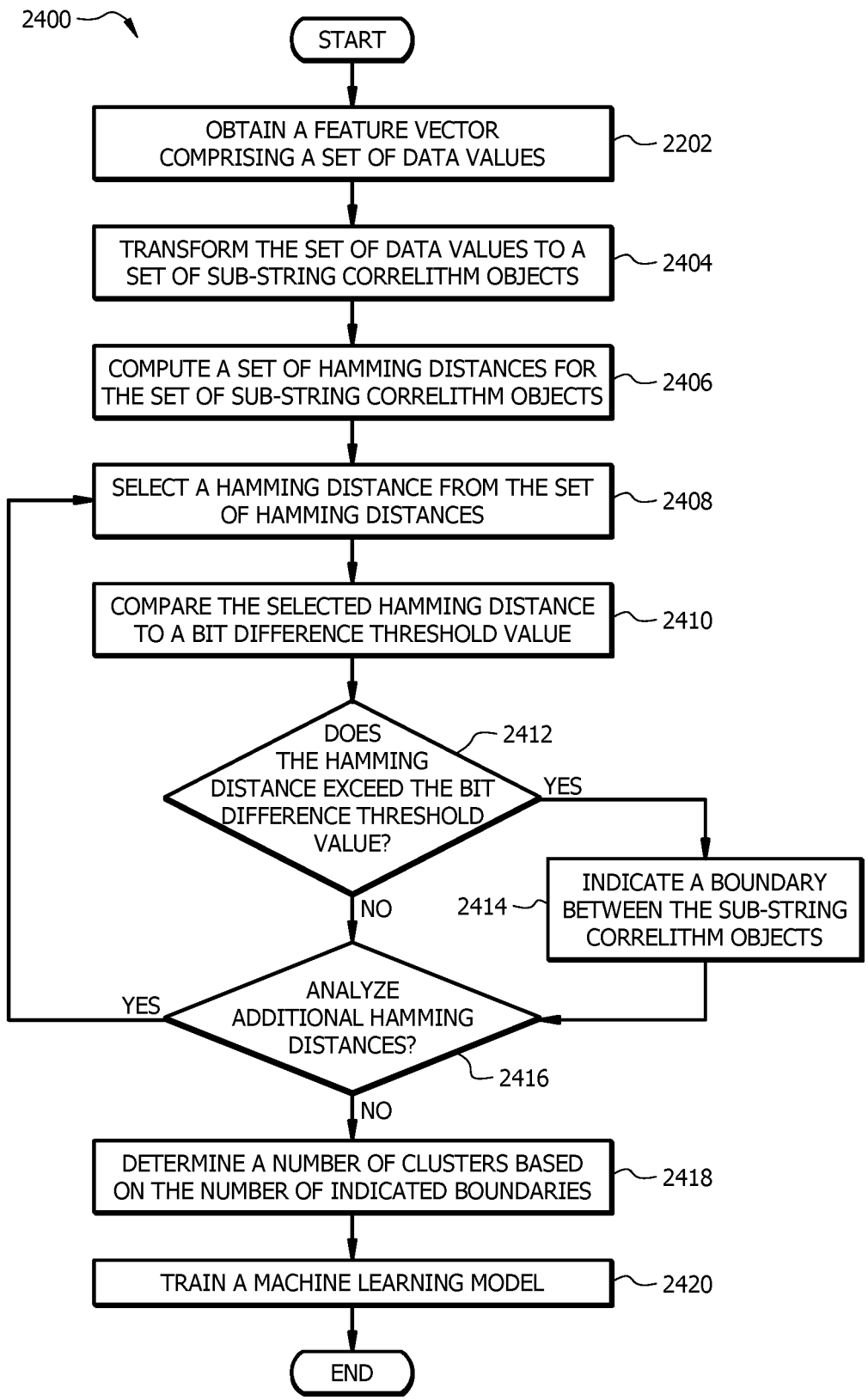
FIG. 24 is a flowchart of another embodiment of a machine learning model training method for identifying boundaries and clusters using a correlithm object processing system.

FIG. 24 is a flowchart of another embodiment of a machine learning model training method 2400 for identifying boundaries 2012 and clusters 2104 using a correlithm object processing system 2000. Method 2400 is employed by the model training engine 2002 to identify boundaries 2012 and clusters 2014 based on a training data 2104 that comprises non-numeric values (e.g. text) and to train the machine learning model 2004 based on the identified boundaries 2012 and clusters 2014.

At step 2402, the model training engine 2002 obtains a set of data values 2104 for a feature vector 2102. The set of data values 2104 may comprise numeric data values and/or non-numeric data values. Referring to FIG. 21 as an example, the model training engine 2002 may obtain the set of data values 2104 for the Domain Name feature vector 2102D which comprises non-numeric data values 2104.

Figure 25:
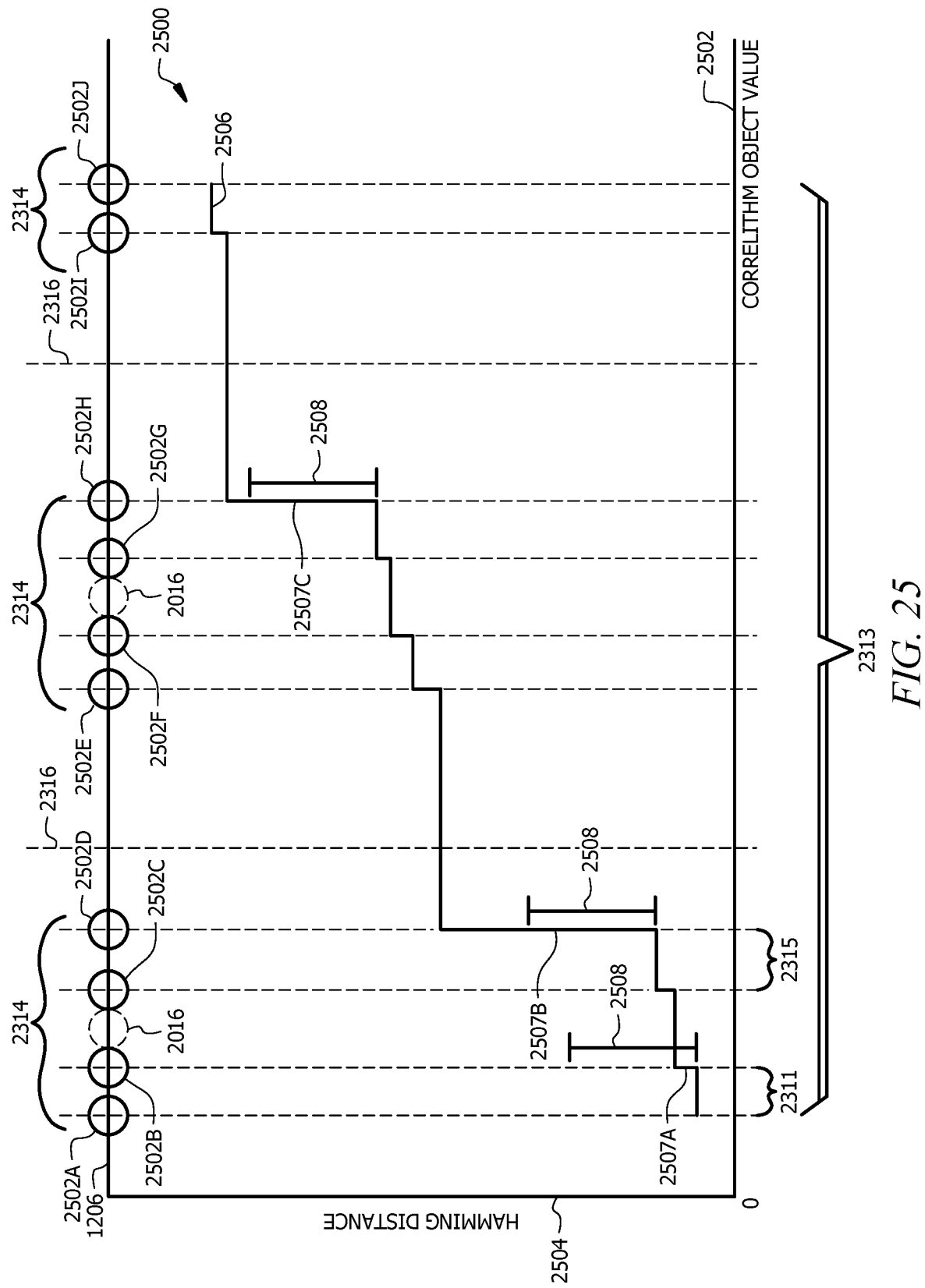
FIG. 25 is another embodiment of a graph of computations during a machine learning model training method for identifying boundaries and clusters.

Returning to FIG. 24, at step 2404, the model training engine 2002 transforms the set of data values 2104 into a set of sub-string correlithm objects 1206. The model training engine 2002 may transform the set of data values 2104 into the set of sub-string correlithm objects 1206 using a process similar to any of the processes previously described in FIGS. 12A-19. Referring to FIG. 25 as an example, the model training engine 2002 sorts the set of sub-string correlithm objects 1206 in an ascending order from left to right. The set of sub-string correlithm objects 1206 comprises data values 2502A, 2502B, 2502C, 2502D, 2502E, 2502F, 2502G, 2502H, 2502I, and 2502J.

Returning to FIG. 24, at step 2406, the model training engine 2002 computes a set of Hamming distances 2507 for the set of sub-string correlithm objects 1206. Here, the model training engine 2002 computes Hamming distances 2507 between adjacent sub-string correlithm objects 1206. The model training engine 2002 may compute Hamming distances 2507 using any of the previously described techniques. For example, the model training engine 2002 may use the techniques described in FIG. 1 for determining Hamming distances 2507 between correlithm objects. Referring to FIG. 25, graph 2500 illustrates distances between adjacent sub-string correlithm objects 1206. Axis 2502 indicates the value of a sub-string correlithm object 1206 and axis 2504 indicates a Hamming distance 2507 between sub-string correlithm objects 1206. Line 2506 represents changes in the Hamming distance 2507 between adjacent pairs of sub-string correlithm objects 1206.

Returning to FIG. 24, at step 2408, the model training engine 2002 iteratively selects a Hamming distance 2507 from the set of Hamming distances 2507 to identify any boundaries 2012 within the set of sub-string correlithm objects 1206. For example, the model training engine 2002 may iteratively select Hamming distances 2507 between adjacent pairs of sub-string correlithm objects 1206 in ascending order. In other examples, the model training engine 2002 may select Hamming distances 2507 in any other order.

At step 2410, the model training engine 2002 compares the selected Hamming distance 2507 to a bit difference threshold value 2508. The bit distance threshold value 2508 indicates a maximum number of bits that can differ between sub-string correlithm objects 1206 to be part of the same cluster 2014. In other words, when the number of bits between sub-string correlithm objects 1206 exceeds the bit difference threshold value 2508, the model training engine 2002 determines that the sub-string correlithm objects 1206 belong to different clusters 2014. The bit difference threshold value 2508 may be any suitable predetermined value. For example, the bit difference threshold value 2508 may be equal to one standard deviation of the number of dimensions of the sub-string correlithm objects 1206. For instance, the bit difference threshold value 2508 may be equal to 4 bits for 64-bit sub-string correlithm objects 1206. In other examples, the bit difference threshold value 2508 may be equal to any other suitable number of standard deviations. Referring to FIG. 25 as an example, the Hamming distance 2507A between sub-string correlithm object 2502A and sub-string correlithm object 2502B is less than the bit difference threshold value 2508. For comparison, the Hamming distance 2507B between sub-string correlithm object 2502D and sub-string correlithm object 2502E is greater than the bit difference threshold value 2508.

Returning to FIG. 24, at step 2412, the model training engine 2002 determines whether the Hamming distance 2507 exceeds the bit difference threshold value 2508. The model training engine 2002 proceeds to step 2414 in response to determining that the Hamming distance 2507 exceeds the bit difference threshold value 2508. In one embodiment, the model training engine 2002 may assign a pair of sub-string correlithm objects 1206 to different clusters 2014 in response to determining that the Hamming distance between the pair of sub-string correlithm objects 1206 exceeds the bit difference threshold value 2508. The model training engine 2002 may be further configured to train the machine learning model 2004 with the mapping of the sub-string correlithm objects 1206 to their respective clusters 2014.

Otherwise, the model training engine 2002 proceeds to step 2416 in response to determining that the Hamming distance 2507 does not exceed the bit difference threshold value 2508. In one embodiment, the model training engine 2002 may assign a pair of sub-string correlithm objects 1206 to the same cluster 2014 in response to determining that the Hamming distance between the pair of sub-string correlithm objects 1206 does not exceed the bit difference threshold value 2508. The model training engine 2002 may be further configured to train the machine learning model 2004 with the mapping of the sub-string correlithm objects 1206 to the same cluster 2014.

At step 2414, the model training engine 2002 identifies a boundary 2012 between the sub-string correlithm objects 1206 associated with the selected Hamming distance 2507. In this case, the selected Hamming distance 2507 indicates that the sub-string correlithm objects 1206 are not members of the same cluster 2014 and that a boundary 2012 exists between the sub-string correlithm objects 1206. Referring to FIG. 25 as an example, the Hamming distance 2507B exceeds the bit difference threshold value 2508 which means that sub-string correlithm objects 2502D and 2502E are not members of the same cluster 2014 and that a boundary 2012 exists between these sub-string correlithm objects 1206. As another example, the Hamming distance 2507C exceeds the bit difference threshold value 2508 which means that the sub-string correlithm objects 2502H and 2502I are not members of the same cluster 2014 and that a boundary 2012 exists between these sub-string correlithm objects 1206. The model training engine 2002 may use any suitable technique to track and count the number of identified boundaries 2012.

Returning to FIG. 24, at step 2416, the model training engine 2002 determines whether to analyze additional Hamming distances 2507. In this case, the selected Hamming distance 2507 indicates that the sub-string correlithm objects 1206 are members of the same cluster 2014 and that a boundary 2012 does not exist between the sub-string correlithm objects 1206. Referring to FIG. 25 as an example, the Hamming distance 2507A does not exceed the bit difference threshold value 2508 which means that the sub-string correlithm object 2502A and 2502B are members of the same cluster 2014 and that a boundary 2012 does not exist between these sub-string correlithm objects 1206.

Returning to FIG. 24, the model training engine 2002 determines whether all of the Hamming distances 2507 from the set of Hamming distances 2507 have been compared to the bit difference threshold value 2508 to identify any boundaries 2012 among the set of sub-string correlithm objects 1206. The model training engine 2002 determines to analyze additional Hamming distance 2507 when one or more Hamming distances 2507 have not been compared to the bit difference threshold value 2508. Here, the model training engine 2002 returns to step 2408 in response to determining to analyze additional Hamming distances 2507. Otherwise, the model training engine 2002 proceeds to step 2418 in response to determining not to analyze additional Hamming distances 2507.

At step 2418, the model training engine 2002 determines a number of clusters 2014 based on the number of indicated boundaries 2012. In one embodiment, the number of clusters 2014 is equal to one plus the number of identified boundaries 2012. Referring to FIG. 25 as an example, the model training engine 2002 identifies two boundaries 2012 which indicates the set of data values 2104 include three cluster 2014.

Returning to FIG. 24, at step 2420, the model training engine 2002 trains the machine learning model 2004. In one embodiment, the model training engine 2002 trains the machine learning model 2004 to link the determined number of clusters 2014 with the feature vector 2102 associated with the data set 2104. For example, the model training engine 2002 may train the machine learning model 2004 to associate the determined number of clusters 2014 with the feature vector 2102. In some embodiments, the model training engine 2002 may train the machine learning model 2004 with the number of identified boundaries 2012, the location of identified boundaries 2012, and/or any other information. The model training engine 2002 may be configured to train the machine learning model 2004 using any suitable technique as would be appreciated by one of ordinary skill in the art.

Identifying Cluster Centroids

Figure 26:
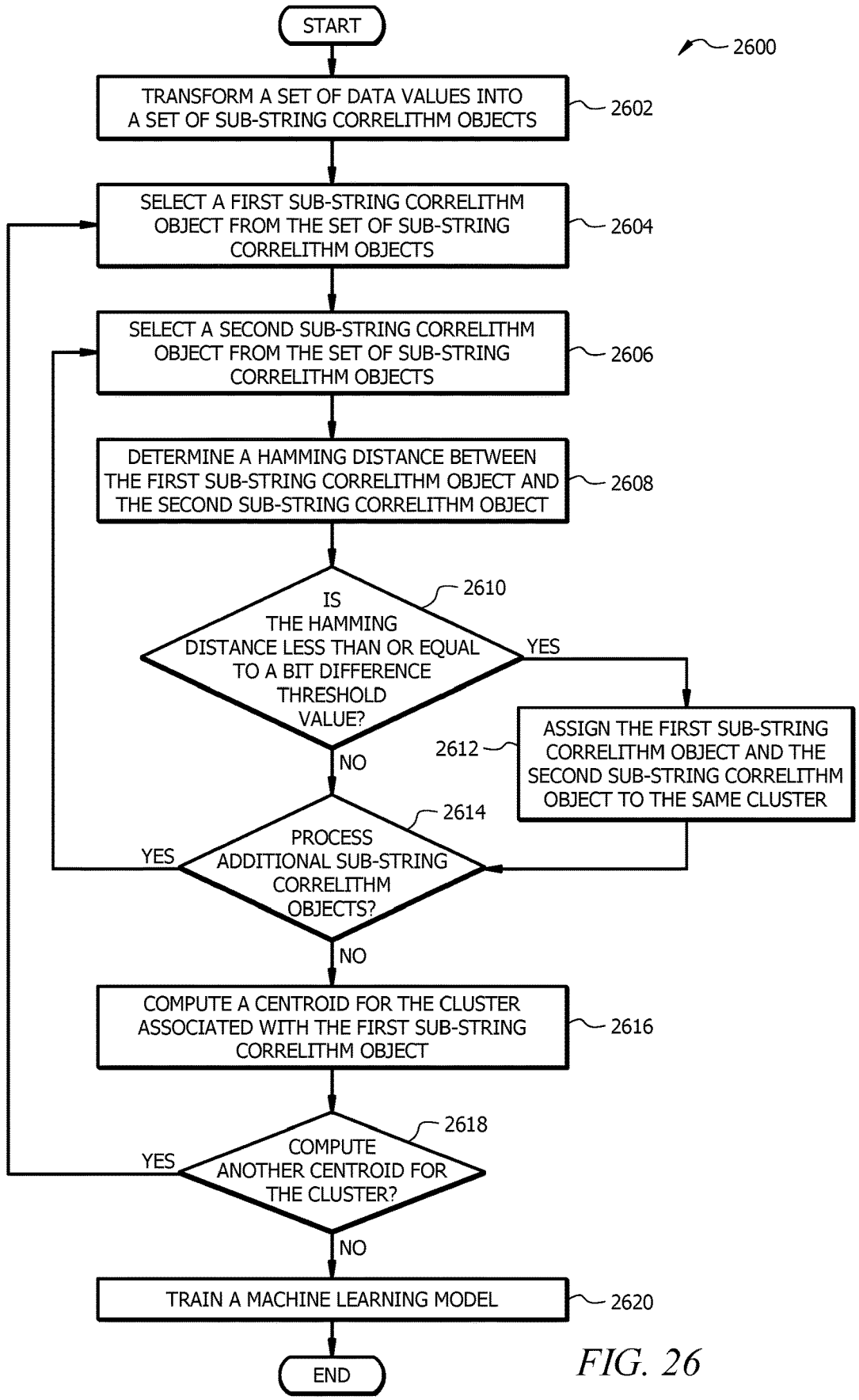
FIG. 26 is a flowchart of an embodiment of a machine learning model training method for identifying centroids in a correlithm object processing system.

FIG. 26 is a flowchart of an embodiment of a machine learning model training method 2600 for identifying clusters 2012 and centroids 2016 using a correlithm object processing system 2000. Method 2600 is employed by the model training engine 2002 to assign data values 2104 into clusters 2014 and to identify centroids 2016 for clusters 2014. The model training engine 2002 is configured to select data values 2104 or sub-string correlithm objects 1206 as a reference value and to iteratively compute pairwise distances between the selected reference value and other data values 2104 or sub-string correlithm objects 1206 in a data set. The model training engine 2002 uses information about the computed pairwise distances to determine whether the elements in the data set are members of the same cluster 2014 and to compute centroids 2016 for any identified clusters 2014.

At step 2602, the model training engine 2002 transforms a set of data values 2104 into a set of sub-string correlithm objects 1206. The model training engine 2002 may transform the set of data values 2104 into the set of sub-string correlithm objects 1206 using a process similar to any of the processes previously described in FIGS. 12A-19.

At step 2604, the model training engine 2002 selects a first sub-string correlithm object from the set of sub-string correlithm objects 1206. The model training engine 2002 may randomly select a sub-string correlithm object 1206 from the set of sub-string correlithm objects 1206 as the first sub-string correlithm object. Referring to FIG. 25 as example, the model training engine 2002 may select sub-string correlithm object 2502A as the first sub-string correlithm object.

Returning to FIG. 26, at step 2606, the model training engine 2002 selects a second sub-string correlithm object from the set of sub-string correlithm objects 1206. In one embodiment, the machine learning model 2002 iteratively selects sub-string correlithm objects 1206 from the set of sub-string correlithm objects 1206 as the second sub-string correlithm object. In some embodiments, the model training engine 2002 may randomly select a sub-string correlithm object 1206 from the set of sub-string correlithm objects 1206 as the second sub-string correlithm object. Referring to FIG. 25 as example, the model training engine 2002 may select sub-string correlithm object 2502D as the second sub-string correlithm object.

Returning to FIG. 26, at step 2608, the model training engine 2002 computes a Hamming distance 2507 between the first sub-string correlithm object and the second sub-string correlithm object. The model training engine 2002 may compute Hamming distances 2507 between the first sub-string correlithm object and the second sub-string correlithm object using any of the previously described techniques. For example, the model training engine 2002 may use the techniques described in FIG. 1 for determining Hamming distances 2507.

At step 2610, the model training engine 2002 determines whether the Hamming distance 2507 between the first sub-string correlithm object and the second sub-string correlithm object is less than or equal to a bit difference threshold value 2508. The bit distance threshold value 2508 indicates a maximum number of bits that can differ between sub-string correlithm objects 1206 to be part of the same cluster 2014. In other words, when the number of bits between sub-string correlithm objects 1206 exceeds the bit difference threshold value 2508, the model training engine 2002 determines that the sub-string correlithm objects 1206 belong to different clusters 2014. The bit difference threshold value 2508 may be any suitable predetermined value. For example, the bit difference threshold value 2508 may be equal to one standard deviation of the number of dimensions of the sub-string correlithm objects 1206. For instance, the bit difference threshold value 2508 may be equal to 4 bits for 64-bit sub-string correlithm objects 1206. In other examples, the bit difference threshold value 2508 may be equal to any other suitable number of standard deviations.

The model training engine 2002 proceeds to step 2612 in response to determining that the Hamming distance 2507 between the first sub-string correlithm object and the second sub-string correlithm object is less than or equal to the bit difference threshold value 2508. Otherwise, the model training engine 2002 proceeds to step 2614 in response to determining that the Hamming distance 2507 between the first sub-string correlithm object and the second sub-string correlithm object is greater than the bit difference threshold value 2508.

At step 2612, the model training engine 2002 assigns the first sub-string correlithm object and the second sub-string correlithm object to the same cluster 2014. Here, the model training engine 2002 determines that the first sub-string correlithm object and the second sub-string correlithm object are similar and likely members of the same cluster 2014. The model training engine 2002 may use any suitable technique for tracking and counting the sub-string correlithm objects 1206 that are assigned to a particular cluster 2014.

Returning to step 2610, the model training engine 2002 proceeds to step 2614 in response to determining that the Hamming distance 2507 between the first sub-string correlithm object and the second sub-string correlithm object is greater than the bit difference threshold value 2508. At step 2614, the model training engine 2002 determines whether to compute additional Hamming distances 2507. The model training engine 2002 determines to compute additional Hamming distances 2507 when one or more Hamming distances 2507 between the first sub-string correlithm object and other sub-string correlithm objects 1602 has not been computed. In other words, the model training engine 2002 will continue to compute Hamming distances 2507 until the model training engine 2002 computes a Hamming distance 2507 between the first sub-string correlithm object and all the other sub-string correlithm objects 1206 in the set of sub-string correlithm objects 1206. The model training engine 2002 returns to step 2606 in response to determining to compute additional Hamming distances 2507. Otherwise, the model training engine 2002 proceeds to step 2616 in response to determining not to compute additional Hamming distances 2507.

At step 2616, the model training engine 2002 computes a centroid 2016 for the cluster 2014 associated with the first sub-string correlithm object. In one embodiment, the centroid 2016 of a cluster 2014 is equal to an average value of the sub-string correlithm objects 1206 that are assigned to the cluster 2014. In other embodiments, the model training engine 2002 may use any other suitable technique for determining the centroid 2016 of the cluster 2014. Examples of centroids 2016 are shown in FIGS. 23 and 25.

At step 2618, the model training engine 2002 determines whether to compute another centroid 2016 for the cluster 2014. The model training engine 2002 may repeat the process for assigning sub-string correlithm objects 1206 to a cluster 2014 and computing the centroid 2016 of the cluster 2014 for one or more iterations. In one embodiment, the model training engine 2002 repeats the process of computing centroids 2016 until the difference between the most recently computed centroid 2016 and the previously computed centroid 2061 is less than a difference threshold value. For example, the model training engine 2002 may continue to compute centroids 2016 until the difference between the most recently computed centroid 2016 and the previously computed centroid 2016 is less than one standard deviation of the number of dimensions of the sub-string correlithm objects 1206. For instance, the difference threshold value may be equal to 4 bits for 64-bit sub-string correlithm objects 1206. In other examples, the difference threshold value may be equal to any other suitable number of standard deviations. In some embodiments, the model training engine 2002 repeats the process of computing centroids 2016 until the difference between the most recently computed centroid 2016 and the previously computed centroid 2061 is less than a difference threshold value for a predetermined number of iterations. For example, the model training engine 2002 may continue to compute centroids 2016 until the difference between the most recently computed centroid 2016 and the previously computed centroid 2016 is less than the difference threshold value for at least three iterations.

In another embodiment, the model training engine 2002 may determine the number of sub-string correlithm objects 1206 that are assigned to a cluster 2014 and may use the determined number of sub-string correlithm objects 1206 as the number of iterations for computing additional centroids 2016. For example, the model training engine 2002 may determine that six sub-string correlithm objects 1206 were assigned to a cluster 2014 after a first iteration and may repeat the process of computing a centroid 2014 five more times. In other embodiments, the model training engine 2002 may use any other suitable criteria for determining whether to compute additional centroids 2016 for the cluster 2014.

The model training engine 2002 returns to step 2604 in response to determining to compute another centroid 2016 for the cluster 2014. Here, the model training engine 2002 selects a different sub-string correlithm object from the set of sub-string correlithm objects as the first sub-string correlithm object and repeats steps 2604-2616. Otherwise, the model training engine 2002 proceeds to step 2602 in response to determining not to compute another centroid 2016 for the cluster 2014.

At step 2620, the model training engine 2002 trains the machine learning model 2004. In one embodiment, the model training engine 2002 trains the machine learning model 2004 to associate sub-string correlithm objects 1206 with their respective clusters 2014. In some embodiments, the machine learning model 2002 trains the machine learning model 2004 to link the determined centroids 2016 with their respective clusters 2014. In other embodiments, the model training engine 2002 trains the machine learning model 2004 using any other determined information.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A device, comprising:
a memory operable to store a machine learning model configured to map a set of feature vector inputs to a plurality of clusters; and
a model training engine implemented by a processor operably coupled to the memory, configured to:
obtain a set of data values associated with a feature vector, wherein the set of data values comprises non-numerical values;
transform a first data value from the set of data value into a first sub-string correlithm object from a string correlithm object, wherein:
the string correlithm object comprises a plurality of sub-string correlithm objects;
each sub-string correlithm object is represented by an n-bit digital word; and
each sub-string correlithm object is adjacent in n-dimensional space to a preceding sub-string correlithm object and a subsequent sub-string correlithm object to form the string correlithm object;
transform a second data value from the set of data value into a second sub-string correlithm object in the string correlithm object;
compute a Hamming distance between the first sub-string correlithm object and the second sub-string correlithm object;
compare the Hamming distance to a bit difference threshold value, wherein the bit different threshold value indicates a maximum number of different bits to be considered a part of the same cluster;
identify a boundary between the first sub-string correlithm object and the second sub-string correlithm object in response to determining that the Hamming distance exceeds the bit difference threshold value;
determine a number of identified boundaries;
determine a number of clusters based on the number of identified boundaries;
train the machine learning model to associate the determined number of clusters with the feature vector.

2. The device of claim 1, wherein the model training engine is further configured to:
assign the first sub-string correlithm object to a first cluster;
train the machine learning model with a mapping between the first sub-string correlithm object and the first cluster;
assign the second sub-string correlithm object to a second cluster in response to determining that the Hamming distance exceeds the bit difference threshold value, wherein the second cluster is different than the first cluster; and
train the machine learning model with a mapping between the second sub-string correlithm object and the second cluster.

3. The device of claim 1, wherein the model training engine is further configured to:
assign the first sub-string correlithm object to a first cluster;
train the machine learning model with a mapping between the first sub-string correlithm object and the first cluster;
assign the second sub-string correlithm object to the first cluster in response to determining that the Hamming distance does not exceed the bit difference threshold value; and
train the machine learning model with a mapping between the second sub-string correlithm object and the first cluster.

4. The device of claim 1, wherein computing the Hamming distance comprises:

performing an XOR operation between the first sub-string correlithm object and the second sub-string correlithm object to generate a binary string; and counting the number of logical high values in the binary string.

5. The device of claim 1, wherein the model training engine is configured to normalize the set of data values.

6. The device of claim 1, wherein the set of data values comprises text.

7. The device of claim 1, wherein transforming the first data value into the first sub-string comprises:
identifying a reference sub-string correlithm object linked with a reference data value;
determining a difference between the reference data value and the first data value;
determining a distance parameter in the n-dimensional space based on the difference; and
modifying the reference sub-string correlithm object to generate the first sub-string correlithm object, wherein modifying the reference sub-string correlithm object comprises changing a number of bits equal to the distance parameter.

8. A machine learning model training method, comprising:
obtaining, by a model training engine implemented by a processor, a set of data values associated with a feature vector, wherein the set of data values comprises non-numerical values;
transforming, by the model training engine, a first data value from the set of data value into a first sub-string correlithm object from a string correlithm object, wherein:
the string correlithm object comprises a plurality of sub-string correlithm objects;
each sub-string correlithm object is represented by an n-bit digital word; and
each sub-string correlithm object is adjacent in n-dimensional space to a preceding sub-string correlithm object and a subsequent sub-string correlithm object to form the string correlithm object;
transforming, by the model training engine, a second data value from the set of data value into a second sub-string correlithm object in the string correlithm object;
computing, by the model training engine, a Hamming distance between the first sub-string correlithm object and the second sub-string correlithm object;
comparing, by the model training engine, the Hamming distance to a bit difference threshold value, wherein the bit different threshold value indicates a maximum number of different bits to be considered a part of the same cluster;
identifying, by the model training engine, a boundary between the first sub-string correlithm object and the second sub-string correlithm object in response to determining that the Hamming distance exceeds the bit difference threshold value;
determining, by the model training engine, a number of identified boundaries;
determining, by the model training engine, a number of clusters based on the number of identified boundaries;
training, by the model training engine, a machine learning model to associate the determined number of clusters with the feature vector, wherein the machine learning model is configured to map a set of feature vector inputs to a plurality of clusters.

9. The method of claim 8, further comprising:
assigning, by the model training engine, the first sub-string correlithm object to a first cluster;
training, by the model training engine, the machine learning model with a mapping between the first sub-string correlithm object and the first cluster;
assigning, by the model training engine, the second sub-string correlithm object to a second cluster in response to determining that the Hamming distance exceeds the bit difference threshold value, wherein the second cluster is different than the first cluster; and
training, by the model training engine, the machine learning model with a mapping between the second sub-string correlithm object and the second cluster.

10. The method of claim 8, further comprising:
assigning, by the model training engine, the first sub-string correlithm object to a first cluster;
training, by the model training engine, the machine learning model with a mapping between the first sub-string correlithm object and the first cluster;
assigning, by the model training engine, the second sub-string correlithm object to the first cluster in response to determining that the Hamming distance does not exceed the bit difference threshold value; and
training, by the model training engine, the machine learning model with a mapping between the second sub-string correlithm object and the first cluster.

11. The method of claim 8, wherein computing the Hamming distance comprises:
performing an XOR operation between the first sub-string correlithm object and the second sub-string correlithm object to generate a binary string; and
counting the number of logical high values in the binary string.

12. The method of claim 8, further comprising normalizing, by the model training engine, the set of data values.

13. The method of claim 8, wherein the set of data values comprises text.

14. The method of claim 8, wherein transforming the first data value into the first sub-string comprises:
identifying a reference sub-string correlithm object linked with a reference data value;
determining a difference between the reference data value and the first data value;
determining a distance parameter in the n-dimensional space based on the difference; and
modifying the reference sub-string correlithm object to generate the first sub-string correlithm object, wherein modifying the reference sub-string correlithm object comprises changing a number of bits equal to the distance parameter.

15. A computer program comprising executable instructions stored in a non-transitory computer readable medium that when executed by a processor causes the processor to:
obtain a set of data values associated with a feature vector, wherein the set of data values comprises non-numerical values;
transform a first data value from the set of data value into a first sub-string correlithm object from a string correlithm object, wherein:
the string correlithm object comprises a plurality of sub-string correlithm objects;
each sub-string correlithm object is represented by an n-bit digital word; and
each sub-string correlithm object is adjacent in n-dimensional space to a preceding sub-string correlithm object and a subsequent sub-string correlithm object to form the string correlithm object;
transform a second data value from the set of data value into a second sub-string correlithm object in the string correlithm object;
compute a Hamming distance between the first sub-string correlithm object and the second sub-string correlithm object;
compare the Hamming distance to a bit difference threshold value, wherein the bit different threshold value indicates a maximum number of different bits to be considered a part of the same cluster;
identify a boundary between the first sub-string correlithm object and the second sub-string correlithm object in response to determining that the Hamming distance exceeds the bit difference threshold value;
determine a number of identified boundaries;
determine a number of clusters based on the number of identified boundaries;
train a machine learning model to associate the determined number of clusters with the feature vector, wherein the machine learning model is configured to map a set of feature vector inputs to a plurality of clusters.

16. The computer program of claim 15, further comprising instructions that configure the processor to:
assign the first sub-string correlithm object to a first cluster;
train the machine learning model with a mapping between the first sub-string correlithm object and the first cluster;
assign the second sub-string correlithm object to a second cluster in response to determining that the Hamming distance exceeds the bit difference threshold value, wherein the second cluster is different than the first cluster; and
train the machine learning model with a mapping between the second sub-string correlithm object and the second cluster.

17. The computer program of claim 15, further comprising instructions that configure the processor to:
assign the first sub-string correlithm object to a first cluster;
train the machine learning model with a mapping between the first sub-string correlithm object and the first cluster;
assign the second sub-string correlithm object to the first cluster in response to determining that the Hamming distance does not exceed the bit difference threshold value; and
train the machine learning model with a mapping between the second sub-string correlithm object and the first cluster.

18. The computer program of claim 15, wherein computing the Hamming distance comprises:
performing an XOR operation between the first sub-string correlithm object and the second sub-string correlithm object to generate a binary string; and
counting the number of logical high values in the binary string.

19. The computer program of claim 15, further comprising instructions that configure the processor to normalize the set of data values.

20. The computer program of claim 15, wherein transforming the first data value into the first sub-string comprises:
identifying a reference sub-string correlithm object linked with a reference data value;
determining a difference between the reference data value and the first data value;
determining a distance parameter in the n-dimensional space based on the difference; and
modifying the reference sub-string correlithm object to generate the first sub-string correlithm object, wherein modifying the reference sub-string correlithm object comprises changing a number of bits equal to the distance parameter.

* * * * *